(12) United States Patent
Lapstun

(10) Patent No.: US 12,081,724 B2
(45) Date of Patent: Sep. 3, 2024

(54) MULTIPLEXED MULTI-VIEW SCANNING AERIAL CAMERAS

(71) Applicant: Nearmap Australia Pty Ltd., Barangaroo (AU)

(72) Inventor: Paul Lapstun, Collaroy Beach (AU)

(73) Assignee: NEARMAP AUSTRALIA PTY LTD., Barangaroo (AU)

( * ) Notice: Subject to any disclaimer, the term of this patent is extended or adjusted under 35 U.S.C. 154(b) by 0 days.

(21) Appl. No.: 18/381,697

(22) Filed: Oct. 19, 2023

(65) Prior Publication Data

US 2024/0048679 A1 Feb. 8, 2024

Related U.S. Application Data

(63) Continuation of application No. 18/119,439, filed on Mar. 9, 2023, now Pat. No. 11,831,856, which is a continuation of application No. 17/452,663, filed on Oct. 28, 2021, now abandoned, which is a continuation of application No. 17/084,629, filed on Oct. 30, 2020, now Pat. No. 11,190,751, which is a continuation-in-part of application No. 16/221,640, filed on Dec. 17, 2018, now Pat. No. 10,846,558.

(51) Int. Cl.
*H04N 13/243* (2018.01)
*H04N 13/00* (2018.01)
*H04N 23/54* (2023.01)

(52) U.S. Cl.
CPC ... *H04N 13/243* (2018.05); *H04N 2013/0085* (2013.01); *H04N 23/54* (2023.01)

(58) Field of Classification Search
CPC .............. H04N 13/243; H04N 2013/0085
USPC ................................................. 348/48
See application file for complete search history.

(56) References Cited

U.S. PATENT DOCUMENTS

| 5,550,669 | A | 8/1996 | Patel |
|---|---|---|---|
| 6,535,250 | B1 | 3/2003 | Okisu et al. |
| 6,587,597 | B1 | 7/2003 | Nakao et al. |
| 9,042,717 | B2 | 5/2015 | Low et al. |
| 9,641,736 | B2 | 5/2017 | Lapstun et al. |
| 10,337,862 | B2 | 7/2019 | Pechatnikov et al. |
| 2014/0340474 | A1 | 11/2014 | Fields et al. |
| 2014/0362177 | A1 | 12/2014 | Dunn |
| 2016/0065807 | A1* | 3/2016 | McClanahan ........ H04N 23/682 348/37 |
| 2017/0242225 | A1 | 8/2017 | Fiske |
| 2017/0244880 | A1 | 8/2017 | Cope et al. |

(Continued)

*Primary Examiner* — Joel W Fosselman
(74) *Attorney, Agent, or Firm* — XSENSUS LLP

(57) ABSTRACT

A scanning camera for capturing images along two or more curved scan paths, the scanning camera comprising a camera assembly associated with each scan path, each camera assembly comprising an image sensor and a lens; a scanning mirror; and a drive coupled to the scanning mirror; wherein the drive is operative to rotate the scanning mirror about a spin axis according to a spin angle; the spin axis is tilted relative to each camera optical axis; the scanning mirror is tilted relative to the spin axis and each camera optical axis; the scanning mirror is positioned to reflect an imaging beam into each lens in turn; and each image sensor is operative to capture each image along a respective one of the scan paths by sampling the imaging beam at a corresponding spin angle.

18 Claims, 46 Drawing Sheets

(56) References Cited

U.S. PATENT DOCUMENTS

2020/0191568 A1   6/2020   Lapstun
2020/0195813 A1   6/2020   Lapstun

* cited by examiner

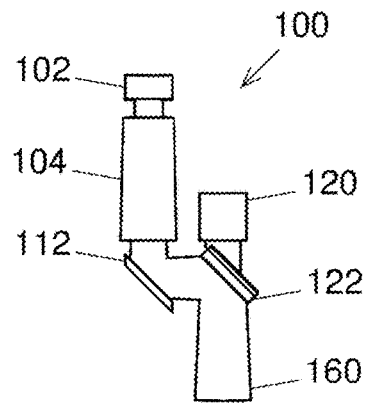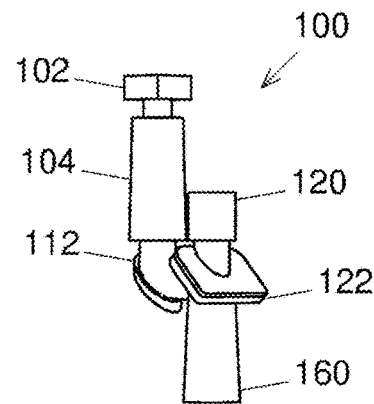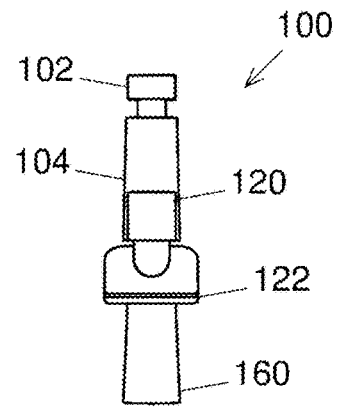
Fig. 5A	Fig. 5B	Fig. 5C
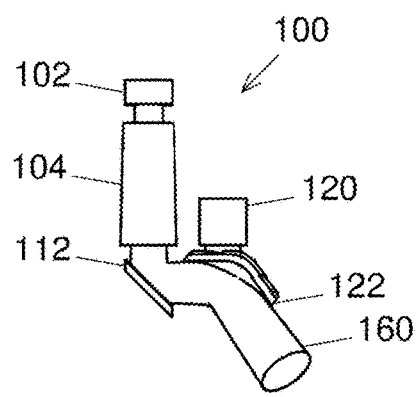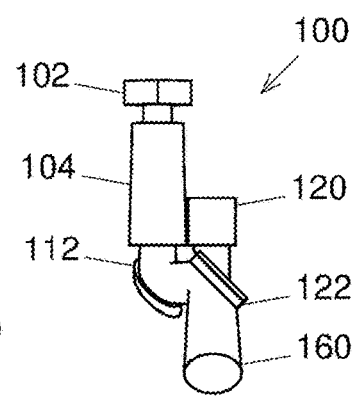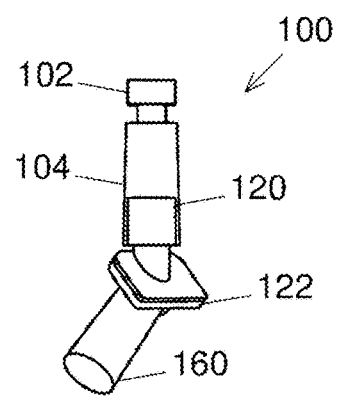
Fig. 5D	Fig. 5E	Fig. 5F

| altitude | focal length | speed | scan rate | shot count | shot rate | line spacing | capture rate |
| --- | --- | --- | --- | --- | --- | --- | --- |
| 2000' | 55mm | 200kts | 0.4Hz | 5 | 2Hz | 300m | 100km2/h |
| 4000' | 110mm | 200kts | 0.4Hz | 9 | 4Hz | 700m | 200km2/h |
| 6000' | 160mm | 200kts | 0.4Hz | 13 | 6Hz | 1000m | 400km2/h |
| 8000' | 220mm | 200kts | 0.4Hz | 17 | 8Hz | 1300m | 500km2/h |
| 10000' | 270mm | 200kts | 0.4Hz | 21 | 9Hz | 1600m | 600km2/h |
| 12000' | 330mm | 200kts | 0.4Hz | 25 | 11Hz | 2000m | 700km2/h |
| 14000' | 380mm | 200kts | 0.4Hz | 29 | 13Hz | 2300m | 800km2/h |
| 16000' | 440mm | 300kts | 0.7Hz | 34 | 23Hz | 2600m | 1500km2/h |
| 18000' | 490mm | 300kts | 0.7Hz | 38 | 25Hz | 2900m | 1600km2/h |
| 20000' | 550mm | 300kts | 0.7Hz | 42 | 28Hz | 3300m | 1800km2/h |
| 22000' | 600mm | 300kts | 0.7Hz | 46 | 31Hz | 3600m | 2000km2/h |
| 24000' | 660mm | 300kts | 0.7Hz | 50 | 33Hz | 3900m | 2200km2/h |
| 26000' | 710mm | 400kts | 0.9Hz | 54 | 48Hz | 4200m | 3100km2/h |
| 28000' | 770mm | 400kts | 0.9Hz | 59 | 53Hz | 4600m | 3400km2/h |
| 30000' | 820mm | 400kts | 0.9Hz | 63 | 56Hz | 4900m | 3600km2/h |
| 32000' | 880mm | 400kts | 0.9Hz | 67 | 60Hz | 5200m | 3900km2/h |
| 34000' | 930mm | 400kts | 0.9Hz | 71 | 63Hz | 5600m | 4100km2/h |
| 36000' | 990mm | 400kts | 0.9Hz | 75 | 67Hz | 5900m | 4400km2/h |
| 38000' | 1040mm | 400kts | 0.9Hz | 79 | 71Hz | 6200m | 4600km2/h |
| 40000' | 1100mm | 500kts | 1.1Hz | 84 | 94Hz | 6500m | 6100km2/h |
| 42000' | 1150mm | 500kts | 1.1Hz | 88 | 98Hz | 6900m | 6400km2/h |
| 44000' | 1210mm | 500kts | 1.1Hz | 92 | 103Hz | 7200m | 6700km2/h |
| 46000' | 1260mm | 500kts | 1.1Hz | 96 | 107Hz | 7500m | 7000km2/h |
| 48000' | 1320mm | 500kts | 1.1Hz | 100 | 112Hz | 7800m | 7300km2/h |
| 50000' | 1370mm | 500kts | 1.1Hz | 104 | 116Hz | 8200m | 7600km2/h |

Fig. 24

EQ1: $\sin(b) = \sin(p) \cdot \sin(t)$

EQ2: $\sin(a) \cdot \cos(b) = \cos(p) \cdot \sin(t)$

EQ3: $\cos(a) \cdot \cos(b) = \cos(t)$

EQ4: $b = \arcsin(\sin(45°) \cdot \sin(45°)) = 30°$

EQ5: $a = \arccos(\cos(45°) / \cos(30°)) = 35.3°$

EQ6: $b = \arctan(\mathrm{abs}(\sin(a)))$

Fig. 36

MULTIPLEXED MULTI-VIEW SCANNING AERIAL CAMERAS

CROSS-REFERENCE TO RELATED APPLICATIONS

This application is a continuation of application Ser. No. 18/119,439, filed Mar. 9, 2023, which is a continuation of application Ser. No. 17/452,663, filed Oct. 28, 2021, which is a continuation of application Ser. No. 17/084,629 (Now U.S. Pat. No. 11,190,751), filed Oct. 30, 2020, which is a continuation-in-part of application Ser. No. 16/221,640 (Now U.S. Pat. No. 10,846,558), filed Dec. 17, 2018, all of each are incorporated herein by reference in their entirety.

FIELD OF THE INVENTION

The present invention relates to high-performance multi-view aerial imaging systems and methods.

BACKGROUND OF THE INVENTION

Georeferenced aerial imagery, orthomosaics and 3D surface models are increasingly used to visualize, analyze and manage the built environment. Multiple views of each ground point from different angles, as well as high image resolution, are important both for visualization and for high-fidelity 3D surface reconstruction. Since the built environment undergoes constant change, aerial imagery and 3D surface models are ideally updated on a regular basis. This motivates the use of high-performance multi-view imaging systems that deliver high resolution while minimizing operating cost.

Efficient imaging of large areas is generally achieved by operating at higher altitudes, using both aircraft and satellite imaging platforms. High-altitude wide-area imaging at high resolution quickly exceeds the capacity of individual image sensors, so may utilize a scanning design. The scanning direction is typically perpendicular to the direction of flight, and the scanning mechanism may utilise a rotating mirror.

Scanning designs are generally not optimized for oblique imaging or multi-view imaging in general.

SUMMARY OF THE INVENTION

In one aspect, the present invention provides a scanning camera for capturing a set of images along at two or more curved scan paths on an object plane within an area of interest, each image of the set of images associated with a viewing angle and a viewing direction relative to the object plane, the scanning camera comprising: a camera assembly associated with each scan path, each camera assembly comprising an image sensor and a lens, and having a camera optical axis; a scanning mirror; and a drive coupled to the scanning mirror; wherein: the drive is operative to rotate the scanning mirror about a spin axis according to a spin angle; the spin axis is tilted relative to each camera optical axis; the scanning mirror is tilted relative to the spin axis; for each camera assembly, and for a corresponding subrange of values of the spin angle, the scanning mirror is tilted relative to the camera optical axis, and is positioned to reflect an imaging beam into the lens, a viewing angle and a viewing direction of the imaging beam relative to the object plane varying with the spin angle and a pointing direction of the camera optical axis; each lens is positioned to focus the imaging beam onto its respective image sensor; and each image sensor is operative to capture each image along a respective one of the scan paths by sampling the imaging beam at a value of the spin angle corresponding to the viewing angle and the viewing direction of the image.

The spin axis may be substantially orthogonal to each camera optical axis, and the scanning mirror may be tilted at approximately 45 degrees to each camera optical axis when facing that camera optical axis.

The scanning camera may comprise a correction mirror associated with each camera assembly, each correction mirror positioned to bend its respective camera optical axis between its respective lens and the scanning mirror. Each correction mirror may be tilted at approximately 45 degrees to its respective camera optical axis, thereby to bend the camera optical axis by approximately 90 degrees.

The scanning camera may comprise a correction mirror stage coupled to each correction mirror, the correction mirror stage operative to rotate its respective correction mirror about at least one correction axis according to at least one correction angle.

The camera optical axes of at least two of the camera assemblies may point in opposite directions to each other, or the camera optical axes may point in directions that are perpendicular to each other.

The scanning camera may comprise at least three camera assemblies, wherein the camera optical axes of a first two of the camera assemblies may point in opposite directions to each other, and the camera optical axis of a third camera assembly may point in a direction perpendicular to first two pointing directions.

The scanning camera may comprise at least four camera assemblies, wherein the camera optical axes of a first two of the camera assemblies may point in opposite directions to each other, the camera optical axes of a second two of the camera assemblies may point in opposite directions to each other, and the first two pointing directions may be perpendicular to the second two pointing directions.

In another aspect, the present invention provides a scanning camera comprising a single camera assembly multiplexed between two or more scan paths, e.g. using a multiplexing mirror and drive.

In another aspect, the present invention provides a method of capturing, using the scanning camera, the set of images along the two or more curved scan paths within the area of interest, the method comprising, for each scan path, rotating, using the drive, the scanning mirror about the spin axis according to a value of the spin angle at the start of the subrange of spin values associated with the scan path, and, for each image along the scan path, rotating, using the drive, the scanning mirror about the spin axis according to a value of the spin angle corresponding to the viewing angle and the viewing direction of the image, and capturing, using the image sensor associated with the scan path, the image.

The method may further comprise moving the scanning camera along a survey path above the area of interest, and capturing, within each of a set of selected intervals along the survey path and using the scanning camera, a corresponding one of a plurality of the sets of images.

The camera optical axes of two or more of the camera assemblies may point in opposite directions to each other, and the two directions may be parallel to a direction of movement or perpendicular to a direction of movement.

The scanning camera may comprise three or more camera assemblies, wherein the camera optical axes of a first two of the camera assemblies point in opposite directions to each other, the camera optical axis of a third of the camera assemblies may point in a direction perpendicular to the first two pointing directions, and the first two pointing directions may be perpendicular to a direction of movement.

The method may comprise using the first two camera assemblies to capture images with substantially oblique viewing angles, and using the third camera assembly to capture images with substantially nadir viewing angles.

In another aspect, the present invention provides a scanning camera for capturing a set of images along a curved scan path within an area of interest, the scanning camera comprising an image sensor; a lens; a scanning mirror; and a drive coupled to the scanning mirror; wherein the drive is operative to rotate the scanning mirror about a spin axis according to a spin angle; the spin axis is tilted relative to a camera optical axis; the scanning mirror is tilted relative to the camera optical axis and positioned to reflect an imaging beam into the lens; the lens is positioned to focus the imaging beam onto the image sensor; and the image sensor is operative to capture each image by sampling the imaging beam at a corresponding spin angle.

In another aspect, the present invention provides a scanning camera system comprising a first scanning camera facing in a first direction, and a second scanning camera according facing in a second direction substantially opposite to the first direction.

In another aspect, the present invention provides a scanning camera for capturing a set of oblique images along a curved scan path within an area of interest, the scanning camera comprising an image sensor; a lens; a scanning mirror; and a drive coupled to the scanning mirror; wherein the drive is operative to rotate the scanning mirror about a spin axis according to a spin angle; the spin axis is tilted relative to a camera optical axis; the scanning mirror is tilted relative to the camera optical axis and positioned to reflect an imaging beam into the lens; the camera optical axis is tilted at an oblique angle relative to an object plane within the area of interest; the lens is positioned to focus the imaging beam onto the image sensor; and the image sensor is operative to capture each image by sampling the imaging beam at a corresponding spin angle.

The spin axis of the scanning camera(s) may be substantially orthogonal to the camera optical axis.

The scanning mirror of the scanning camera(s) may be tilted at approximately 45 degrees to the camera optical axis.

The set of images captured by (each of) the scanning camera(s) may comprise at least some oblique images with substantially orthogonal viewing directions.

The set of images captured by (each of) the scanning camera(s) may comprise at least one image with a substantially nadir viewing angle and a plurality of images with substantially oblique viewing angles.

The scanning camera(s) may comprise a correction mirror positioned to bend the camera optical axis between the lens and the scanning mirror.

The correction mirror may be tilted at approximately 45 degrees to camera optical axis, thereby to bend the camera optical axis by approximately 90 degrees.

The scanning camera(s) may comprise a correction mirror stage coupled to the correction mirror, operative to rotate the correction mirror about at least one correction axis according to at least one correction angle.

In another aspect, the present invention provides a method of capturing, within an area of interest and using the scanning camera system, a first set of images along a first curved scan path using the first scanning camera, and a second set of images along a second curved scan path using the second scanning camera.

The set of images captured using each scanning camera may comprise at least some oblique images with substantially orthogonal viewing directions.

The set of images captured using each scanning camera may comprise at least one image with a substantially nadir viewing angle and a plurality of images with substantially oblique viewing angles.

In another aspect, the present invention provides a method for capturing a multi-view set of images of an area of interest, the multi-view set of images comprising, for each of a plurality of points within the area of interest, at least one nadir image and at least four oblique images from four substantially different viewing directions, the method comprising moving a dual-scan scanning camera along a survey path above the area of interest, and capturing, within selected intervals along the survey path and using the dual-scan scanning camera, subsets of the multi-view set of images of the area of interest along pairs of opposed non-linear scan paths.

The dual-scan scanning camera may comprise two scanning cameras facing in substantially opposite directions, the method comprising capturing, within each selected interval along the survey path and using each scanning camera, a respective subset of the multi-view set of images of the area of interest along a respective non-linear scan path, each image in the subset having a unique viewing angle and viewing direction pair.

The method may comprise, for each image within the subset, rotating a scanning mirror in an optical path of the corresponding scanning camera about a spin axis according to a spin angle, the spin axis tilted relative to a camera optical axis, the spin angle corresponding to a unique viewing angle and viewing direction pair.

The method may comprise, for each image within the subset, rotating a scanning mirror in an optical path of the corresponding scanning camera about a spin axis according to a spin angle, the spin axis aligned with a camera optical axis, and tilting the scanning mirror according to a tilt angle, the spin angle and tilt angle pair corresponding to a unique viewing angle and viewing direction pair.

The method may comprise, for each image within the subset, rotating a camera assembly of the corresponding scanning camera about a spin axis according to a spin angle, the spin axis aligned with a camera optical axis, and tilting a tilting mirror in an optical path of the scanning camera according to a tilt angle, the spin angle and tilt angle pair corresponding to a unique viewing angle and viewing direction pair.

The method may comprise, for each image within the subset, rotating a camera assembly of the corresponding scanning camera about a spin axis according to a spin angle, the spin axis substantially orthogonal to a camera optical axis, and tilting a tilting mirror in an optical path of the scanning camera according to a tilt angle, the spin angle and tilt angle pair corresponding to a unique viewing angle and viewing direction pair.

Each non-linear scan path may comprise a smooth curve.

Each non-linear scan path may comprise two linear segments, and the two linear segments may be substantially orthogonal.

The two scanning cameras may share a single camera assembly.

The method may comprise multiplexing the single camera assembly between the two scanning cameras by rotating a multiplexing mirror in the optical paths of both scanning cameras between two operative positions.

In another aspect, the present invention provides a method for generating a 3D model of a surface, the method comprising moving a dual-scan scanning camera along a survey path above the surface; capturing, at selected intervals along the survey path and using the dual-scan scanning camera, images of the surface along pairs of opposed curved or shaped scan paths; inferring, using triangulation, 3D positions of common features among the images; and generating the 3D model using the 3D positions.

In another aspect, the present invention provides a method for generating a true orthomosaic image of a surface, the method comprising moving a dual-scan scanning camera along a survey path above the surface; capturing, at selected intervals along the survey path and using the dual-scan scanning camera, images of the surface along pairs of opposed curved or shaped scan paths; inferring, using triangulation, 3D positions of common features among the images; generating a 3D model of the surface using the 3D positions; and projecting the 3D model according to a viewing direction to generate the true orthomosaic image.

DRAWINGS—FIGURES

FIG. 5A shows a right side elevation of the scanning camera with its scanning mirror at a zero spin angle.

FIG. 5B shows a right-front elevation of the scanning camera with its scanning mirror at a zero spin angle.

FIG. 5C shows a front elevation of the scanning camera with its scanning mirror at a zero spin angle.

FIG. 5D shows a right side elevation of the scanning camera with its scanning mirror at an extreme spin angle.

FIG. 5E shows a right-front elevation of the scanning camera with its scanning mirror at an extreme spin angle.

FIG. 5F shows a front elevation of the scanning camera with its scanning mirror at an extreme spin angle.

FIG. 24 shows a tabulation of the performance of the dual-scan scanning camera at different altitudes for a fixed GSD.

FIG. 36 lists the equations governing the viewing angle and viewing direction of a steerable scanning camera.

Figure 37:
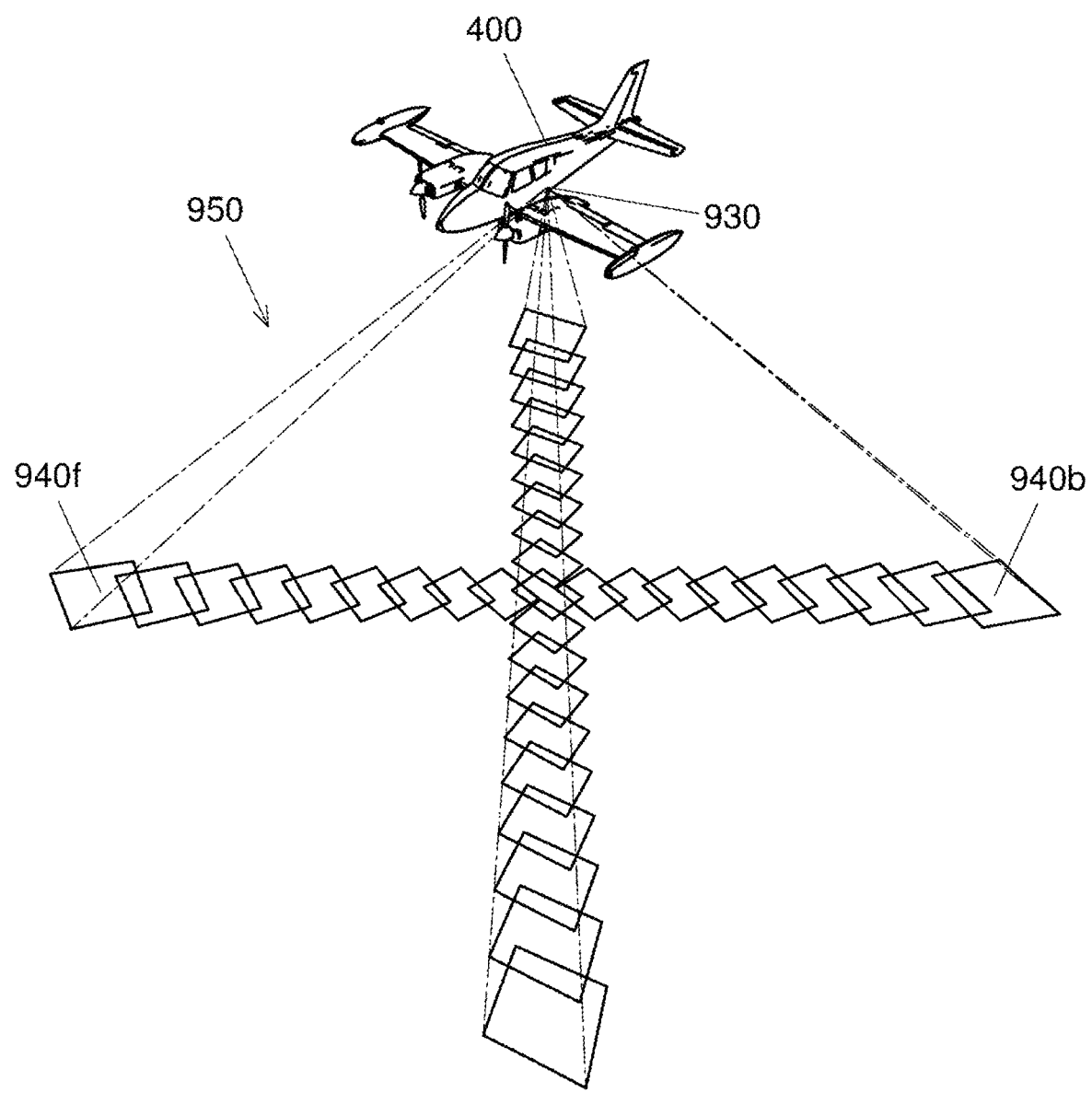

FIG. 37 shows the shaped scan field of a dual-scan steerable scanning camera carried by a survey aircraft.

Figure 38A:
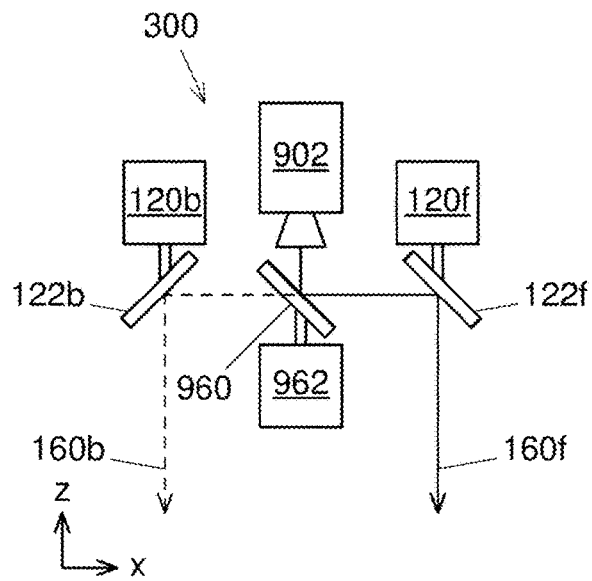

FIG. 38A shows a multiplexed scanning camera with a spinning multiplexing mirror.

Figure 38B:
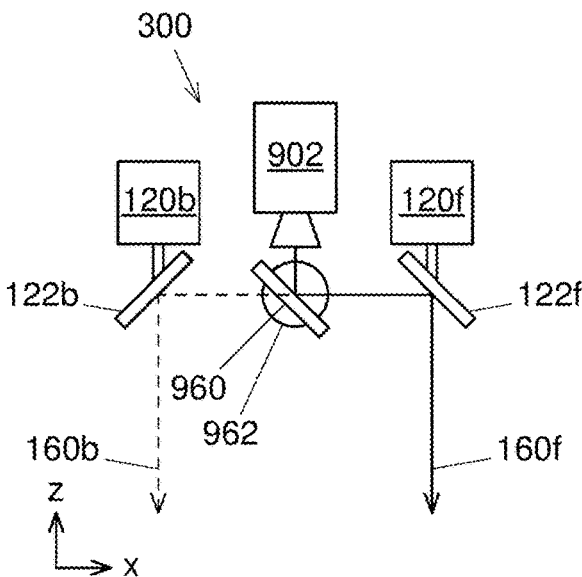

FIG. 38B shows a multiplexed scanning camera with a tilting multiplexing mirror.

Figure 38C:
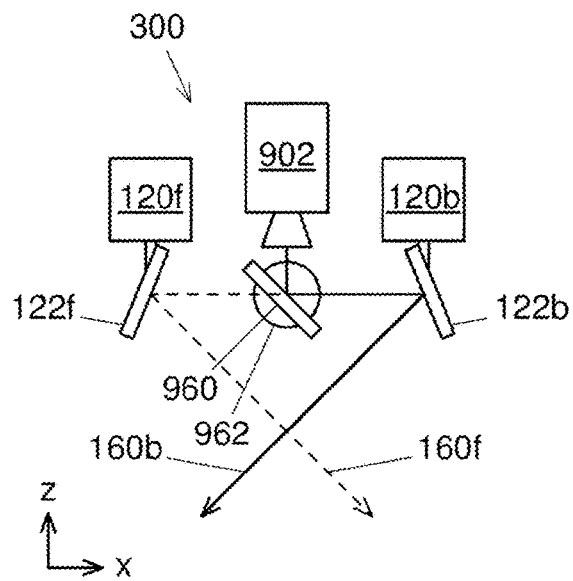

FIG. 38C shows a multiplexed oblique scanning camera with a tilting multiplexing mirror.

Figure 38D:
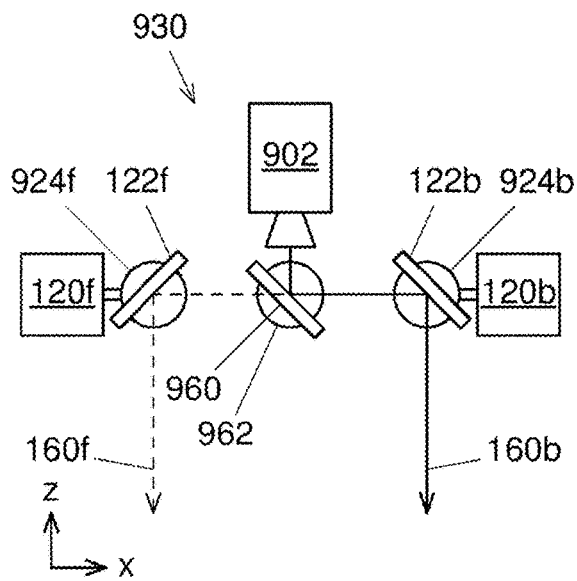

FIG. 38D shows a multiplexed steerable scanning camera with a tilting multiplexing mirror.

Figure 39A:
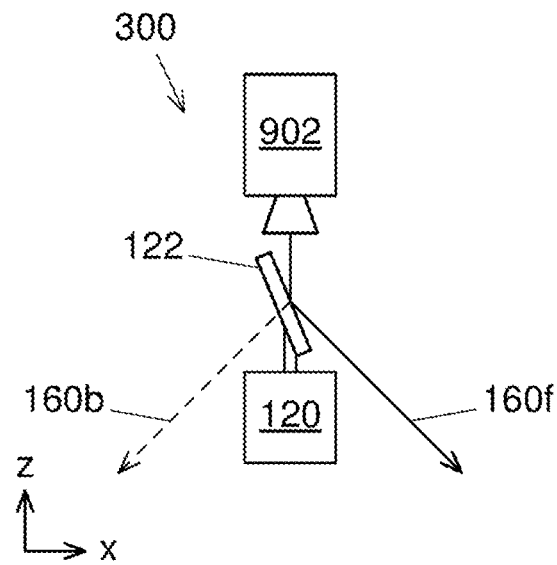

FIG. 39A shows a single-scanner dual-scan oblique scanning camera.

Figure 39B:
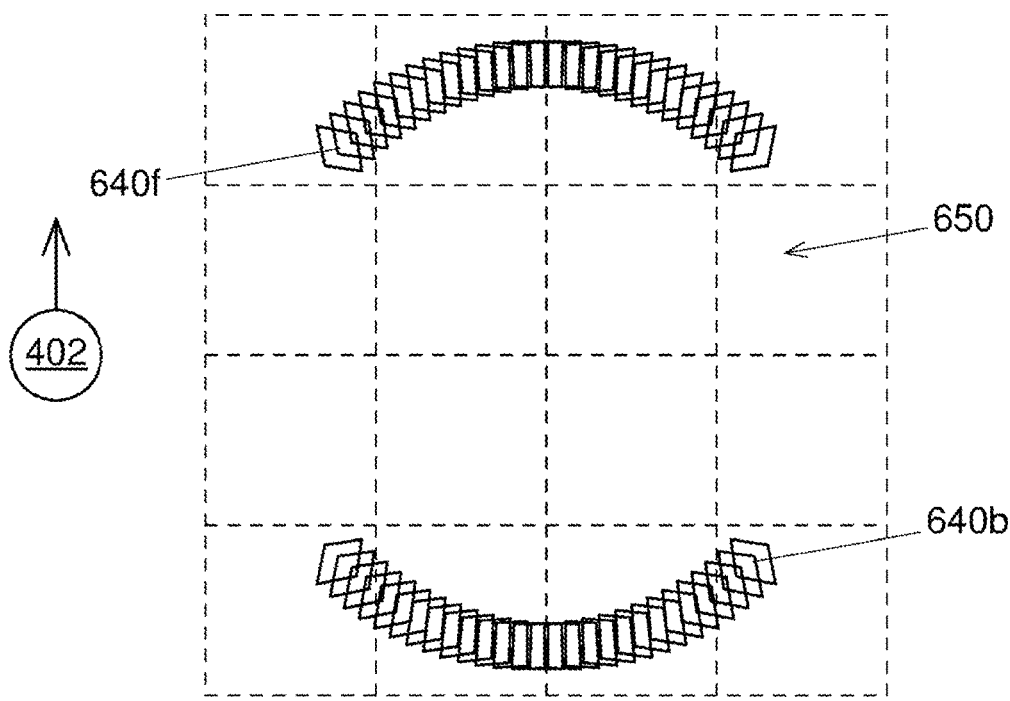

FIG. 39B shows a wide scan field of the single-scanner dual-scan oblique scanning camera.

Figure 40A:
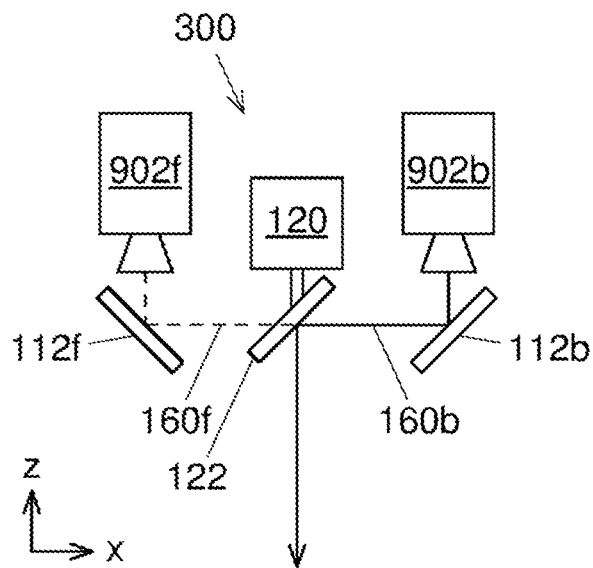

FIG. 40A shows a dual-scan scanning camera with a shared scanner.

Figure 40B:
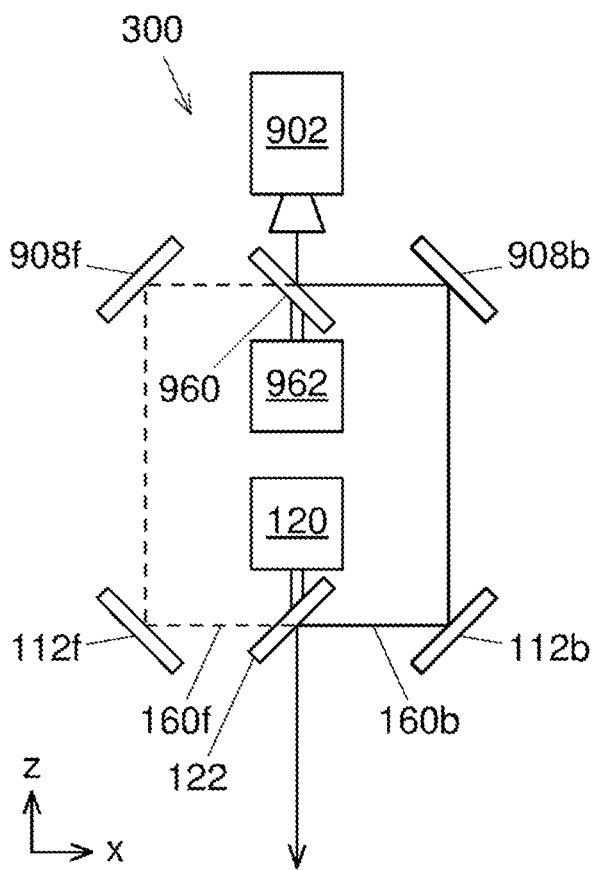

FIG. 40B shows a dual-scan scanning camera with a shared camera and shared scanner.

Figure 41A:
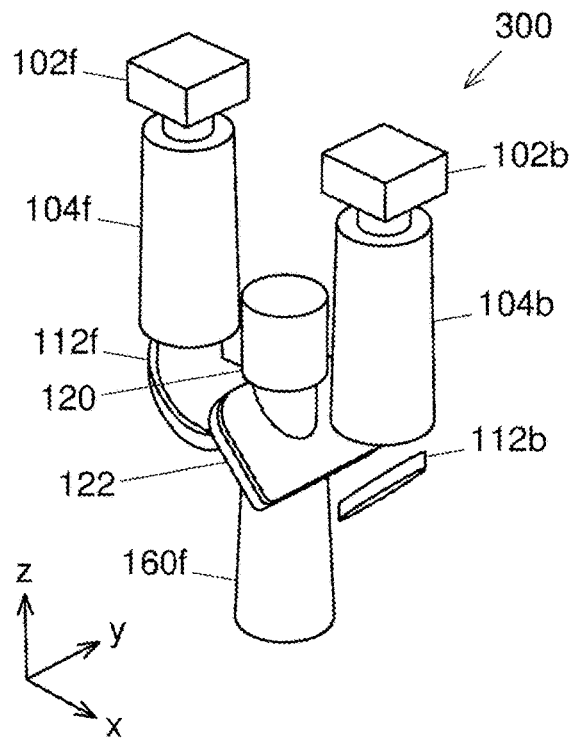

FIG. 41A shows a shared-scanner dual-scan scanning camera during forward imaging.

Figure 41B:
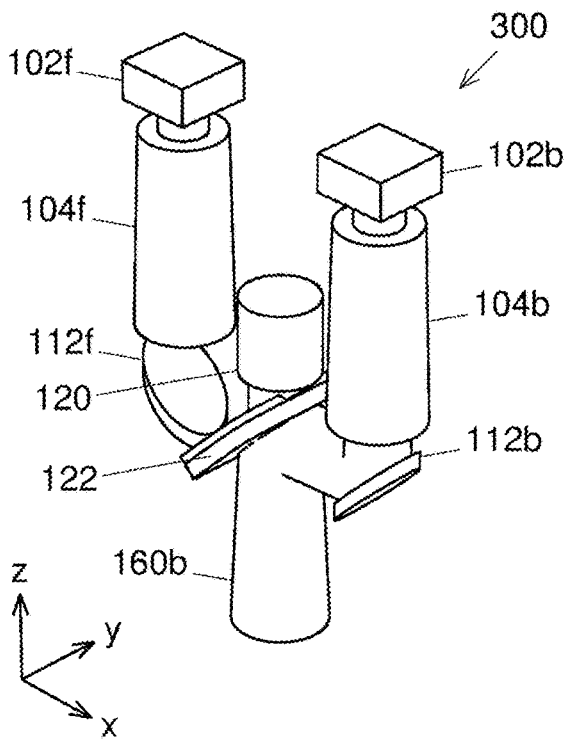

FIG. 41B shows the shared-scanner dual-scan scanning camera during backward imaging.

Figure 41C:
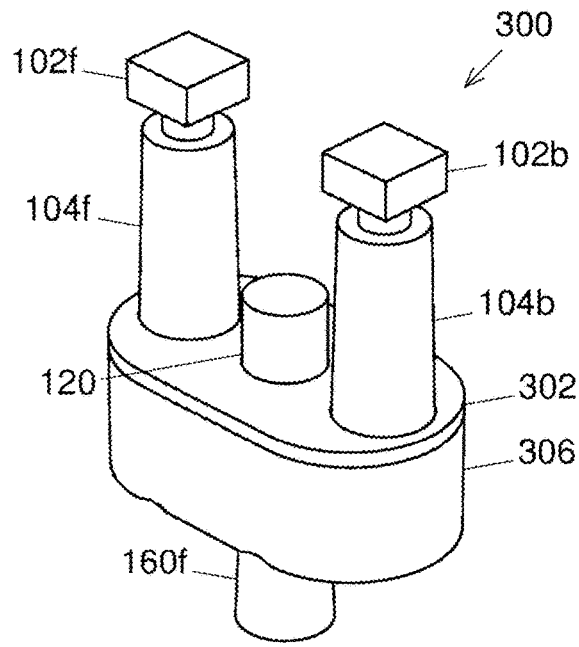

FIG. 41C shows the shared-scanner dual-scan scanning camera with a housing.

Figure 42:
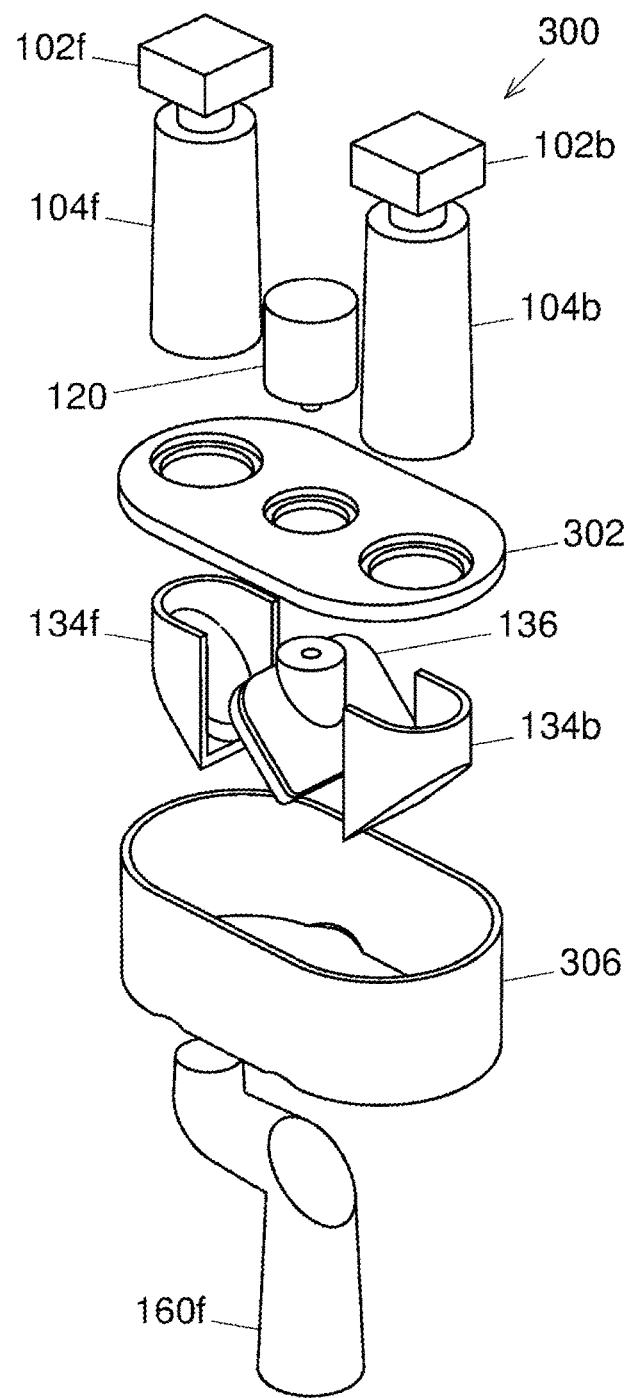

FIG. 42 shows a parts explosion of the shared-scanner dual-scan scanning camera.

Figure 43A:
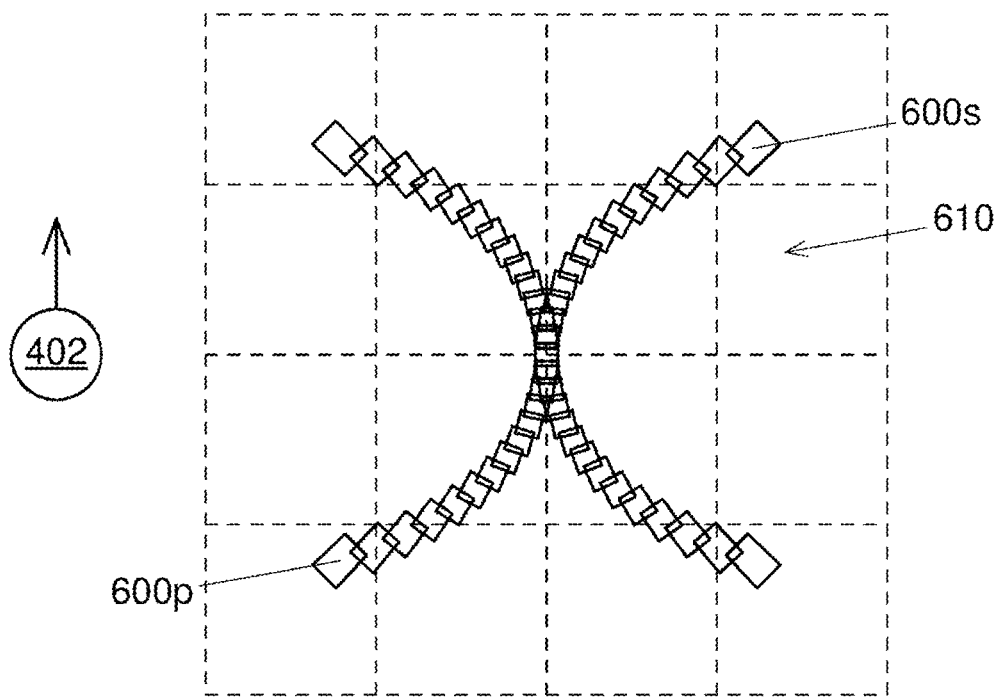

FIG. 43A shows a scan field of a laterally-oriented dual-scan scanning camera.

Figure 43B:
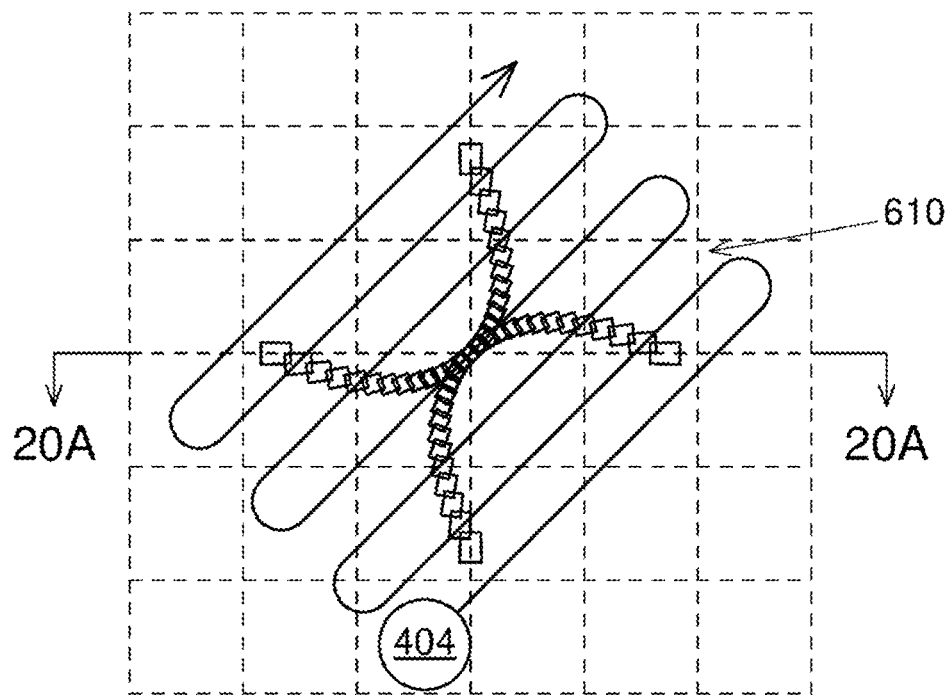

FIG. 43B shows a scan field of the laterally-oriented dual-scan scanning camera, with a 45-degree heading, relative to a multi-line survey path.

Figure 44:
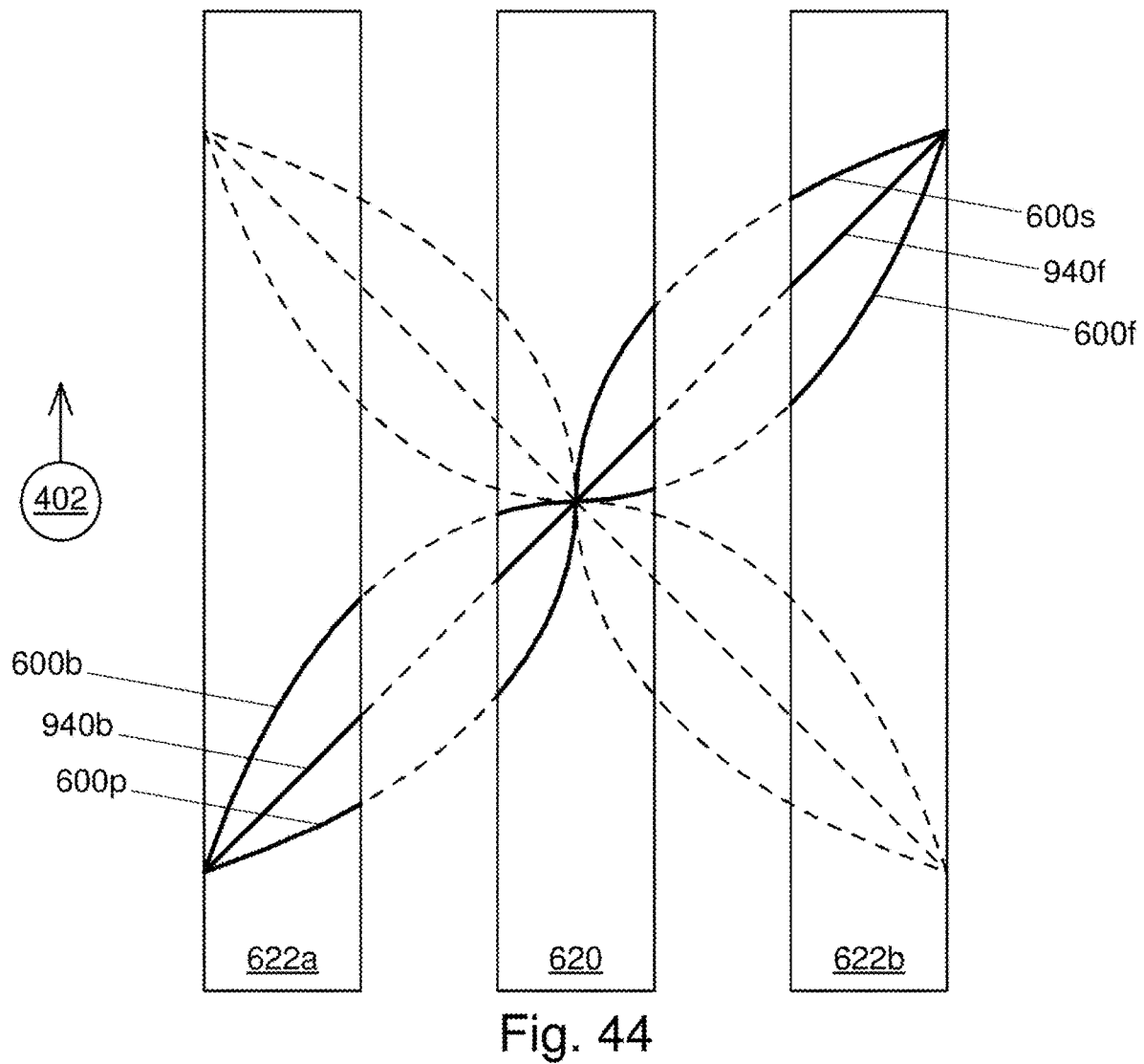

FIG. 44 shows the sub-field contributions of different scan patterns.

Figure 45A:
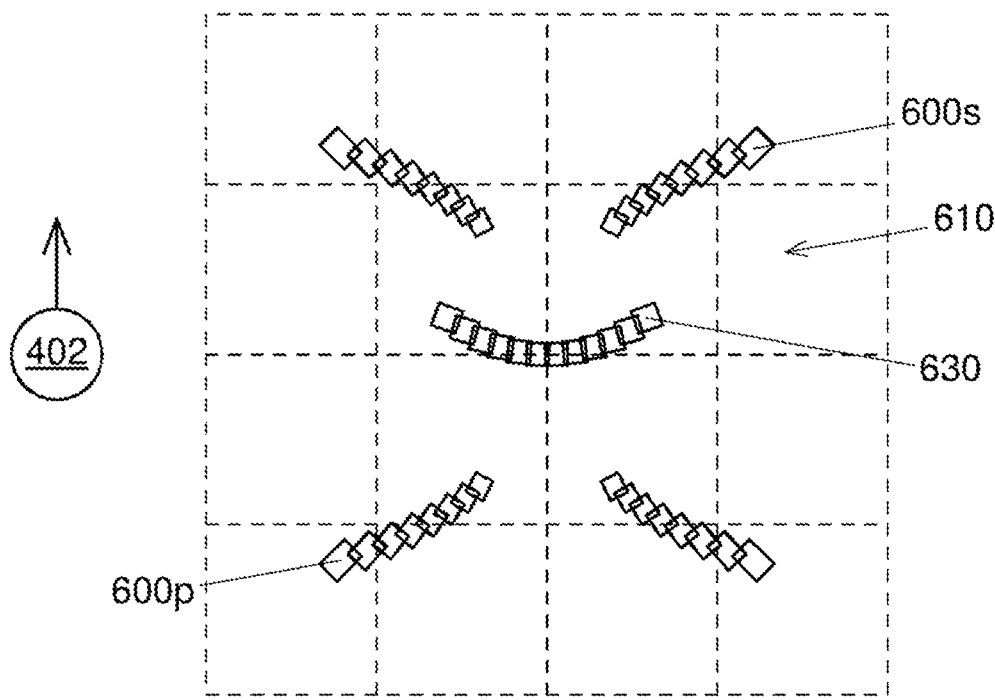

FIG. 45A shows a scan field of a laterally-oriented triple-scan scanning camera.

Figure 45B:
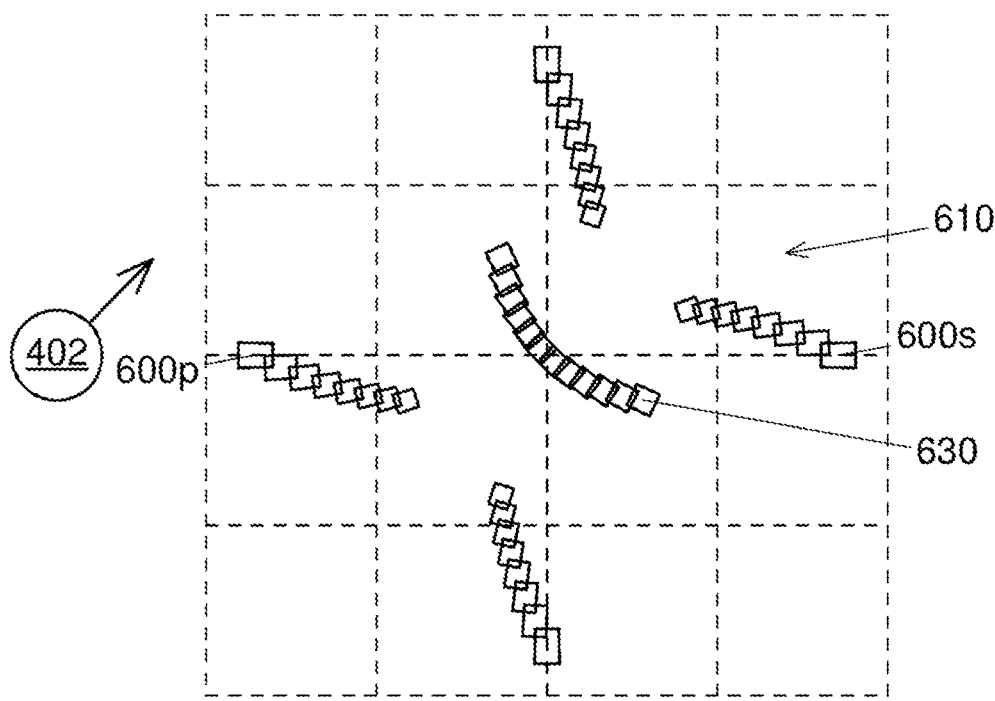

FIG. 45B shows a scan field of the laterally-oriented triple-scan scanning camera with a 45-degree heading.

Figure 46A:
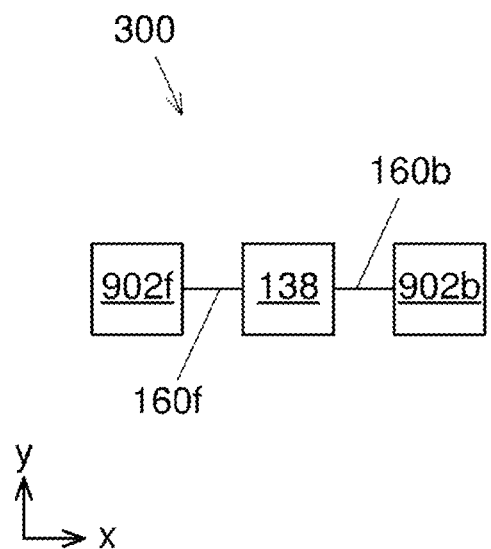

FIG. 46A shows a plan view of a longitudinally-oriented shared-scanner dual-scan scanning camera.

Figure 46B:
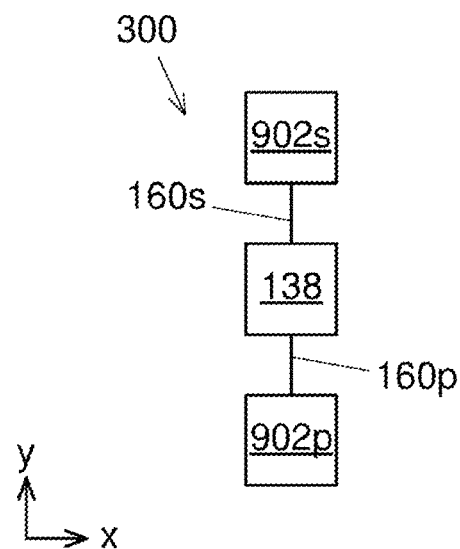

FIG. 46B shows a plan view of a laterally-oriented shared-scanner dual-scan scanning camera.

Figure 46C:
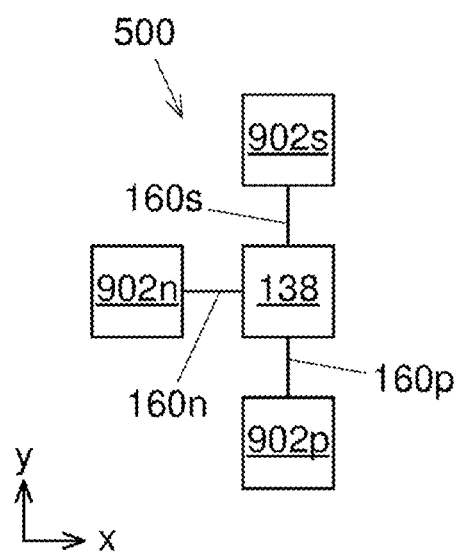

FIG. 46C shows a plan view of a laterally-oriented shared-scanner triple-scan scanning camera.

Figure 46D:
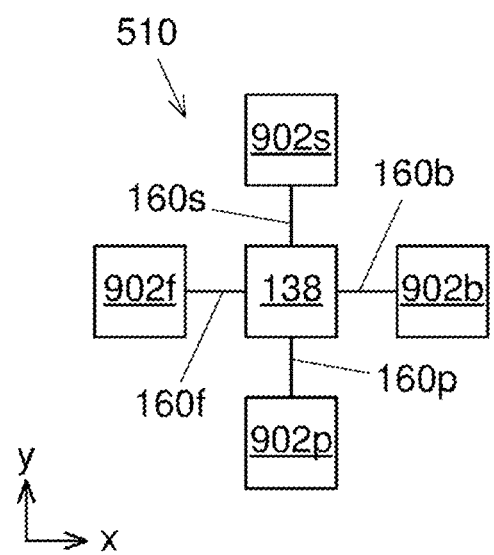

FIG. 46D shows a plan view of a shared-scanner quadruple-scan scanning camera.

DRAWINGS—REFERENCE NUMERALS

100 Scanning camera.
102 Camera.
104 Lens assembly.
106 Camera optical axis.
108 Scanning optical axis.
110 Correction mirror stage.
112 Correction mirror.
114 Correction mirror housing.
120 Scanning mirror drive.
122 Scanning mirror.
124 Scanning mirror mount.
126 Scanning mirror spin axis.
128 Scanning mirror spin angle.
130 Mount plate.
132 Main housing.
134 Correction mirror assembly.
136 Scanning mirror assembly.
138 Scanning assembly.
140 Scanning camera controller.
142 Camera controller.
144 Image sensor.
146 Lens controller.
148 Focusable lens.
150 Scanning camera control & data.
152 Image data.
160 Imaging beam.
162 Sensor field.
164 Chief ray.
166 Aperture.
168 Sensor point.
170 Sensor point beam.
172 Sensor field point.
174 Sensor point beam cross-section.
180 Scan path.
182 Viewing angle.
184 Viewing direction.
200 Flight management system computer.
202 Pilot user interface.
204 Autopilot.
206 Photo storage.
208 GNSS receiver.
210 IMU.
212 AMC platform.
220 Aerial survey control.
222 Wait for start of next flightline.
224 Wait for next capture position.
226 Send scan start signal.
230 Scanning camera control.
232 Wait for scan start signal.
234 Capture image.

236 Rotate scanning mirror.
238 Reset scanning mirror.
300 Dual-scan scanning camera.
302 Dual-scan mount plate.
304 Mount rod.
306 Dual-scan main housing.
400 Survey aircraft.
402 Survey aircraft heading.
404 Survey path.
406 Second-pass survey path.
500 Triple-scan scanning camera.
510 Quadruple-scan scanning camera.
600 Scan field.
610 Dual scan field.
620 Nadir sub-field.
622 Oblique sub-field.
630 Nadir scan field.
640 Oblique scan field.
650 Dual oblique scan field.
700 Camera mount.
702 Vibration isolator.
800 Photos.
802 GNSS positions.
804 IMU orientations.
806 Scan directions.
808 Estimate photo positions & orientations.
810 Positions & orientations.
812 Reconstruct 3D surface.
814 Textured 3D surface.
900 Linear scanning camera.
902 Camera assembly.
904 Scanning camera drive.
906 Scanning camera spin axis.
908 Fixed mirror.
910 Linear scan field.
912 Crossed linear scan field.
920 Steerable scanning camera.
922 Tilting mirror.
924 Tilting mirror drive.
926 Tilted imaging beam.
930 Dual-scan steerable scanning camera.
940 Shaped scan field.
950 Dual shaped scan field.
960 Multiplexing mirror.
962 Multiplexing mirror drive.

DETAILED DESCRIPTION OF PREFERRED EMBODIMENTS

Figure 1A:
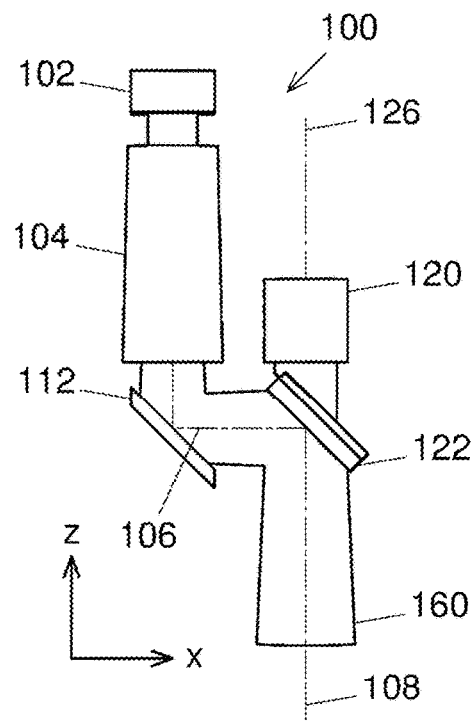
FIG. 1A shows a right side elevation of a scanning camera.
Figure 1B:
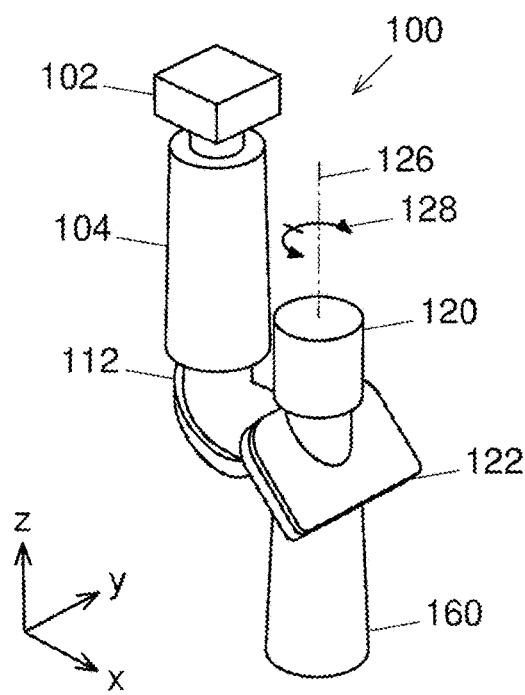
FIG. 1B shows a perspective view of the scanning camera.

FIGS. 1A and 1B show an embodiment of a scanning camera 100 according to one aspect of the present invention. The scanning camera 100 comprises a camera 102, lens assembly 104, correction mirror 112, scanning mirror drive 120, and scanning mirror 122. The scanning mirror 122 is coupled to the scanning mirror drive 120 via a scanning mirror mount 124. The scanning camera module 100 is configured to scan an imaging beam 160 across an area of interest by rotating the scanning mirror 122 about a spin axis 126. The rotation is defined by a spin angle 128.

The optical axis of the scanning camera 100, i.e. the axis of the imaging beam 160, is referred to as the camera optical axis 106 between the lens assembly 104 and the scanning mirror 122, and as the scanning optical axis 108 between the scanning mirror 122 and the object plane within the area of interest.

Figure 1C:
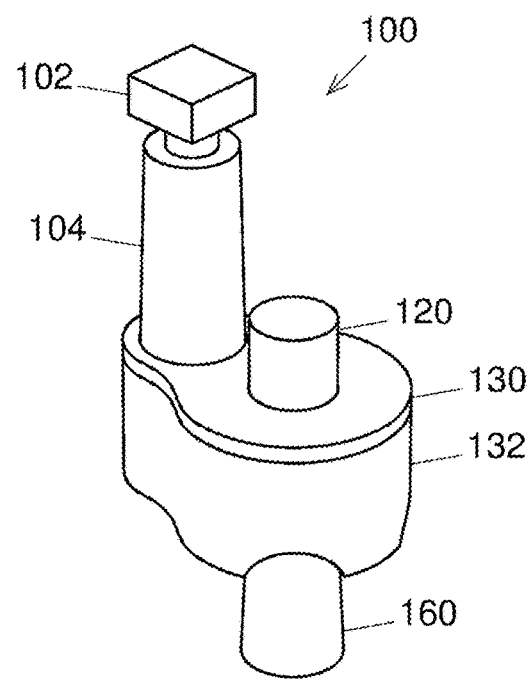
FIG. 1C shows the scanning camera with a housing.

FIG. 1C shows the scanning camera 100 with a mount plate 130 supporting the lens assembly 104 and the scanning mirror drive 120, and a protective housing 132. Cutaways in the lower edge of the housing 132 accommodate the imaging beam 160 at extreme spin angles.

Figure 2:
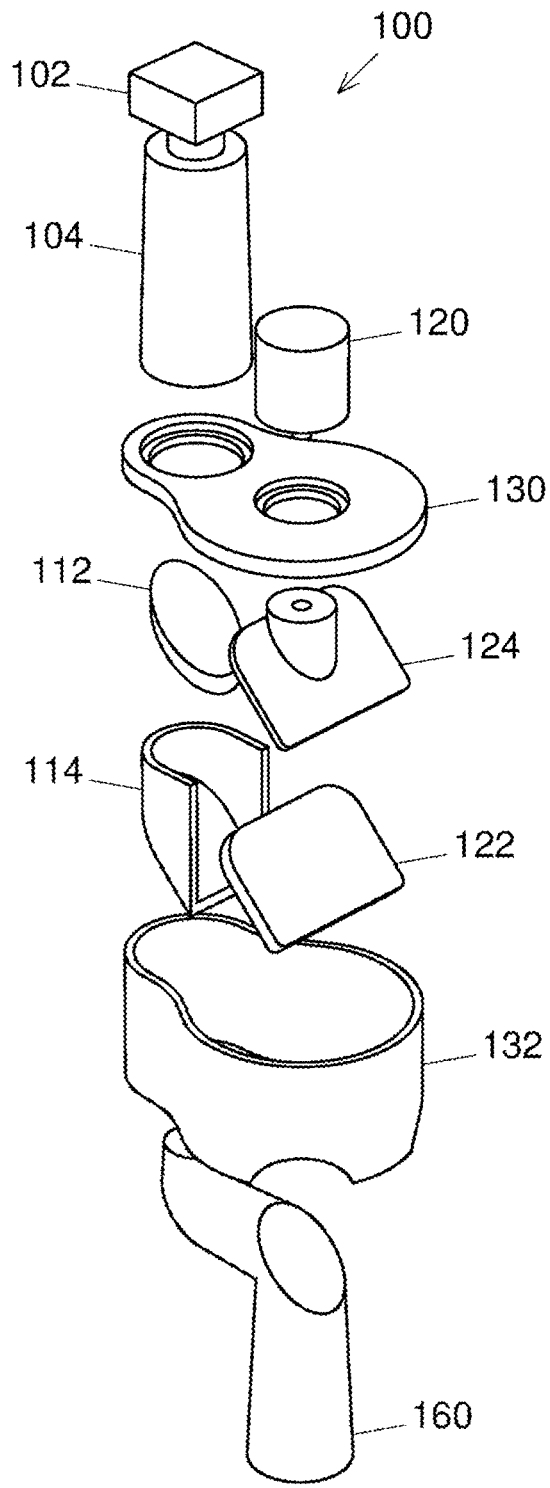
FIG. 2 shows a parts explosion of the scanning camera.

FIG. 2 shows a parts explosion of the scanning camera 100.

Figure 3:
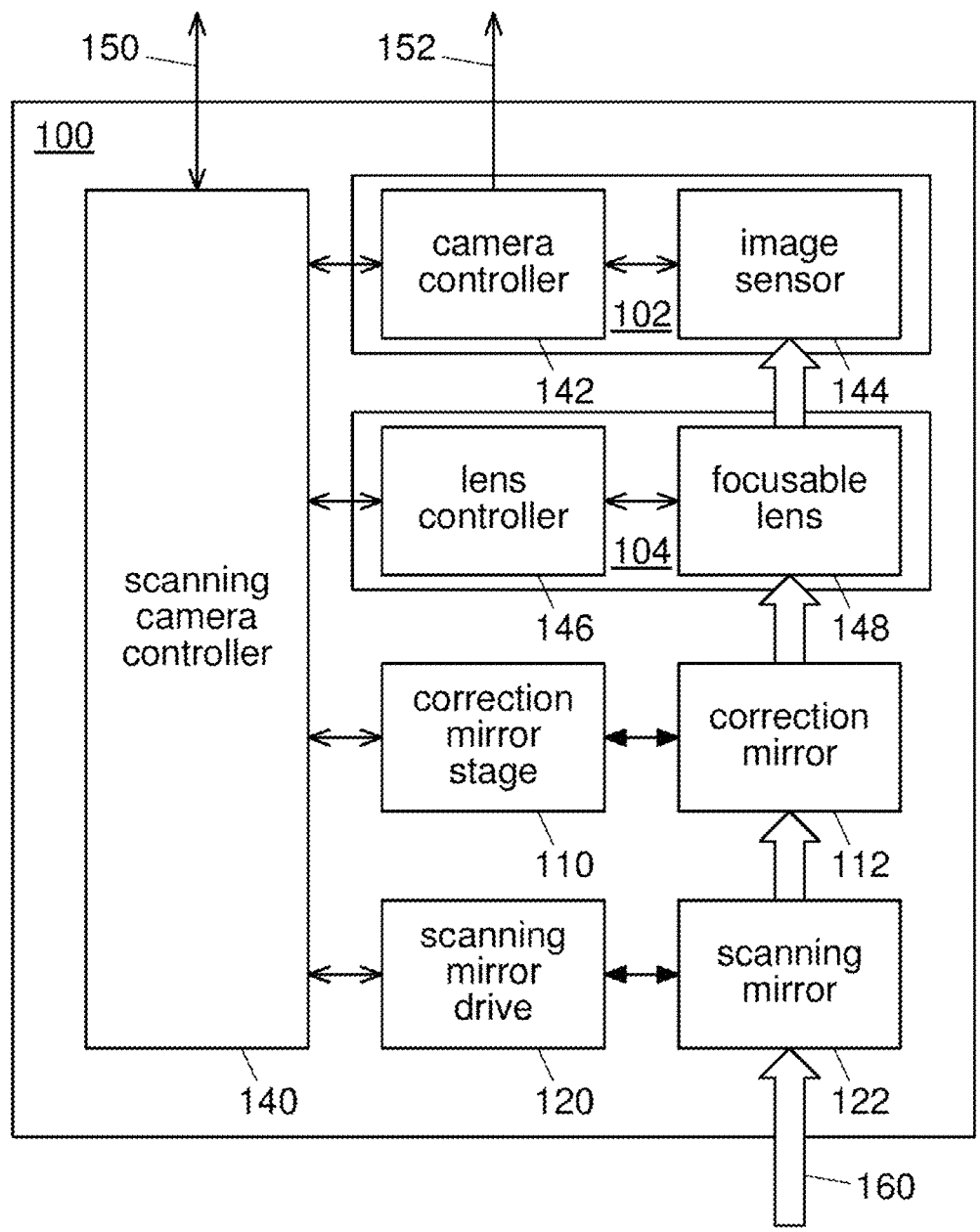
FIG. 3 shows a block diagram of the scanning camera.

FIG. 3 shows a block diagram of the scanning camera 100. Open arrowheads denote control & data interconnects. Solid arrowheads denote mechanical couplings. Large arrows denote optical flow. The camera 102 comprises a camera controller 142 and an image sensor 144 controlled by the camera controller 142. The lens assembly 104 optionally comprises a lens controller 146 and an electronically focusable lens 148 controlled by the lens controller 146. The lens 148 may alternatively be manually or factory focused (and the lens controller 146 omitted). An optional correction mirror stage 110 (not shown in FIG. 1A or 1B) effects rotation of correction mirror 112 about one or more axes to effect forward motion correction (FMC) and/or angular motion correction (AMC) of the scanning camera 100. The correction mirror 112 may alternatively be fixed (and the correction mirror stage 110 omitted). The scanning mirror drive 120 effects rotation of the scanning mirror 122 about the spin axis 126. A scanning camera controller 140 controls the camera controller 142, lens controller 146, correction mirror stage 110 and scanning mirror drive 120. The scanning camera controller 140 is responsive to instructions from a controlling system via control & data interconnect 150. It returns image data captured by the image sensor 144, and associated data, to the controlling system via interconnect 150. Alternatively, the camera controller 142 may return image data via a separate interconnect 152.

When the correction mirror 112 is fixed its primary purpose is to bend the camera optical axis 106 by 90 degrees to allow the lens assembly 104 (and camera 102) to be conveniently mounted vertically rather than horizontally. If this mounting option is not required then the correction mirror 112 may be omitted, with the scanning mirror then reflecting the imaging beam 160 directly into the lens assembly 104 rather than indirectly via the correction mirror 112. An example of this is discussed later in this specification with reference to FIG. 26C.

Figure 4A:
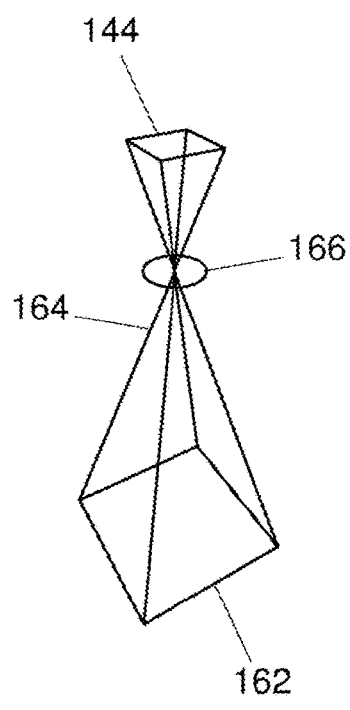
FIG. 4A shows the relationship between the image sensor and the sensor field.
Figure 4B:
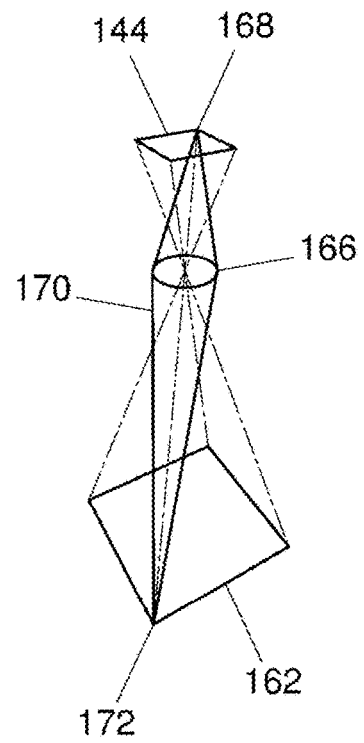
FIG. 4B shows the structure of a sensor point beam.

FIG. 4A shows the relationship between the image sensor 144 and its corresponding sensor field 162 in the object plane (which typically coincides with the ground). The extent of the sensor field 162 is defined by the four chief rays 164 from the corners of the image sensor 144 through the center of the aperture 166 of the lens 148. FIG. 4B shows, for a single illustrative point 168 on the image sensor 144, the corresponding sensor point beam 170. The sensor point beam 170 comprises all rays from the sensor point 168 through the aperture 166 and focused at a corresponding field point 172 in the object plane.

Figure 4C:
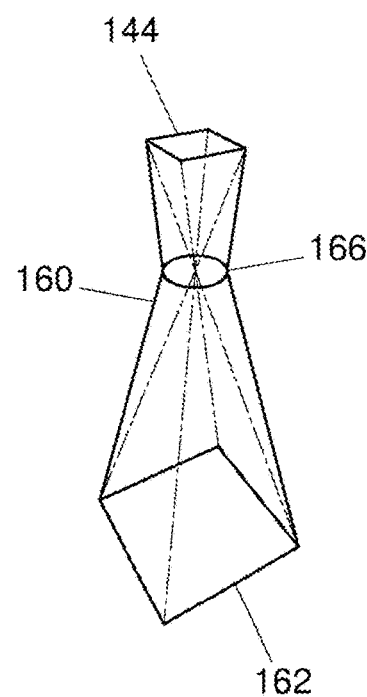
FIG. 4C shows the structure of the imaging beam.

FIG. 4C shows the structure of the imaging beam 160, which comprises the sum of all sensor point beams 170 from all points 168 on the image sensor 144. The cross-section of the imaging beam 160 is image-sensor-shaped (i.e. rectangular) at the image sensor 144 and at the sensor field 162, aperture-shaped (e.g. polygonal or circular) at the aperture 166, and an intermediate shape at intermediate points along the imaging beam 160.

Referring to the coordinate axes shown in FIGS. 1A and 1B, the longitudinal axis of the scanning camera 100 is the x axis, the lateral axis is the y axis, and the vertical axis is the z axis. In one exemplary configuration of the scanning camera 100, as shown in FIGS. 1A and 1B, and FIGS. 5A through 5C, the spin axis 126 is vertical; the lens assembly 104 is mounted vertically and pointing down; the scanning mirror 122 is mounted at 45 degrees to the spin axis 126, facing backward in the direction of the correction mirror 112 when the spin angle 128 is zero (defined relative to the negative x axis); and the correction mirror 112 is mounted at 45 degrees to the camera optical axis 106, immediately below the lens assembly 104. Thus, the vertical camera optical axis 106 is reflected horizontally by the correction mirror 112, and, when the spin angle 128 is zero, is reflected vertically again by the scanning mirror 122 to become the (nadir) scanning optical axis 108. In the opposite direction, i.e. for incoming light, a vertical (nadir) imaging beam 160 is reflected horizontally by the scanning mirror 122 onto the correction mirror 112, and is reflected vertically again by the correction mirror 112 into the lens assembly 104.

The scanning mirror drive 120 is configured to rotate the scanning mirror 122 about the spin axis 126. As shown in FIGS. 5D through 5F, when the scanning mirror 122 is rotated away from facing the correction mirror 112, i.e. with a positive spin angle 128, the imaging beam 160 is deflected both laterally and longitudinally.

A vertically-oriented spin axis 126 differs from prior-art scanning cameras where the spin axis is typically horizontally-oriented to effect linear side-to-side scanning. See for example Patel (U.S. Pat. No. 5,550,669, "Flexure design for a fast steering scanning mirror).

Figure 6:
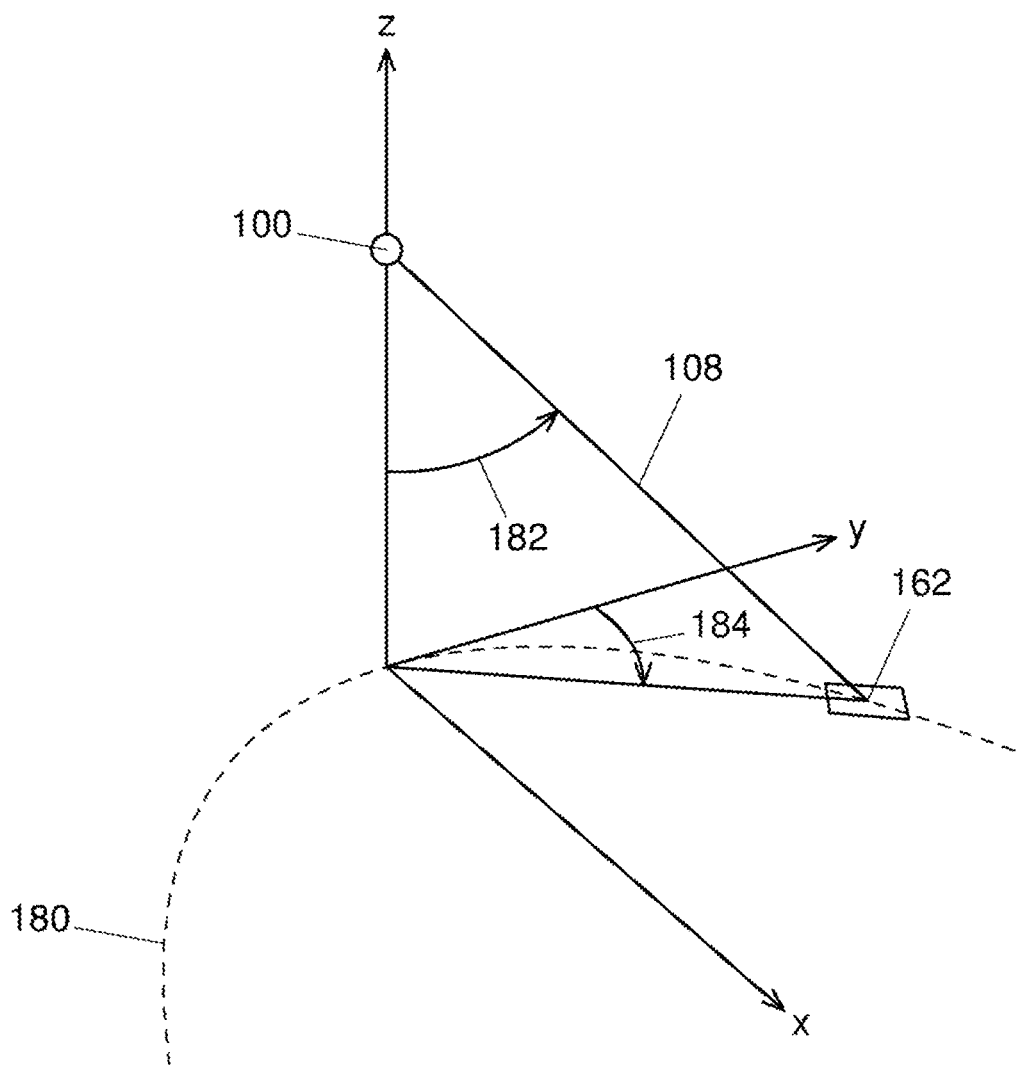
FIG. 6 shows the scanning camera imaging geometry for a single scan position.

FIG. 6 shows the imaging geometry of the scanning camera 100. For a particular spin angle 128, the scanning optical axis 108 (i.e. the pointing direction of the imaging beam 160) is defined by a viewing angle 182 relative to the negative z axis, and a viewing direction 184 relative to the positive or negative y axis (depending on the sign of the spin angle 128). The position and orientation of the sensor field 162 on the ground is therefore likewise determined. As the spin angle 128 of the scanning mirror 122 is varied from a negative extreme to a positive extreme, the scanning optical axis 108 traces out a curved scan path 180 on the ground.

Scanning cameras are typically designed to trace out a linear scan path, i.e. where the viewing direction is fixed throughout the scan (except where it switches direction as the scan passes through the nadir point). However, a curved scan path 180 has specific advantages that are discussed later in this specification.

The curved scan path 180 may be flattened by changing the fixed tilt of the spin axis 126, i.e. away from a purely vertical orientation towards a horizontal orientation. As the spin axis 126 approaches a purely horizontal orientation the scan path 180 becomes increasingly straight.

The viewing angle 182 at zero spin can be varied by changing the angle at which the scanning mirror 122 is mounted relative to the spin axis 126.

For the illustrative configuration of the scanning camera 100 described above, where both the correction mirror 112 and scanning mirror 122 are tilted at 45 degrees to the z axis, the viewing angle 182 equals the absolute value of the spin angle 128, and the viewing direction 184 equals the spin angle 128.

At a spin angle 128 of 45 degrees, the viewing angle 182 and the viewing direction 184 are therefore both conveniently 45 degrees, which is ideal for oblique imaging. If the spin angle is varied from minus 45 degrees to plus 45 degrees, the viewing angle varies from 45 degrees to zero to 45 degrees, and the viewing direction varies from minus 45 degrees to plus 45 degrees.

Commercial uses of oblique imagery typically desire a viewing angle 182 of 40 to 45 degrees, although any significantly off-nadir viewing angle 182, even if less than 40 degrees, may be termed oblique.

Since the spin of the scanning mirror 122 is used to effect scanning of the imaging beam 160, the spin range of the scanning mirror 122 is referred as the scan range of the scanning camera 100.

In one illustrative configuration of the scanning camera 100, the image sensor 144 is an ON Semiconductor PYTHON 25K with 5120×5120 square 4.5 um pixels, the lens 148 has a focal length of 300 mm, and the scan range is a symmetric 90 degrees (i.e. corresponding to a spin angle of minus 45 degrees through plus 45 degrees).

Figure 7A:
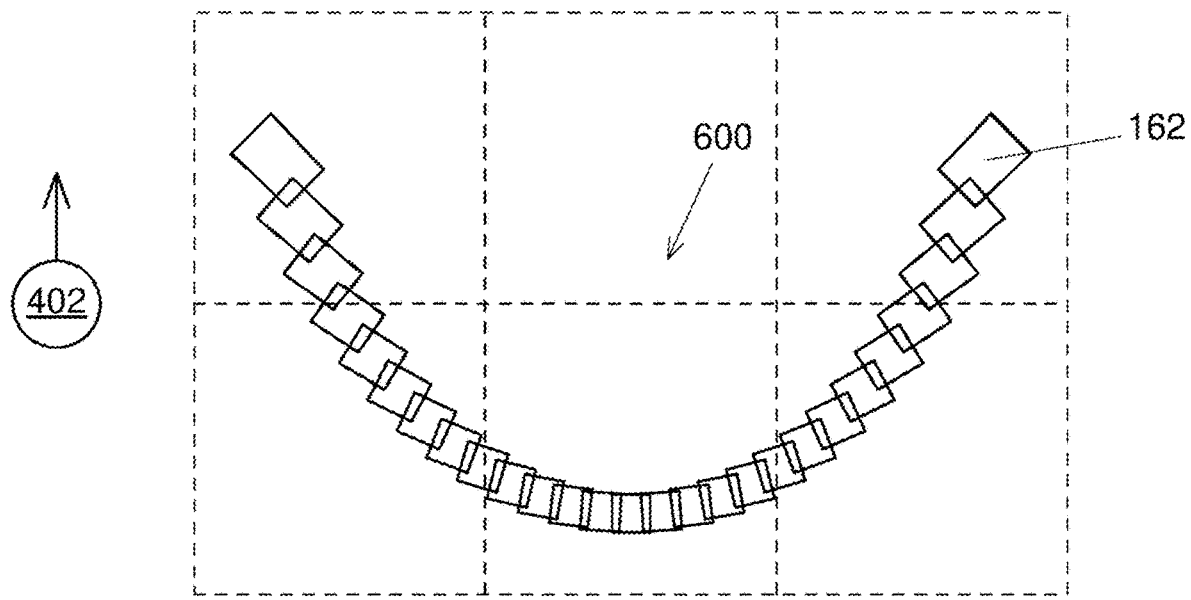
FIG. 7A shows a scan field of the scanning camera.

FIG. 7A shows a scan field 600 of the illustrative scanning camera 100 operated at an altitude of 14,000 feet. It consists of 27 overlapping sensor fields 162 on the ground. The grid spacing in FIG. 7A and throughout the figures is 2.5 km. The longitudinal axis of the scanning camera 100 is aligned with the survey aircraft heading 402, and the scanning camera 100 is facing forward.

Figure 7B:
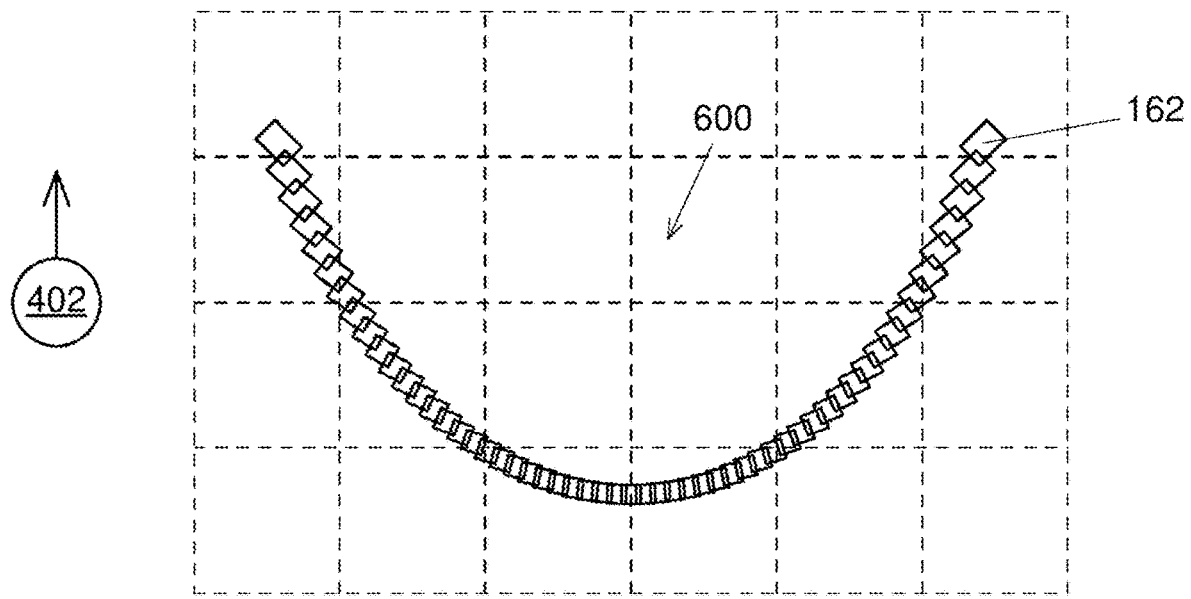
FIG. 7B shows the scan field of the scanning camera from a higher altitude.

FIG. 7B shows a scan field 600 of the illustrative scanning camera 100 operated at an altitude of 28,000 feet. It consists of 55 overlapping sensor fields 162 on the ground.

The required size and shape of the scanning mirror 122 is determined by the intersection of the imaging beam 160 with the face of the scanning mirror 122. This in turn is determined by the maximum spin angle supported by a particular scanning camera 100, and the size and shape of the imaging beam 160. As discussed in relation to FIGS. 4A through 4C, the imaging beam 160 comprises the sum of all sensor point beams 170 from all points 168 on the image sensor 144. It is thus determined by the size of the image sensor 144, the focal length of the lens 148, and the diameter of the aperture 166. It is also affected by the spacing of the aperture 166, correction mirror 112, and scanning mirror 122. The illustrative scanning camera 100 has an aperture 166 with a diameter of 75 mm (i.e. it has an f-number of f/4).

Although the imaging beam 160 comprises the sum of all sensor point beams 170, its maximum width is determined by the four sensor point beams 170 from the four corners of the image sensor 144. For analysis purposes the imaging beam 160 may therefore be represented by those four corner sensor point beams 170. And although the scanning mirror 122 must reflect the imaging beam 160 throughout the scan range, its maximum width is determined by the imaging beams 160 at the two extremes of the scan range.

Figure 8A:
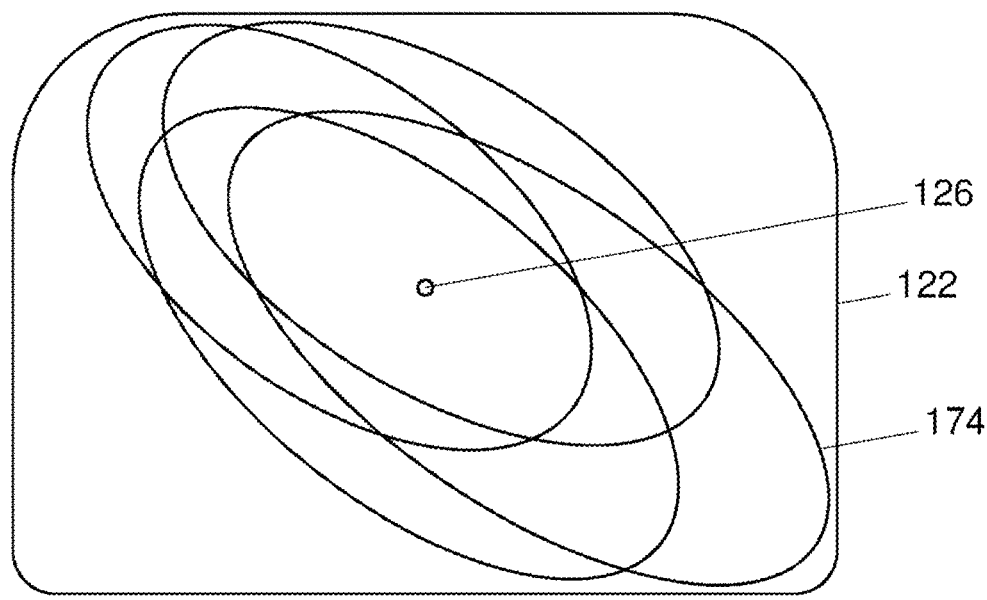
FIG. 8A shows the intersection of corner sensor point beams with the scanning mirror of the scanning camera at an extreme spin angle.
Figure 8B:
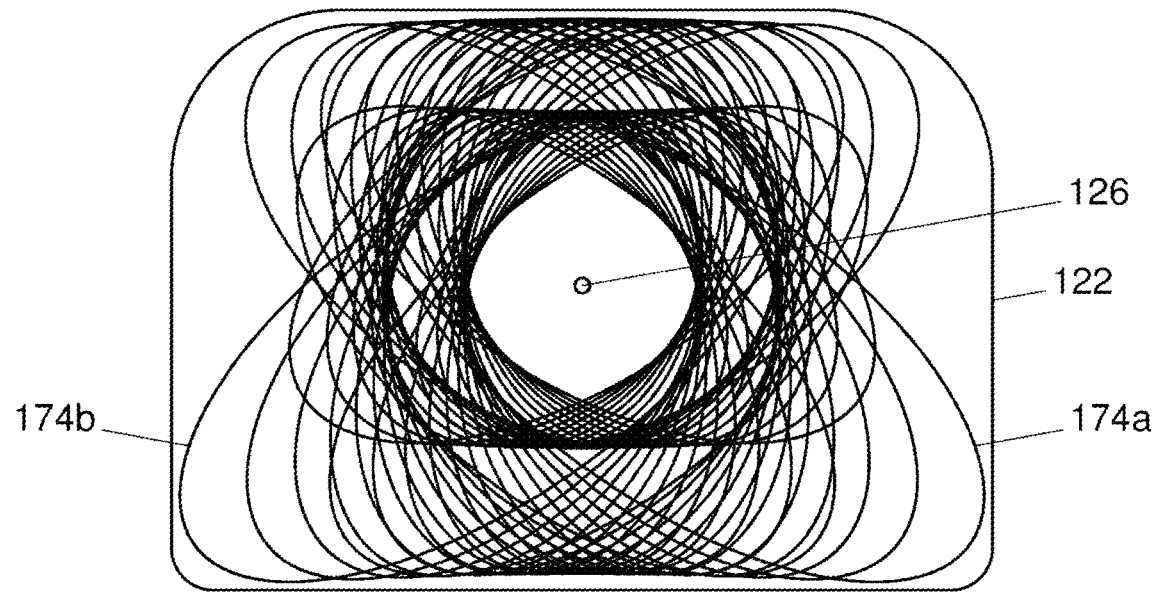
FIG. 8B shows the intersection of corner sensor point beams with the scanning mirror of the scanning camera through a full scan range.

FIG. 8A shows the intersection 174 of each of the four corner sensor point beams 170 with the scanning mirror 122 at the maximum spin angle of 45 degrees, determined by ray tracing. FIG. 8B shows the intersection 174 of each of the four corner sensor point beams 170 with the scanning mirror 122 throughout the full scan range. The figures illustrate how the required width of the mirror is determined by the sensor point beams 170 at the extreme ends of the scan range, and the required height of the mirror is almost uniformly determined by sensor point beams 170 throughout the scan range. Note that the shape of the scanning mirror 122 is symmetric horizontally about the spin axis 126, but is offset downwards relative to the spin axis.

Although illustrated with reference to a set of specific parameters, the mechanical design of the scanning camera 100 can be adapted to any desired set of parameters without affecting its intrinsic design. This includes a larger or smaller image sensor, focal length, aperture, and scan range.

Figure 9A:
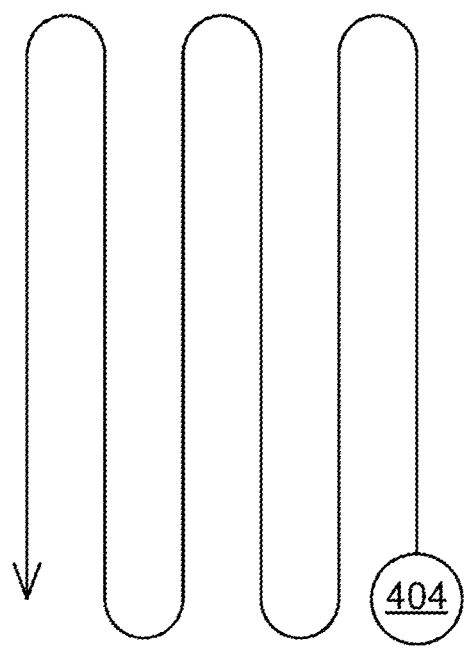
FIG. 9A shows a flight path of a survey aircraft during one pass of an aerial survey.

An aerial camera has a finite capture field, such as the scan field 600 of the scanning camera 100. The usual aim of an aerial survey is to fully capture images of the ground within a chosen survey area, and this is normally accomplished by flying a survey aircraft 400 along a serpentine path 404 consisting of a sequence of parallel flightlines linked by turns, as shown in FIG. 9A. The flightline spacing is chosen to ensure overlap between the capture fields of adjacent flightlines.

Figure 9B:
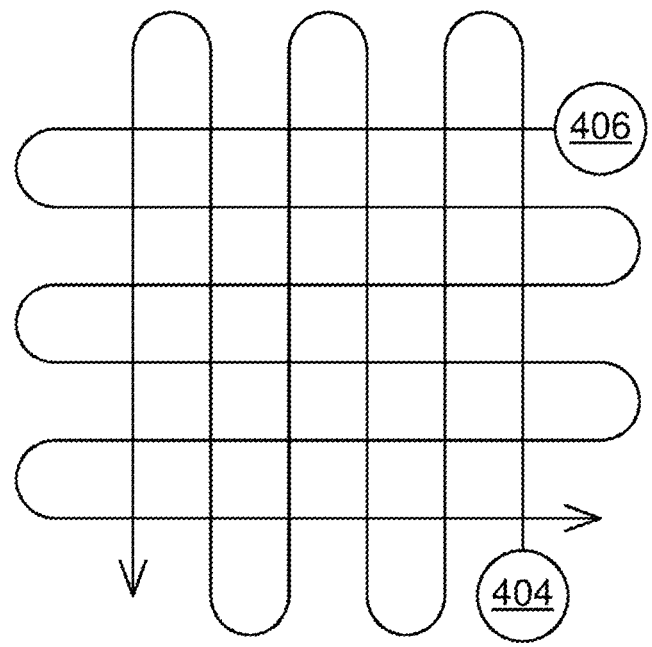
FIG. 9B shows a flight path of a survey aircraft during two orthogonal passes of an aerial survey.

When certain views, such as oblique views, are best captured with the aircraft flying in a particular direction, a survey may be accomplished by flying two orthogonal passes of the survey area, as shown in FIG. 9B.

Figure 10:
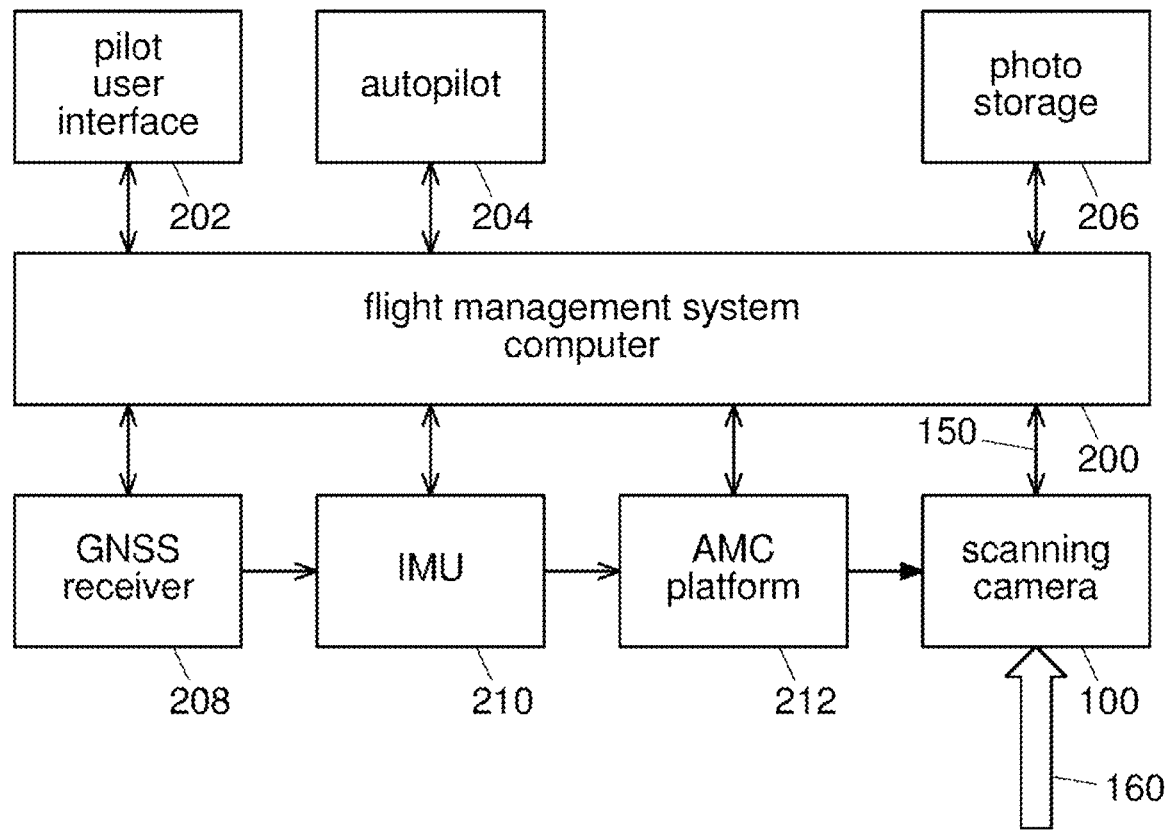
FIG. 10 shows a block diagram of an aerial imaging system incorporating the scanning camera.

FIG. 10 shows a block diagram of an aerial imaging system incorporating the scanning camera 100. A flight management system (FMS) computer 200 runs FMS software that manages the flight of the survey aircraft 400 along a survey path 404, and controls the operation of the scanning camera 100 to ensure capture of the survey area. Based on a stored survey plan, the FMS may issue guidance to a pilot via a pilot user interface 202, and/or may automatically guide the aircraft via an autopilot 204. The FMS receives 3D position data from a Global Navigation Satellite System (GNSS) receiver 208, and 3D orientation data from an Inertial Measurement Unit (IMU) 210. The system optionally includes an Angular Motion Correction (AMC) platform 212 that corrects for angular motion of the survey aircraft in one or more dimensions. The AMC platform 212 is responsive to orientation changes reported by the IMU 210. The scanning camera 100 is mounted on the AMC platform 212 to ensure its imaging beam 160 points in a consistent direction, to avoid gaps between successive (and adjacent) scan fields, while minimizing the required nominal overlap. The IMU 210 may be mounted on the AMC platform 212 so that it directly reports the orientation of the scanning camera 100. If the IMU 210 is not mounted on the AMC platform 212 then the orientation of the scanning camera 100 may be inferred by the FMS from the orientation reported by the IMU 210 and any angular correction reported by the AMC platform 212. The FMS receives photos and associated data from the scanning camera 100 which it stores in attached photo storage 206.

Angular motion correction may be provided by the AMC platform 212 and the correction mirror 112 in unison. For example, the AMC platform 212 may provide yaw correction and the correction mirror 112 may provide pitch and roll correction; or they may each provide partial pitch and roll correction; or the correction mirror 112 may be used only for correcting for forward movement of the aircraft (i.e. FMC), and/or for movement of the scanning mirror 122, during the exposure period of the image sensor 144. FMC, if required, may alternatively be provided by any suitable mechanism, including time delay integration (TDI) in the image sensor 144, or compensating movement of the image sensor.

Figure 11:
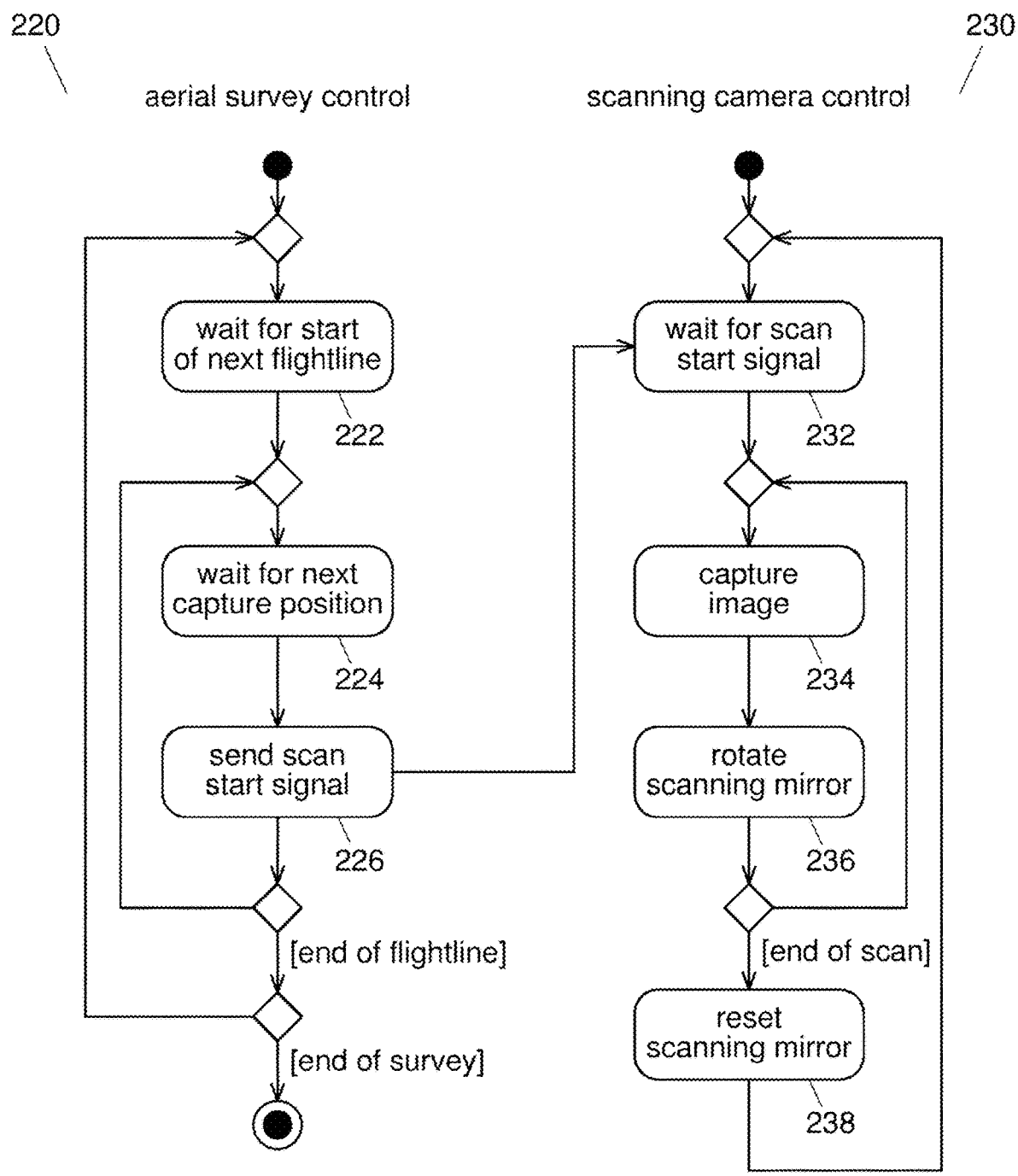
FIG. 11 shows an activity diagram for an aerial survey control algorithm and scanning camera control algorithm.

FIG. 11 shows an activity diagram for an aerial survey control process 220 and scanning camera control process 230 that may be run on the FMS computer 200 and scanning camera controller 140 respectively.

The aerial survey control process 220 controls capture of images along each flightline in the stored survey plan. At the start of each flightline, either at the start of the survey or after a turnaround between flightlines, it waits (at step 222) until the aircraft is at the start of the flightline. For each capture position along the flightline the process waits (at step 224) until the aircraft is at the capture position, sends (at step 226) a scan start signal to the scanning camera control process 230, and then repeats. At the end of a flightline the process returns to waiting for the start of the next flightline. At the end of the last flightline the process exits.

The survey control process 220 calculates each capture position based on the previous capture position, the longitudinal extent of the scan field, and the desired longitudinal overlap between successive scan fields. It may also take into account the orientation of the aircraft reported by the IMU 210, if this is not fully corrected by AMC, to ensure overlap between successive scan fields. It monitors the position of the aircraft via the GNSS receiver 208.

The scanning camera control process 230 waits (at step 232) for a scan start signal from the aerial survey control process 220, and then controls capture of images at each spin angle within the scan. At each spin angle 128 it captures an image (at step 234) via the image sensor 144 via the camera controller 142, rotates the scanning mirror 122 (at step 236) to the next spin angle via the scanning mirror drive 120, and then repeats. At the end of the scan, i.e. when the scan range is exhausted, the process optionally resets the scanning mirror 122 (at step 238) to its starting spin angle, and then returns to waiting for the next scan start signal. To avoid having to reset the scanning mirror at the end of each scan, the process may alternatively scan bidirectionally, i.e. in one direction on even-numbered scans and in the opposite direction on odd-numbered scans.

The scanning camera controller 140 may monitor the focus and exposure of captured images and adjust the focus and aperture of the focusable lens 148 via the lens controller 146 to compensate for any deviation from ideal focus or exposure. It may also adjust image exposure by adjusting the exposure time of the image sensor 144. It may also use exposure bracketing to capture imagery with a wider dynamic range.

The distribution of control functions within the scanning camera 100 is described in the foregoing with reference to a possible embodiment, but it should be clear that control functions could be distributed differently across the FMS computer 200, scanning camera controller 140, camera controller 142, and lens controller 146 to achieve the same effect. For example, a controller may be omitted and its functions performed by another of the controllers or the computer.

The camera controller 142, if returning image data via a separate interconnect 152, may utilize a high-speed communication standard such as CoaXPress (CXP).

The camera 102 may be a commercial off-the-shelf (COTS) machine vision camera that incorporates the desired high-speed image sensor 144. For the illustrative PYTHON 25K image sensor 144, the camera 102 may, for example, be an Adimec S-25A80 which supports output at the full frame rate of the PYTHON 25K image sensor 144 over a CXP interconnect 152.

Although the illustrative image sensor 144 is an RGB image sensor, monochrome, near infrared and multi-spectral image sensing may also be utilized.

The lens assembly 104 may be a COTS lens, such as a high-performance dioptric (refractive) prime lens incorporating multiple lens elements and providing motorized focus and aperture adjustment. For longer focal lengths a catoptric (reflective) telescope lens may be used, or a hybrid catadioptric lens.

The correction mirror stage 110 may be any suitable tilt or tip-tilt stage that provides a sufficient angle range for AMC or FMC. It may, for example, comprise one or more piezo-electric actuators with associated control (or control may be incorporated in the scanning camera controller 140). It may incorporate one or more position sensors for closed-loop control.

The scanning mirror drive 120 may be any suitable rotary drive that provides sufficient torque to rotate the scanning mirror 122 from one spin angle 128 to the next during the available time interval between successive shots. It may, for example, comprise a stepper motor or piezo-electric actuator or motor with associated control (or control may be incorporated in the scanning camera controller 140). It may incorporate a position sensor for closed-loop control.

A linear actuator may be suitably coupled to provide rotational movement, e.g. via a rack and pinion mechanism. For examples of piezo-electric actuators and rotary couplings see Johansson et al. (U.S. Pat. No. 6,337,532, "Fine walking actuator"), Johansson (U.S. Pat. No. 7,420,321, "Heat efficient micromotor"), and Bexell et al. (U.S. Pat. No. 9,293,685, "Rotating load bearer"), the contents of all of which are herein included by cross reference.

Figure 12A:
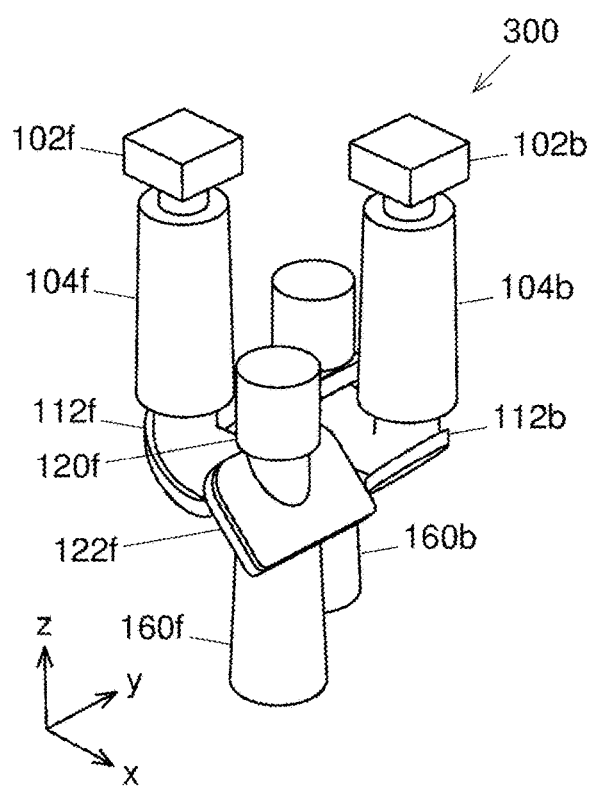
FIG. 12A shows a dual-scan scanning camera.

FIG. 12A shows an embodiment of a dual-scan scanning camera 300. The dual-scan scanning camera 300 comprises two scanning cameras 100, one facing forward and the other facing backward. Reference numerals for components associated with each scanning camera 100 are suffixed "f" (for forward) or "b" (for backward) as appropriate.

Figure 12B:
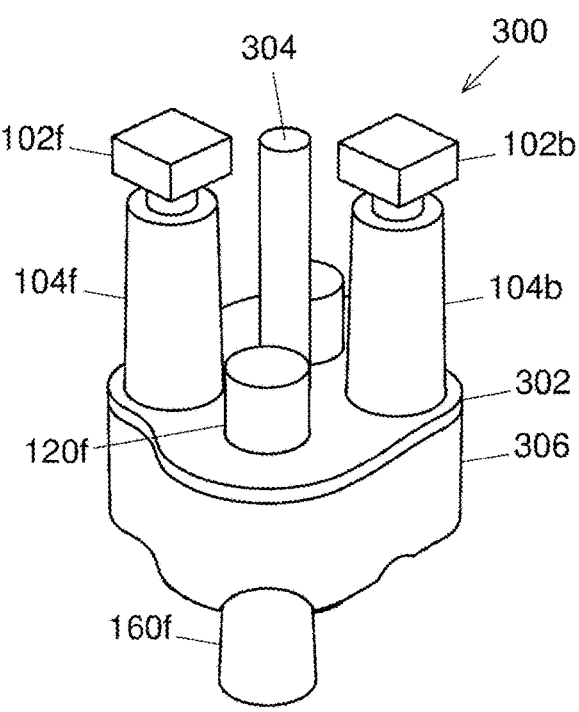
FIG. 12B shows the dual-scan scanning camera with a housing.

FIG. 12B shows the dual-scan scanning camera 300 with a mount plate 302 supporting the lens assemblies 104 and the scanning mirror drives 120, and a protective housing 306. Cutaways in the lower edge of the housing 306 accommodate the imaging beams 160 at extreme spin angles. The mount plate 302 incorporates a mount rod 304 for attaching the dual-scan scanning camera 300 to a camera mount in a vertically-adjustable fashion.

Figure 13:
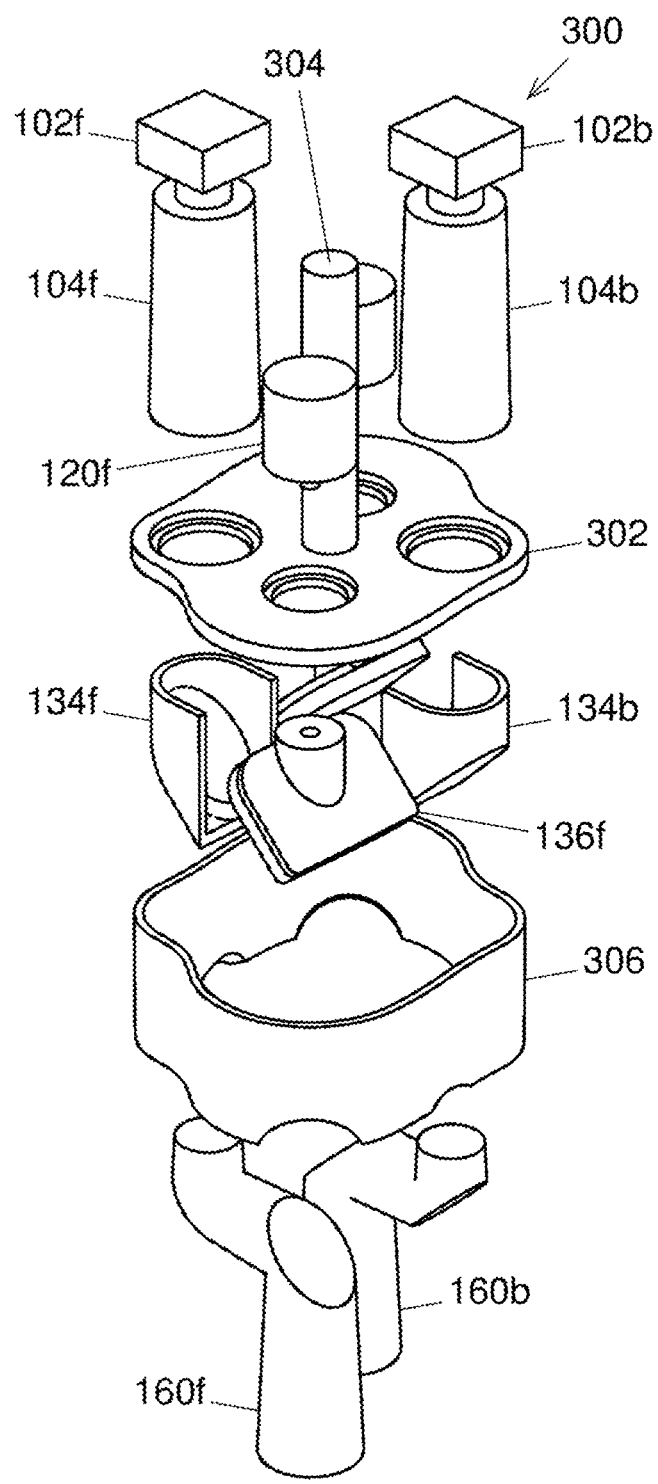
FIG. 13 shows a parts explosion of the dual-scan scanning camera.

FIG. 13 shows a parts explosion of the dual-scan scanning camera 300, including correction mirror assemblies 134, each comprising a correction mirror 112 and correction mirror housing 114, and scanning mirror assemblies 136, each comprising a scanning mirror 122 and scanning mirror mount 124.

Figure 14A:
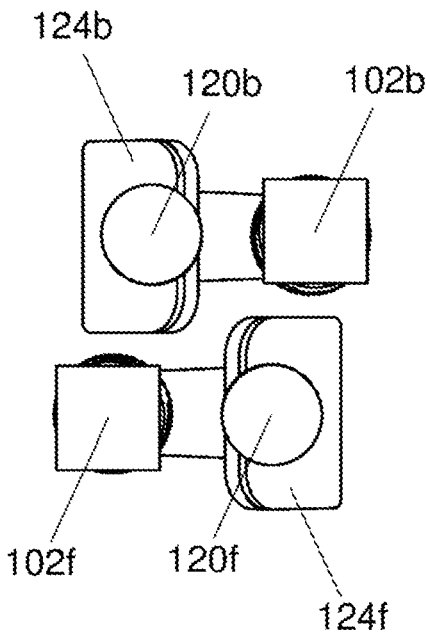
FIG. 14A shows a top plan view of the dual-scan scanning camera.
Figure 14B:
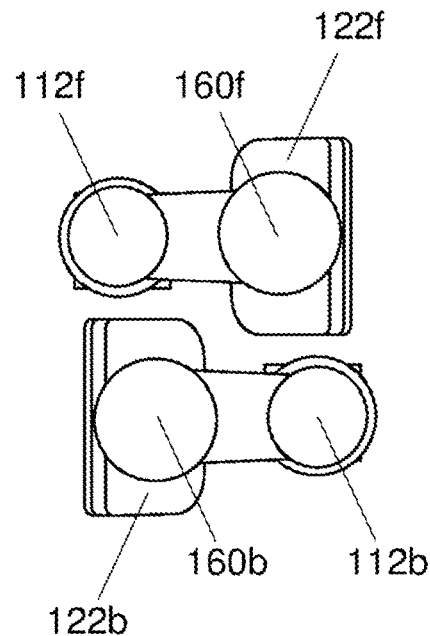
FIG. 14B shows a bottom plan view of the dual-scan scanning camera.

FIG. 14A and FIG. 14B show top and bottom plan views respectively of the dual-scan scanning camera 300.

Figure 14C:
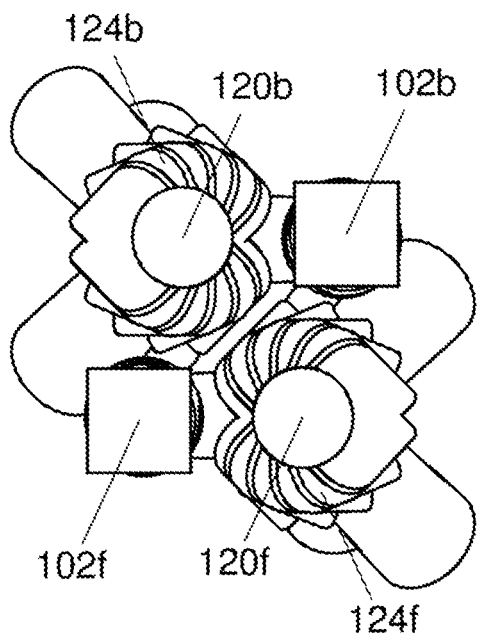
FIG. 14C shows a top plan view of the dual-scan scanning camera with its scanning mirror at multiple spin angles.
Figure 14D:
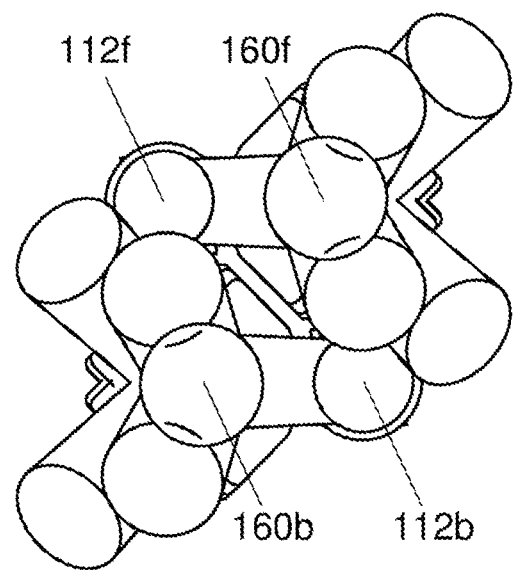
FIG. 14D shows a bottom plan view of the dual-scan scanning camera with its scanning mirror at multiple spin angles.

FIG. 14C and FIG. 14D show top and bottom plan views respectively of the dual-scan scanning camera 300 with its scanning mirrors 122f and 122b at multiple spin angles, illustrating clearance during operation between the adjacent scanning mirrors 122f and 122b and between the adjacent imaging beams 160f and 160b.

The dual-scan scanning camera 300 may be mounted over a camera hole in the floor of a survey aircraft or spacecraft, or in the floor of an external pod carried by a survey aircraft or spacecraft. The camera hole may incorporate an optical-grade glass window, e.g. if the aircraft is pressurized.

Figure 15:
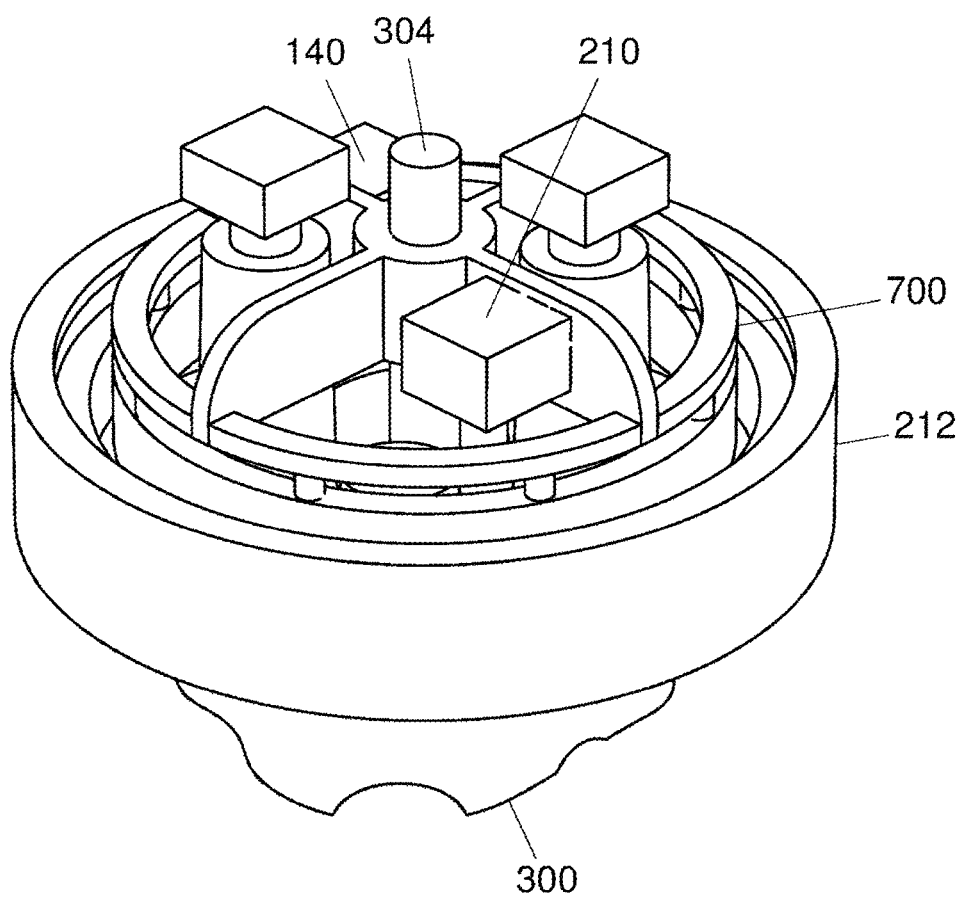
FIG. 15 shows the dual-scan scanning camera mounted on an AMC platform.

FIG. 15 shows the dual-scan scanning camera 300 mounted, via camera mount 700, on an AMC platform 212. The scanning camera controllers 140 and IMU 210 are also shown mounted on the camera mount 700. The dual-scan scanning camera 300 attaches to the camera mount 700 via its mount rod 304, which allows its vertical position relative to the mount to be adjusted according to the depth of the camera hole above which it is mounted, i.e. to ensure that the imaging beams 160 have sufficient clearance throughout their scan range, subject also to the maximum anticipated aircraft angular motion. The mount rod 304 may be attached to the camera mount 700 using a mount bolt (not shown) passing laterally through the camera mount and mount rod. The mount rod may incorporate a series of holes (not shown) along its length that accept the bolt, the use of one of which sets the vertical position of the scanning camera 300.

Figure 16:
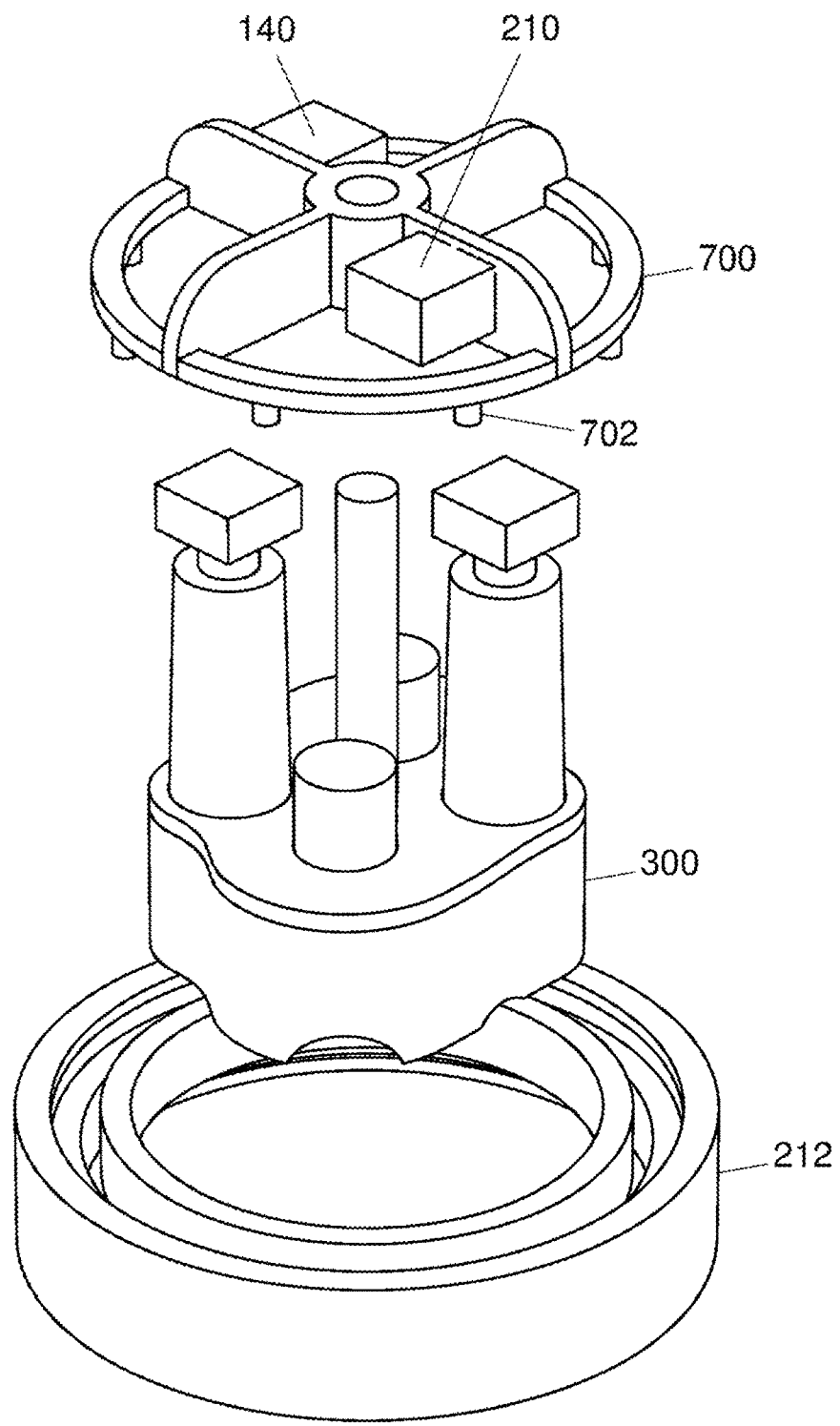
FIG. 16 shows a parts explosion of the mounted dual-scan scanning camera.

FIG. 16 shows a parts explosion of the mounted dual-scan scanning camera 300. The camera mount 700 mounts to the AMC platform 212 via a set of vibration isolators 702. These may be of any suitable type, including wire rope isolators and elastomeric isolators.

The AMC platform 212 may be any suitable one-, two- or three-axis AMC platform. It may, for example, be a three-axis Lead'Air SteadyTrack STX-550.

Aerial imagery may be utilised in a number of different ways. Aerial photos may be used individually, or may be orthorectified and stitched into continuous mosaics. They may also be used to reconstruct the 3D shape of the ground, and the resulting 3D model may be textured with the imagery.

The use of two scanning cameras 100, facing in opposite directions, allows the dual-scan scanning camera 300 to capture oblique views in four directions spaced approximately 90 degrees apart. This supports traditional uses of oblique aerial photos, as well as robust 3D surface reconstruction.

Figure 17A:
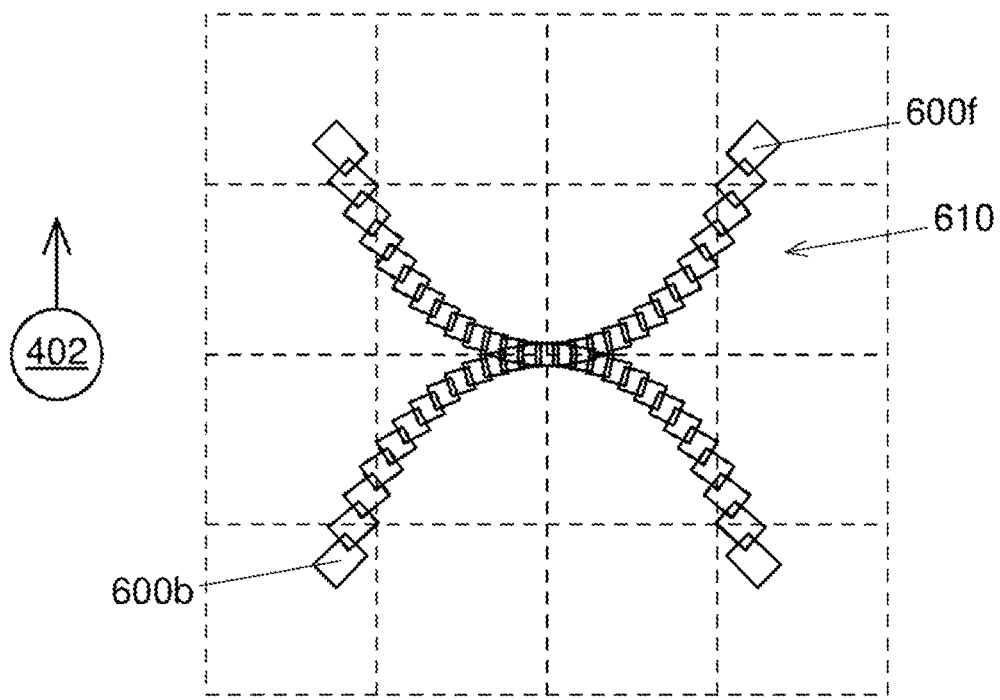
FIG. 17A shows a scan field of the dual-scan scanning camera.
Figure 17B:
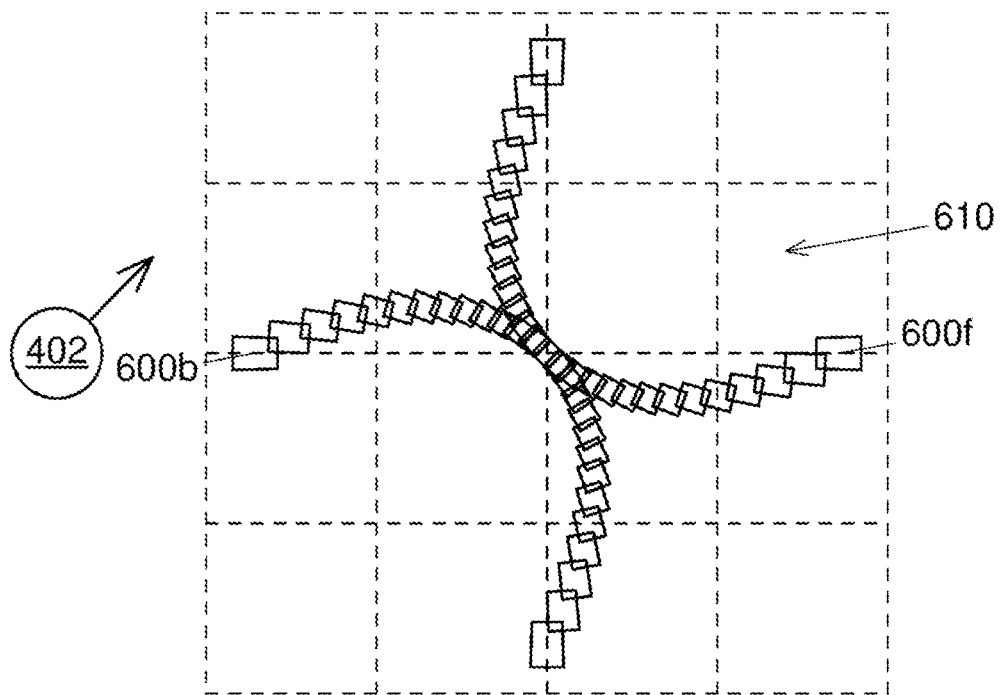
FIG. 17B shows a scan field of the dual-scan scanning camera with a 45-degree heading.

FIG. 17A shows the dual scan field 610 of the dual-scan scanning camera 300 operated at an altitude of 14,000 feet with a northerly aircraft heading 402. The dual scan field 610 comprises a forward scan field 600f and a backward scan field 600b. FIG. 17B shows the same dual scan field 610 but with a 45-degree (north-east) aircraft heading 402.

Using a 45-degree heading 402 ensures that the four oblique views captured by the dual scan field 610 are aligned with the four cardinal directions, thus satisfying market expectations for oblique imagery.

Figure 18A:
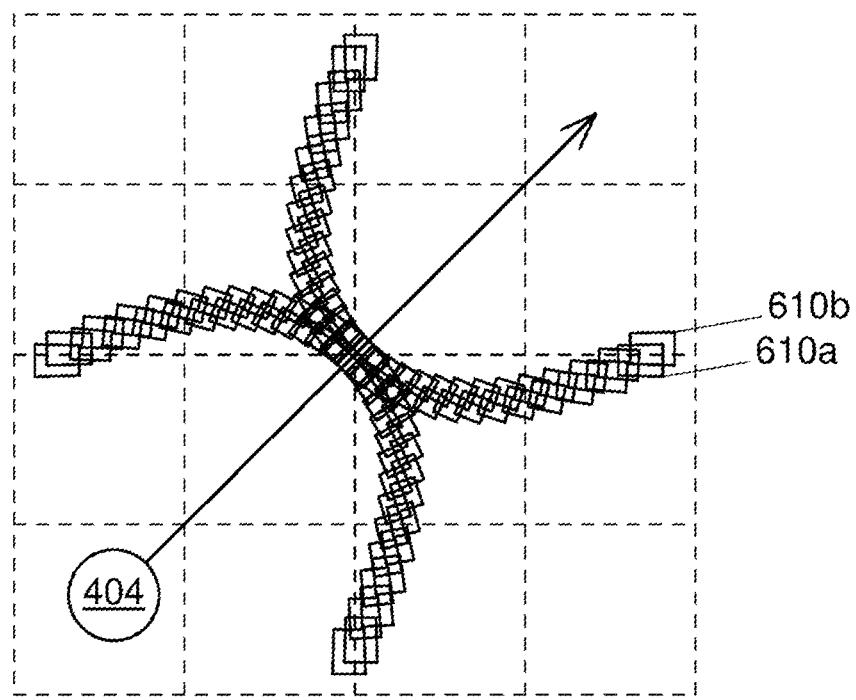
FIG. 18A shows two successive scan fields of the dual-scan scanning camera.

FIG. 18A shows two successive dual scan fields 610a and 610b of the dual-scan scanning camera 300 along a single-flightline survey path 404, illustrating longitudinal overlap between successive dual scan fields 610.

Figure 18B:
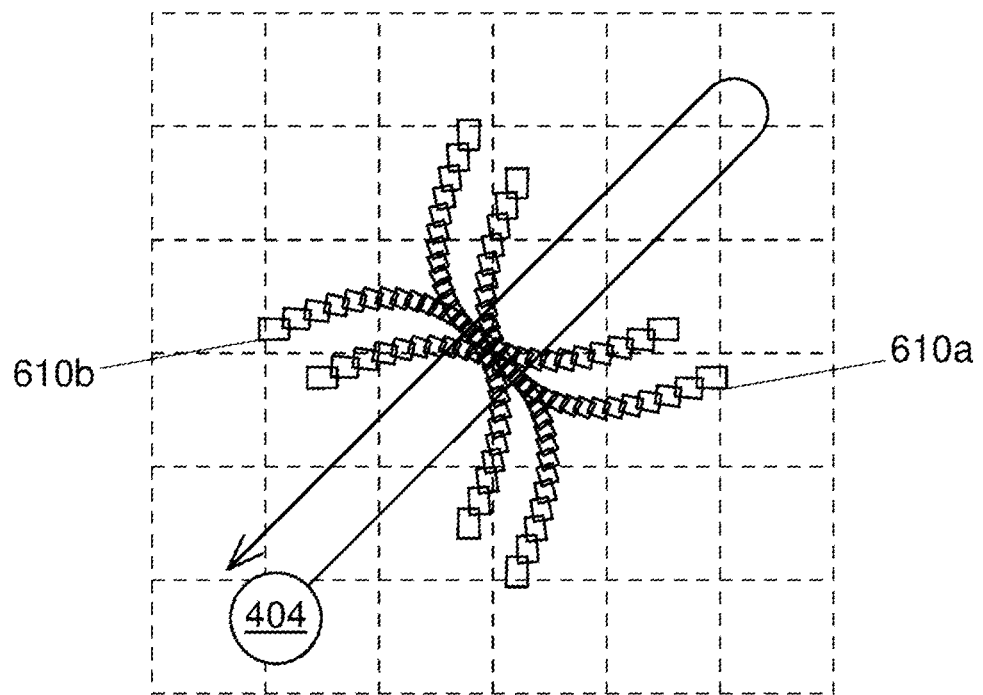
FIG. 18B shows two adjacent scan fields of the dual-scan scanning camera from adjacent flightlines.

FIG. 18B shows two adjacent dual scan fields 610a and 610b of the dual-scan scanning camera 300 from adjacent flightlines within a two-flightline survey path 404, illustrating lateral overlap between adjacent dual scan fields 610.

Figure 19:
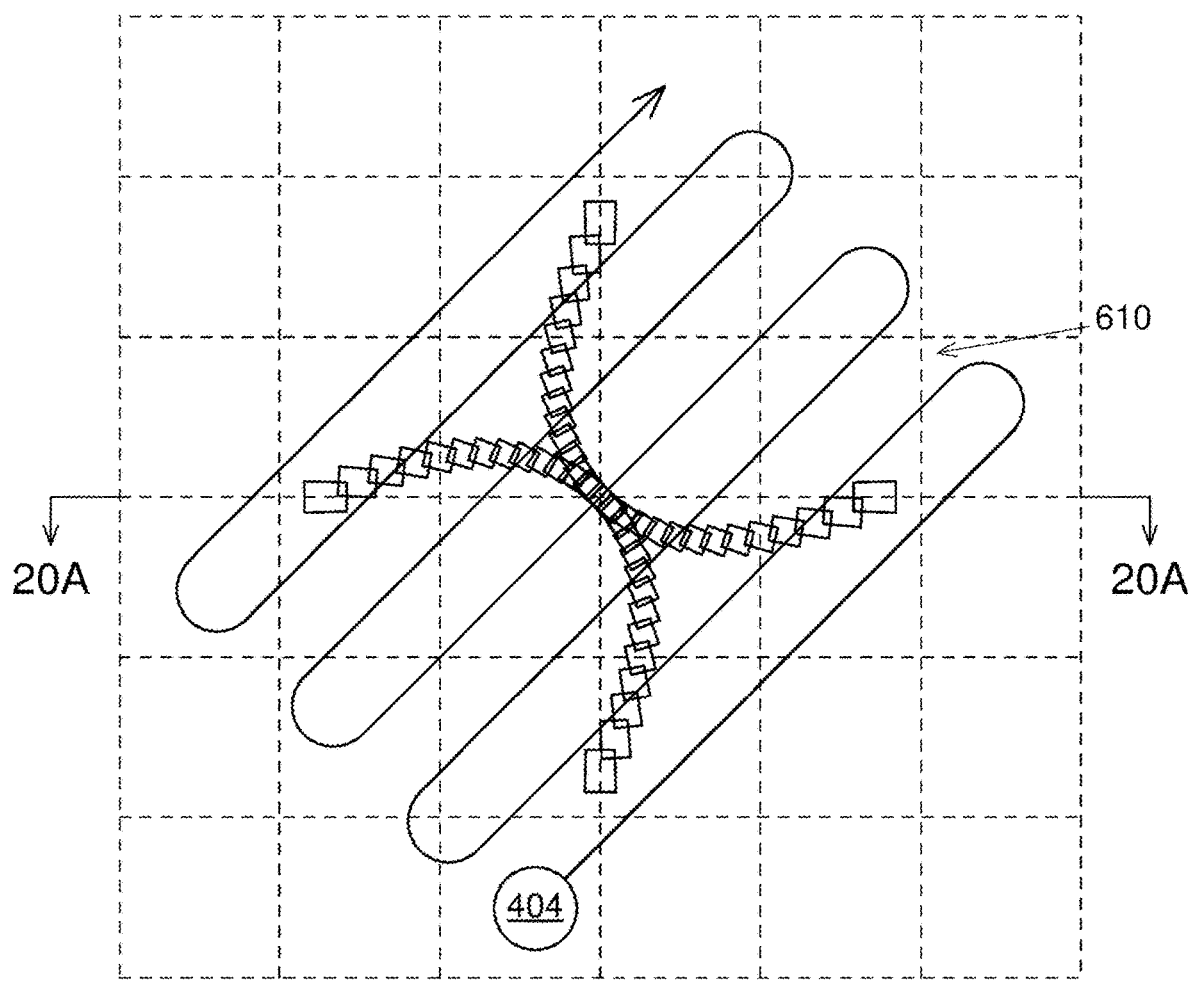
FIG. 19 shows the scan field of the dual-scan scanning camera relative to a multi-line survey path.

FIG. 19 shows the dual scan field 610 of the dual-scan scanning camera 300 relative to a seven-flightline survey path 404.

Figure 20A:
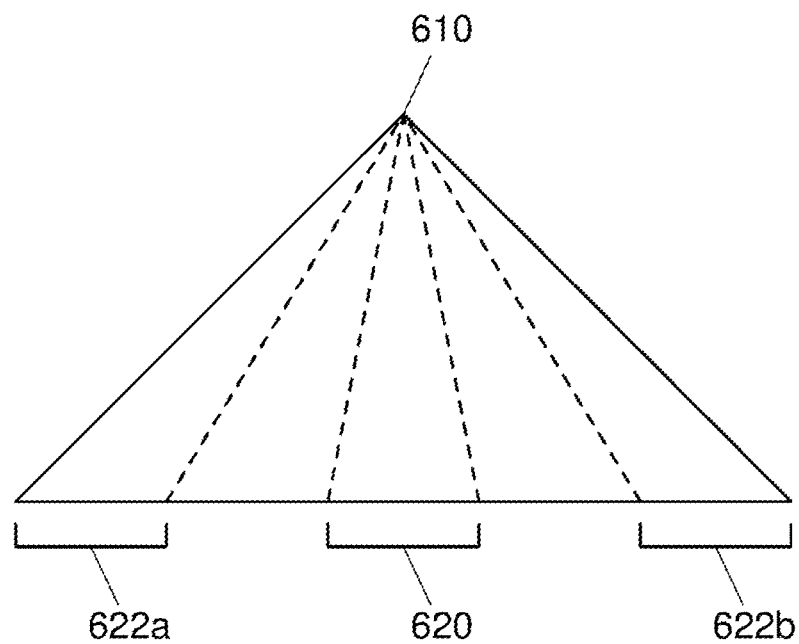
FIG. 20A shows an elevation of the scan field of the dual-scan scanning camera.

FIG. 20A shows an elevation of the dual scan field 610 of the dual-scan scanning camera 300, representing the indicated east-west cross-section of the dual scan field 610 in FIG. 19 (but note that because each scan field 600 is curved, the actual sensor fields overlapping the cross-section come from multiple successive scan fields). FIG. 20A shows the dual scan field 610 segmented into a nadir sub-field 620 and left and right oblique sub-fields 622a and 622b. These sub-fields represent the optimal nadir and oblique contributions of the dual scan field 610 assuming the flightline spacing of FIG. 19. This is further illustrated in FIG. 20B, which shows dual scan fields 610 from three adjacent flightlines, where each oblique sub-field 622 is shown to be delineated by the edge of the dual scan field 610 from the adjacent flightline. The left and right oblique sub-fields 622a and 622b are associated with the backward scan field 600b and forward scan field 600f respectively, while the nadir sub-field 620 is associated with both scan fields (i.e. each half of the nadir sub-field is associated with a respective scan field). Likewise, the corresponding left and right oblique sub-fields in the orthogonal north-south direction of the scan field 610 in FIG. 19 are associated with the forward scan field 600f and backward scan field 600b respectively, and the north-south nadir sub-field 620 is associated with both.

Segmentation into a nadir sub-field 620 and left and right oblique sub-fields 622 is relevant to traditional uses of oblique and nadir aerial imagery. When reconstructing 3D surfaces, imagery from the entirety of each dual scan field 610 may be used.

Figure 21:
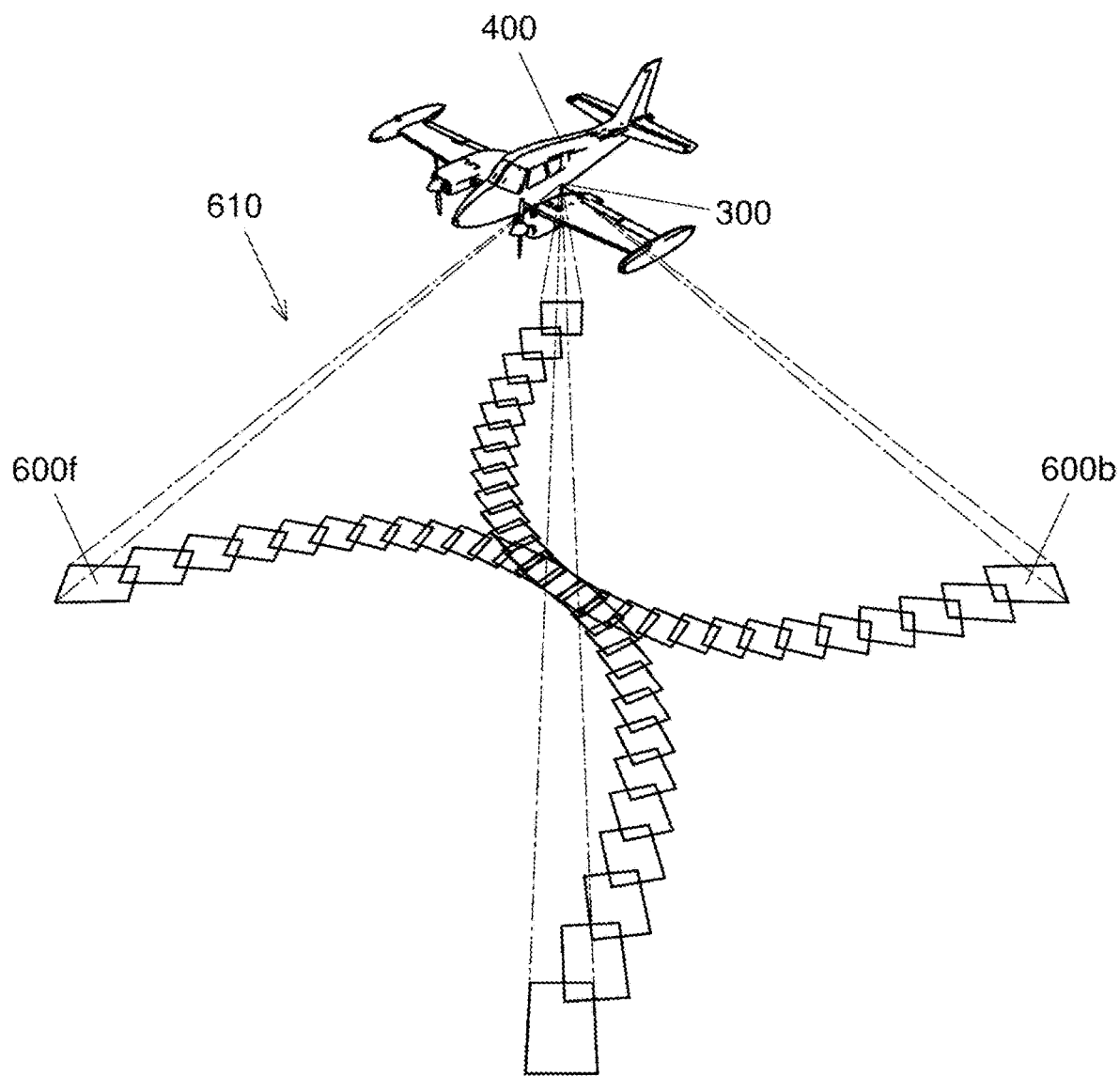
FIG. 21 shows the scan field of the dual-scan scanning camera carried by a survey aircraft.

FIG. 21 shows a perspective view of the dual scan field 610 of the dual-scan scanning camera 300 carried by a survey aircraft 400.

Although the figures show the dual scan field 610 comprising two complete scan fields 600f and 600b, the nadir portion of one or the other scan field may be omitted for efficiency since they overlap substantially. If the nadir portion is omitted from one scan field on even scans and the other scan field on odd scans then the average shot rate of both scans can be reduced. Alternatively, half of the nadir portion of one scan field and half of the nadir portion of the other scan field may be omitted to the same effect, this equating to omitting the capture of one composite nadir sub-field 620 (i.e. one of the two orthogonal east-west and north-south nadir sub-fields 620).

Although the survey platform is illustrated as a manned fixed-wing aircraft 400, the survey platform may be any suitable moving platform, including an unmanned aircraft, a rotary-wing aircraft, an orbiting satellite, a spacecraft, etc.

If the survey platform is an aircraft then the survey path 404 is typically serpentine, as shown in FIG. 19. If the survey platform is an orbital satellite then the survey path 404 typically consists of a set of parallel orbital tracks, with the survey platform moving in the same direction along each track. However, any suitable survey path 404 may be used so long as overlap between scan fields 610 is maintained to ensure full coverage of the area of interest.

For simplicity the figures show each scan field as if captured at an instant in time, and hence corresponding to a specific point on the survey path 404. In practice each scan field takes a finite time to capture, and so is associated with a time interval rather than a time instant, and an interval on the survey path rather than a point. In addition, the multiple scanning cameras 100 of a multi-scan scanning camera, such as the dual-scan scanning camera 300, need not be fully synchronized, but typically overlap sufficiently in time that they can be associated pair-wise (etc.) with a set of overlapping intervals along the survey path.

Figure 22A:
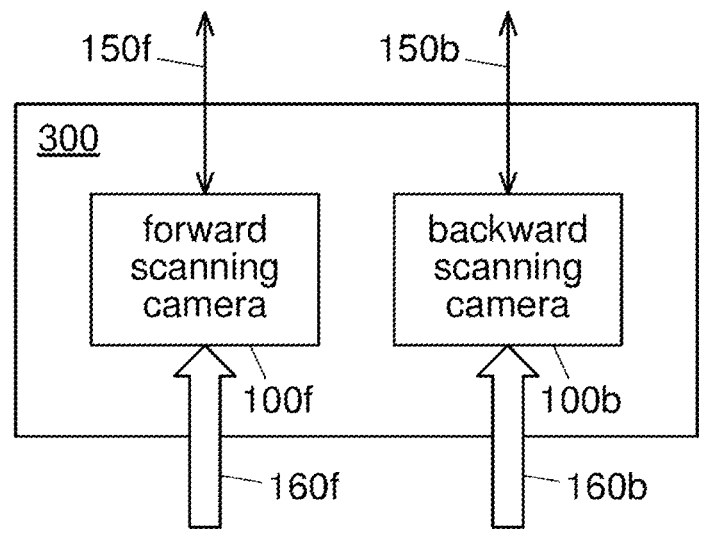
FIG. 22A shows a block diagram of the dual-scan scanning camera.

FIG. 22A shows a block diagram of the dual-scan scanning camera 300, comprising its two scanning cameras 100f and 100b for forward and backward capture respectively.

As is evident from FIG. 7A, as the magnitude of the spin angle 128 increases away from zero at the center of the scan field 600, the size of the sensor field 162 and hence the ground sampling distance (GSD) both increase accordingly. This results in the capture of oblique imagery with a lower spatial resolution than the nadir imagery within the same scan field 600. If a third scanning camera 100 (or any suitable aerial camera) is used to capture the nadir imagery, then the GSD of the oblique imagery can be decoupled from the GSD of the nadir imagery, either by using a lens 148 with a longer focal length for the scanning cameras 100 used to capture the oblique imagery, or an image sensor 144 with smaller pixel pitch.

Figure 22B:
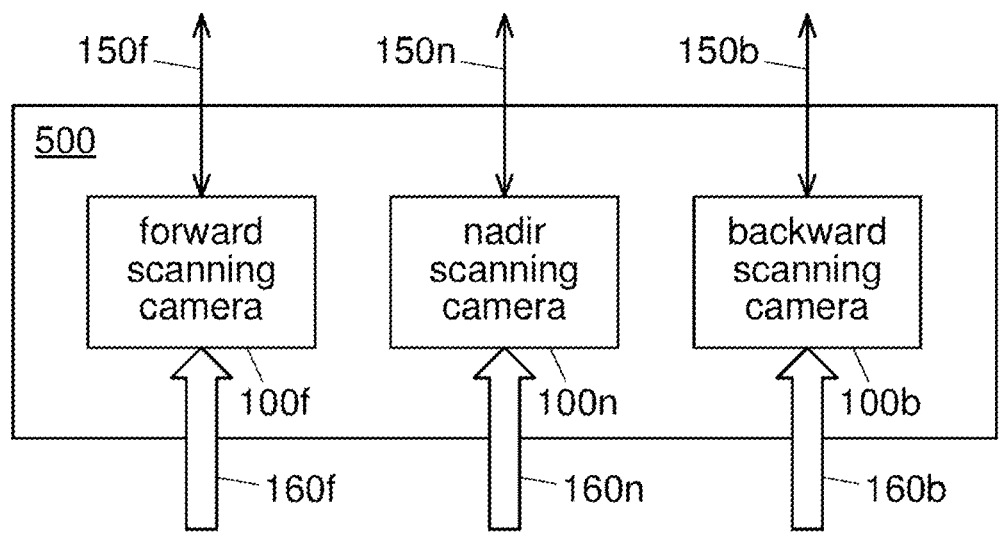
FIG. 22B shows a block diagram of a triple-scan scanning camera.

FIG. 22B shows a block diagram of a triple-scan scanning camera 500, comprising three scanning cameras 100, comprising one scanning camera 100n for nadir capture and two scanning cameras 100f and 100b for forward and backward oblique capture respectively.

Figure 23A:
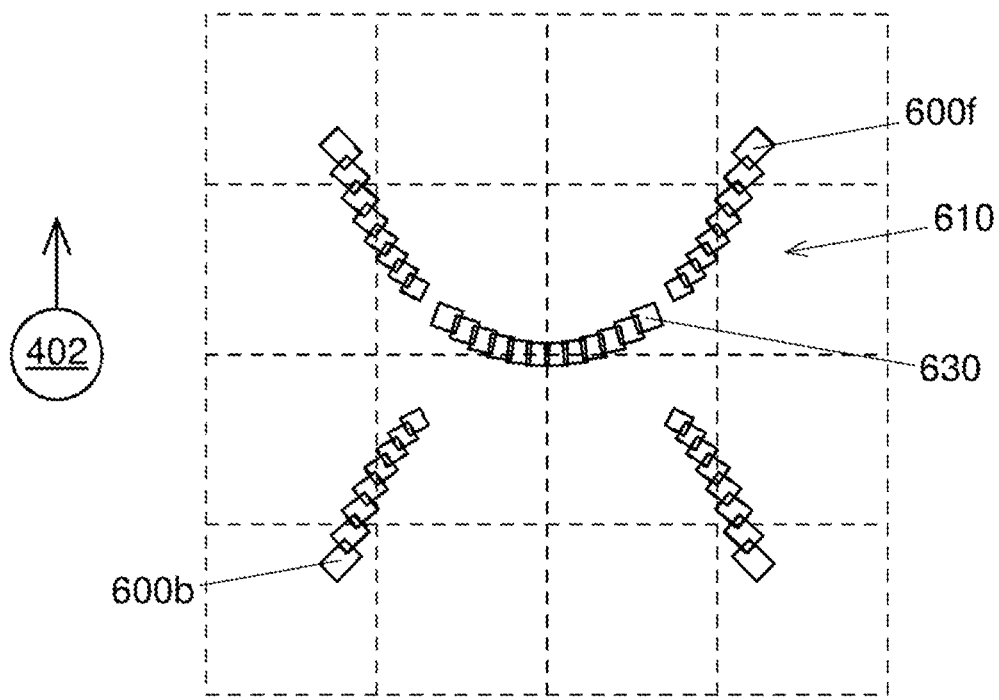
FIG. 23A shows a scan field of the triple-scan scanning camera.

FIG. 23A shows a scan field 610 of the triple-scan scanning camera 500. For illustrative purposes, the focal length of the oblique scanning cameras 100f and 100b is 400 mm, while the focal length of the nadir scanning camera 100n remains at 300 mm. The oblique scan fields 600 are shown as partial, i.e. with the nadir portions of each scan omitted. Likewise, the nadir scan field 630 is shown with a limited scan range covering only the required nadir portion.

Alternatively, the oblique scan fields and/or the nadir scan field may be full scan fields, yielding imagery with more redundancy (and multiple resolutions). However, the use of partial scan fields allows a higher scan rate than the use of full scan fields.

Figure 23B:
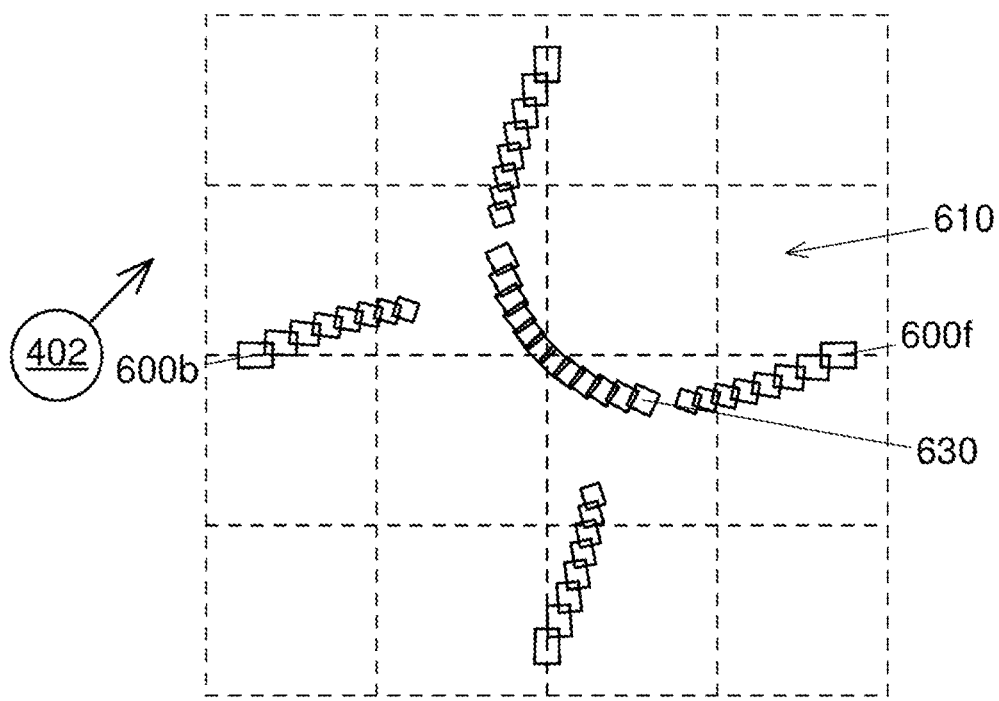
FIG. 23B shows a scan field of the triple-scan scanning camera with a 45-degree heading.

FIG. 23B shows the scan field 610 of the triple-scan scanning camera with a 45-degree survey aircraft heading 402.

More than two scanning cameras 100 may also be used, suitably rotated (e.g. to ensure evenly-spaced viewing directions), to capture additional views.

Although the figures show the dual scan field 610 comprising a forward scan field 600f and backward scan field 600b captured using forward- and backward-facing scanning cameras 100, the scan field may instead comprise left and right scan fields 600 captured using a left- and right-facing scanning cameras 100. The choice of facing direction may be influenced by the shape of the available camera hole in a survey aircraft.

FIG. 24 shows a tabulation of the performance of the dual-scan scanning camera 300 at different altitudes for a fixed GSD. The altitude is varied from 2000 feet to 50,000 feet in 2000-feet increments, with the aircraft speed increasing in steps to reflect realistic aircraft choices. The GSD is fixed at 5 cm, and the focal length is calculated to yield the fixed GSD (although in practice the focal lengths of available COTS lenses is more constrained). The scan rate indicates the number of scans per second, for each scanning camera 100 within the dual-scan scanning camera 300. The shot count indicates the number of shots within each scan field 600. The shot rate indicates the number of shots per second within a scan. The line spacing indicates the spacing of flightlines based on a 30-degree flightline spacing. The capture rate indicates the overall productivity of the dual-scan scanning camera 300 in terms of area captured per hour.

The allowable shot rate is bounded by the maximum frame rate of the image sensor 144. The illustrative PYTHON 25K image sensor 144 has a maximum frame rate of 80 fps, allowing 5 cm imaging at 400 knots up to an altitude of 38,000 feet. Higher-rate image sensors may be used for higher-altitude operation, or lower-rate image sensors may be multiplexed.

In general, any number of scanning cameras 100 may be deployed, suitably rotated (e.g. to ensure evenly-spaced viewing directions), to capture a desired number of views.

Any number of scanning cameras 100 may also be deployed, facing in the same direction, to increase capture throughput. For example, if the number of scanning cameras facing in a particular direction is doubled, then the effective scan rate in that direction is also doubled. If the capture rate is limited by the frame rate of the image sensor 144 or by the mechanical movement of the scanning mirror 122, then the use of multiple scanning cameras 100 can be used to overcome those limits. Increased numbers of scanning cameras 100 can be deployed over the same camera hole or over multiple separate camera holes as appropriate. In the latter case this may take the form of one dual-scan scanning camera 300 over each camera hole.

The photos and associated position and orientation data captured by one or more scanning cameras 100 during one or more passes of a survey area may be used to reconstruct a dense 3D surface representation of the survey area, textured with the captured imagery. 3D surface reconstruction may utilize any of a number of commercially-available photogrammetry software packages, including Bentley Systems' ContextCapture, Agisoft's PhotoScan, and Capturing Reality's RealityCapture.

Figure 25:
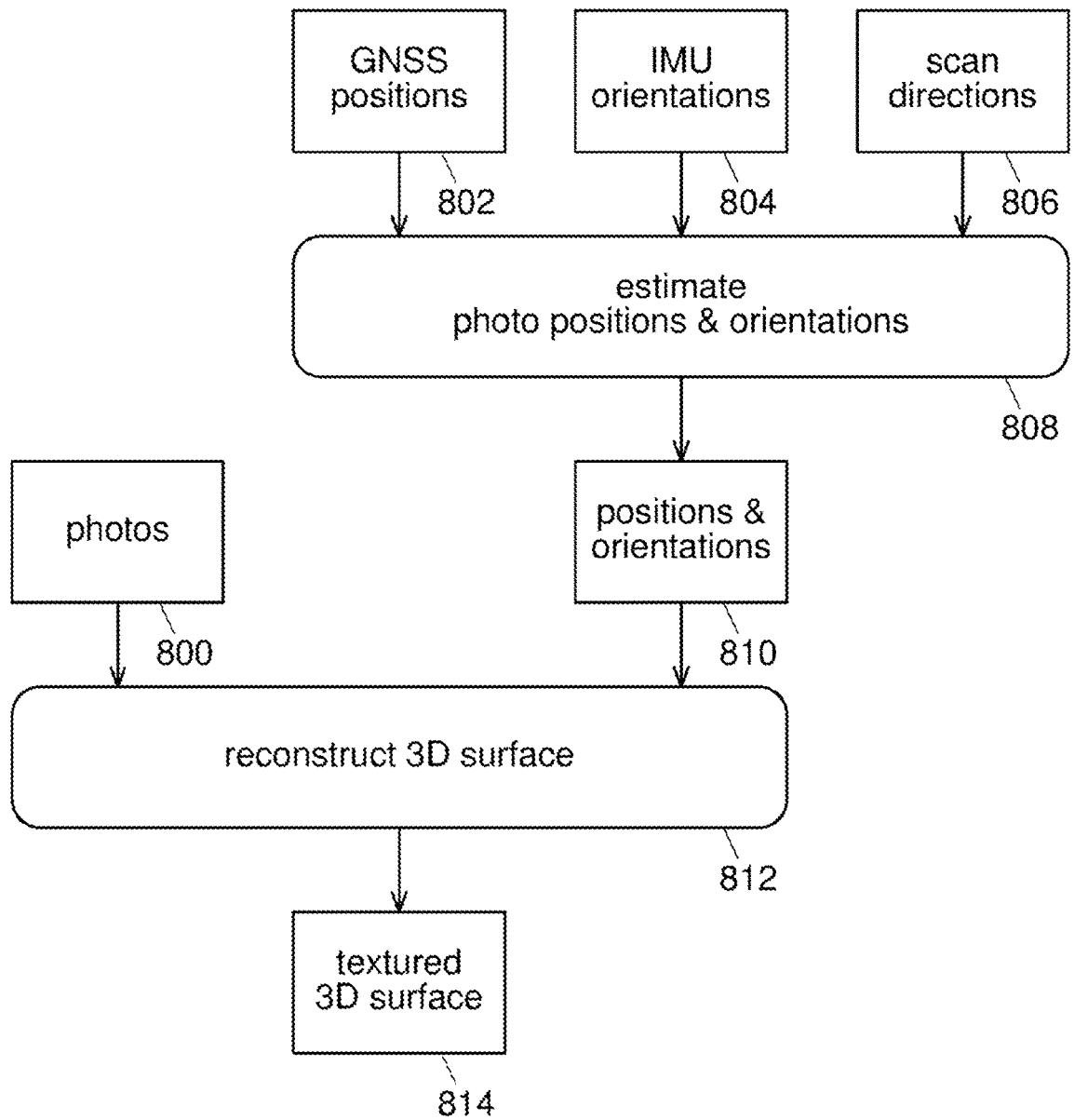
FIG. 25 shows an activity diagram for a photogrammetry process for 3D surface reconstruction.

FIG. 25 shows an activity diagram for a photogrammetry process for 3D surface reconstruction from data captured by one or more scanning cameras 100. An estimation step 808 accepts a stream of GNSS positions 802, IMU orientations 804, and scan directions 806, and estimates the position & orientation 810 of each captured photo 800. A reconstruction step 812 operates on the stream of captured photos 800 and estimated photo positions & orientations 810, triangulating common image features and reconstructing a dense 3D surface 814 textured with the captured imagery. Each scan direction 806 comprises the viewing angle 182 and viewing direction 184 of the imaging beam 160. The inputs 802, 804 and 806 to the estimation step 808 are timestamped, and the estimation step 708 may interpolate input values to align them in time.

The photogrammetry process intrinsically refines the estimated position & orientation 810 of each photo 800, so it is not crucial that the initial estimates be accurate.

The photogrammetry process may also utilize other data when available, such as imagery from other cameras carried by the survey aircraft, including one or more fixed cameras capturing imagery with a different GSD to the scanning camera, and LiDAR data captured by a LiDAR sensor carried by the survey aircraft.

The reconstruction of 3D surfaces from aerial photos is well described in the literature. See, for example, Furukawa and Hernández, Multi-View Stereo: A Tutorial, Foundations and Trends in Computer Graphics and Vision, Vol. 9, No. 1-2, (2013).

A true orthomosaic may be generated from the textured 3D surface 814 by orthographically projecting the surface according to a chosen viewing direction. The viewing direction may be nadir or oblique. Alternatively, an orthomosaic may be generated more directly by blending orthorectified photos.

The creation of accurate orthomosaics from aerial photos is well described in the literature. See, for example, Elements of Photogrammetry with Application in GIS, Fourth Edition (Wolf et al.) (McGraw-Hill 2014), and the Manual of Photogrammetry, Sixth Edition (American Society for Photogrammetry and Remote Sensing (ASPRS) 2013).

Efficient oblique imaging involves a compromise between the variation in oblique angle within the oblique imagery (corresponding to the viewing angle 182), and the variation in lateral pointing direction within the oblique imagery (corresponding to the viewing direction 184). When utilizing the scanning camera 100 mounted vertically, as previously described in this specification, variation in the oblique angle depends on the flightline spacing. The larger the spacing, the greater the variation. This is a characteristic of any scanning camera used in this way. Because the scan field 600 of the scanning camera 100 is curved, a larger spacing also leads to greater variation in the lateral pointing direction within the oblique imagery.

If an aerial camera with a wide field of view is used to capture oblique imagery at a fixed oblique angle, as is more conventional, then the resolution of the oblique imagery decreases laterally with increasing distance from the center of the field of view, i.e. as the distance to the ground increases. The curved field of view of the scanning camera 100 offers a superior alternative, and the scanning camera 100 can be mounted at an oblique angle for the purpose of dedicated oblique imaging.

Figure 26A:
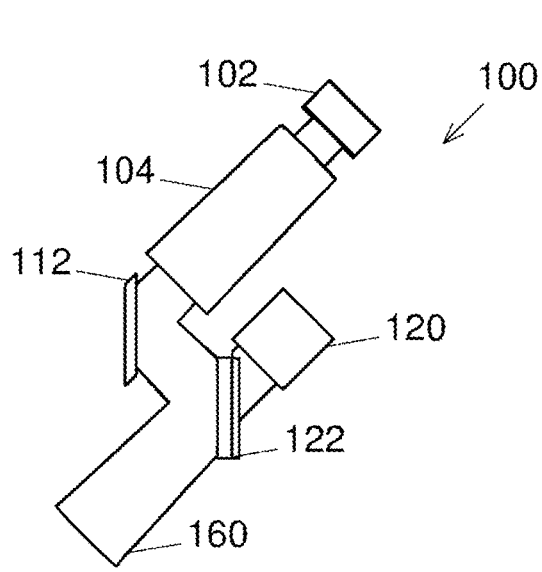
FIG. 26A shows the scanning camera tilted for oblique imaging.
Figure 26B:
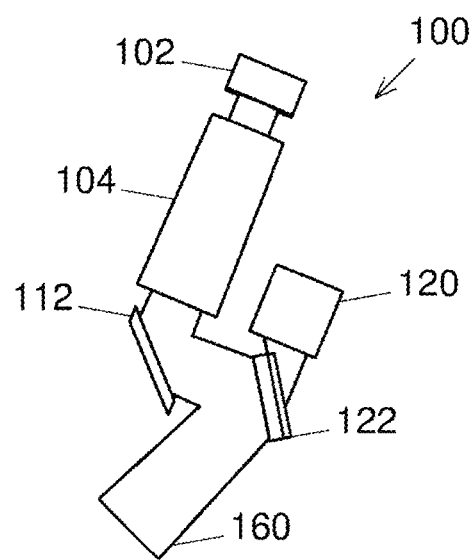
FIG. 26B shows the scanning camera and its scanning mirror both tilted for oblique imaging.

FIG. 26A shows the scanning camera 100 tilted at 45 degrees for oblique imaging. As an alternative, FIG. 26B shows the scanning camera 100 tilted at 22.5 degrees and its scanning mirror 122 tilted at 22.5 degrees from the spin axis 126 for 45-degree oblique imaging. As a further alternative, FIG. 26C shows the scanning camera 100 with a single mirror, i.e. with a scanning mirror 122 but no correction mirror 112, tilted at 45 degrees for oblique imaging.

The scanning mirror 122 of an upright scanning camera 100 can also be tilted at 67.5 degrees to the optical axis to effect oblique imaging. Any interference between the correction mirror 112 and the oblique imaging beam 160 can be ameliorated by increasing the separation of the correction mirror 112 and the scanning mirror 122. Alternatively, the tilt of the correction mirror can be increased to bend the optical axis 106 downwards, and the scanning mirror 122 can be translated downwards accordingly. The tilt of the scanning mirror 122 must then also be increased to effect the desired oblique angle of the scanning optical axis 108.

Figure 26C:
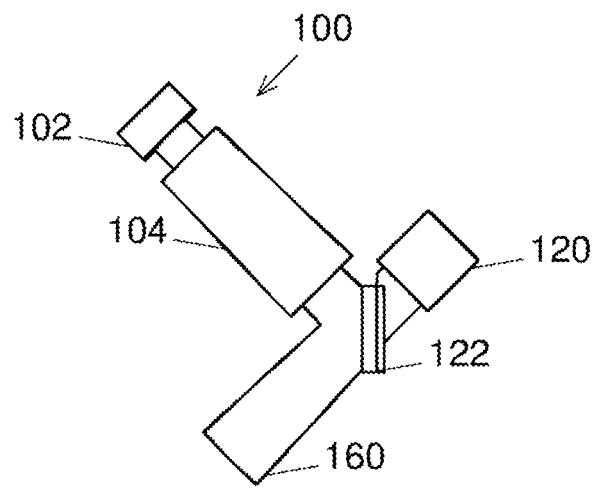
FIG. 26C shows the scanning camera with a single mirror, tilted for oblique imaging.
Figure 27:
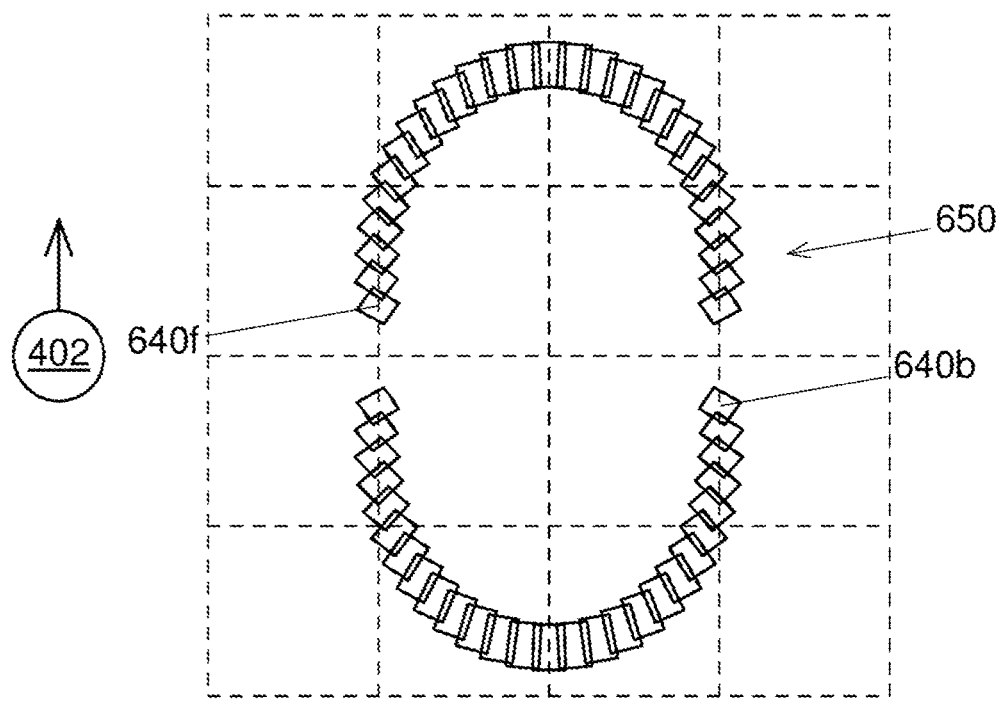
FIG. 27 shows a wide scan field of a dual-scan oblique scanning camera.

FIG. 27 shows a wide dual oblique scan field 650 of a dual-scan oblique scanning camera comprising two scanning cameras 100 tilted at 45 degrees (as shown in FIG. 26A or FIG. 26C), one scanning camera 100b facing forward and the other scanning camera 100f facing backward. The dual oblique scan field 550 comprises a forward oblique scan field 540f and a backward oblique scan field 540b. Note that the forward oblique scan field 540f is captured by a backward-facing scanning camera 100f that is tilted forward, and the backward oblique scan field 540b is captured by a forward-facing scanning camera 100b that is tilted backward.

High-quality oblique imagery captured using a wide-field oblique camera is most efficiently captured in two orthogonal passes, as shown in FIG. 9B, rather than imposing an inefficiently narrow flightline spacing.

Figure 28A:
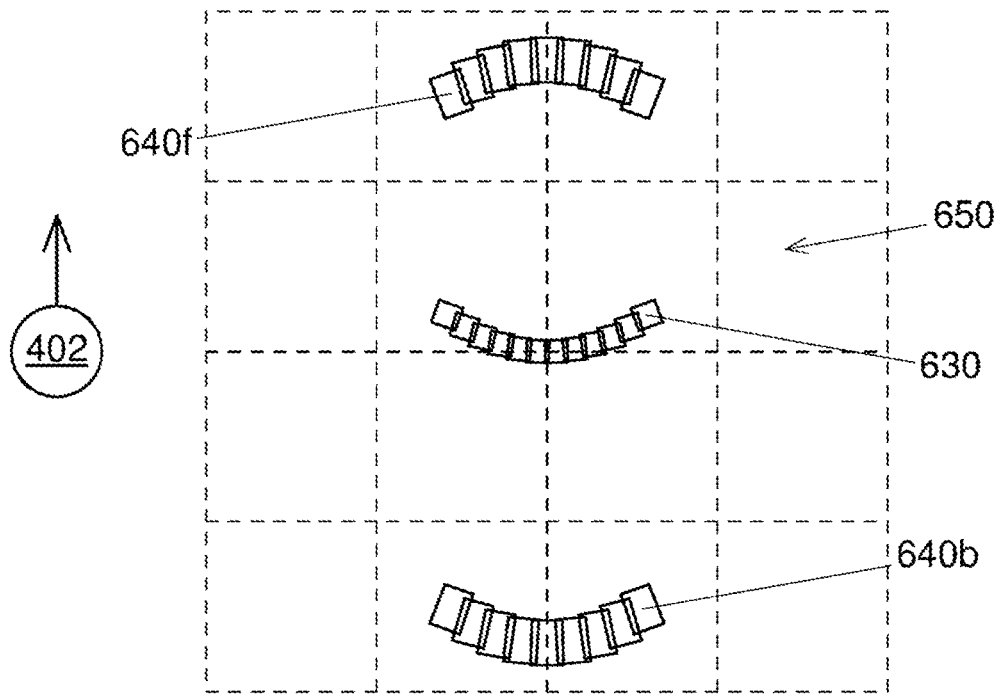
FIG. 28A shows a narrow scan field of a triple-scan oblique scanning camera.
Figure 28B:
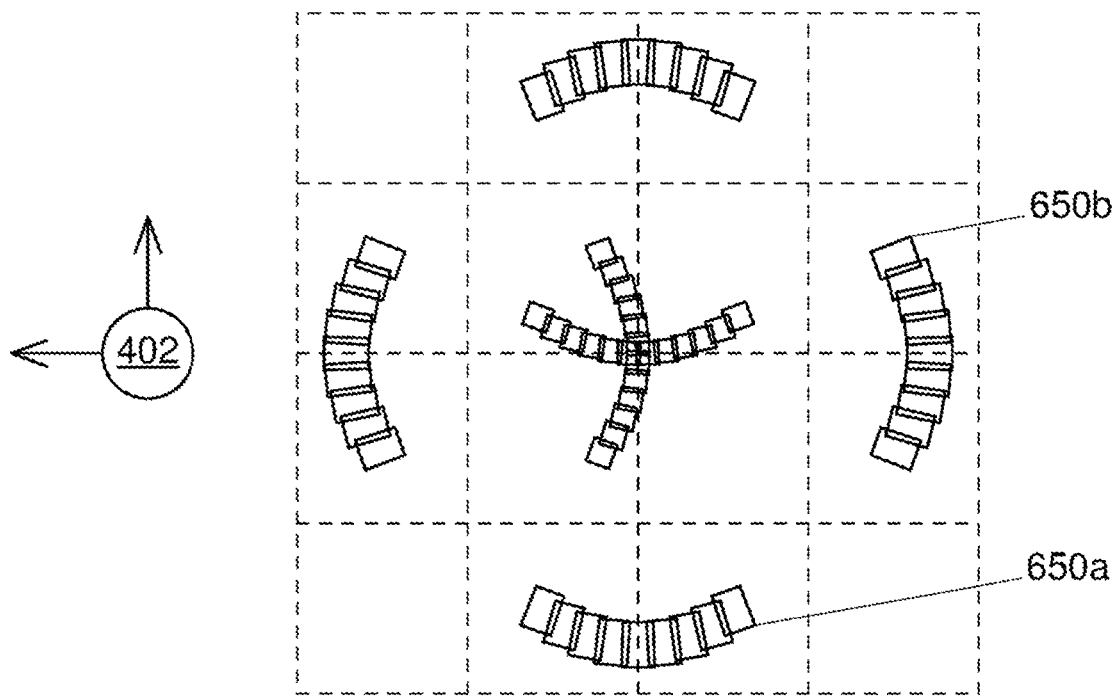
FIG. 28B shows two overlapping scan fields of the triple-scan oblique scanning camera from two orthogonal passes of an aerial survey.

FIG. 28A shows a narrow scan field 650 of a triple-scan oblique scanning camera 500, comprising two scanning cameras 100f and 100b tilted at 45 degrees for oblique imaging, and one scanning camera 100n mounted vertically for nadir imaging. FIG. 28B shows two overlapping scan fields 650a and 650b of the triple-scan oblique scanning camera 500 from two survey passes with orthogonal headings 402.

Figure 29A:
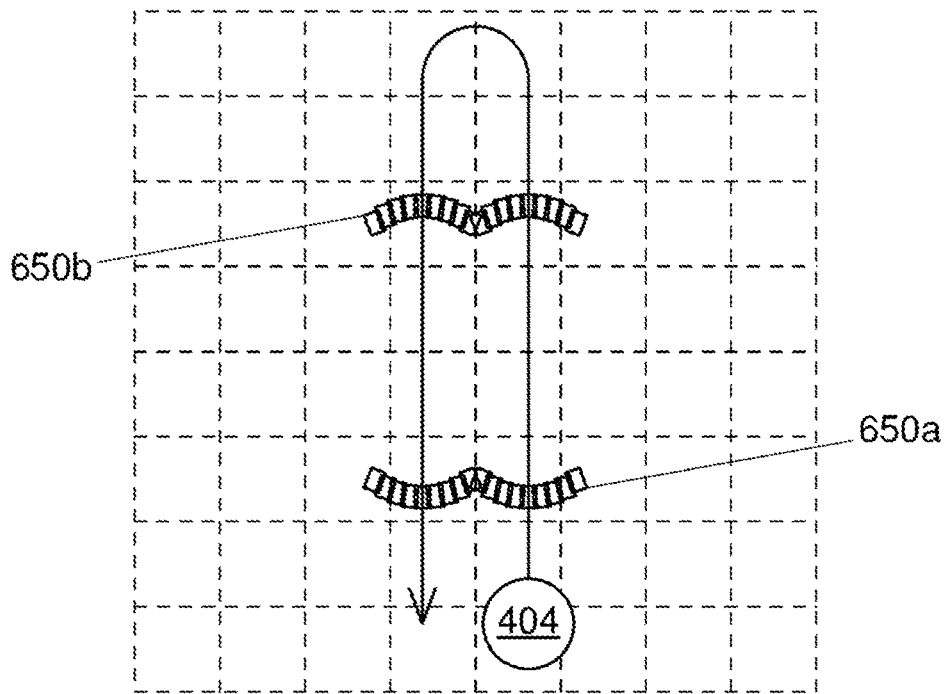
FIG. 29A shows two adjacent scan fields of a dual-scan oblique scanning camera from adjacent flightlines.
Figure 29B:
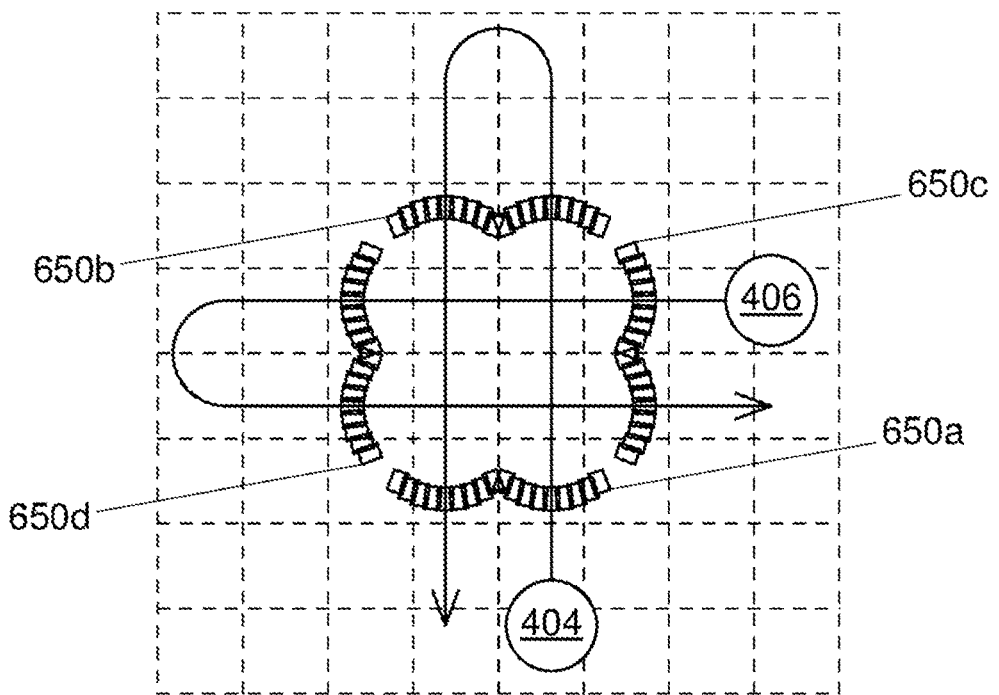
FIG. 29B shows four scan fields of the dual-scan oblique scanning camera from adjacent flightlines within two orthogonal passes of an aerial survey.

FIG. 29A shows two adjacent scan fields 650a and 650b of a dual-scan oblique scanning camera 500 from adjacent flightlines (i.e. with nadir imaging omitted for clarity). FIG. 29B shows four scan fields 650a, 650b, 650c and 650d of the dual-scan oblique scanning camera 500 from adjacent flightlines within two orthogonal passes 404 and 406 of an aerial survey.

Figure 30A:
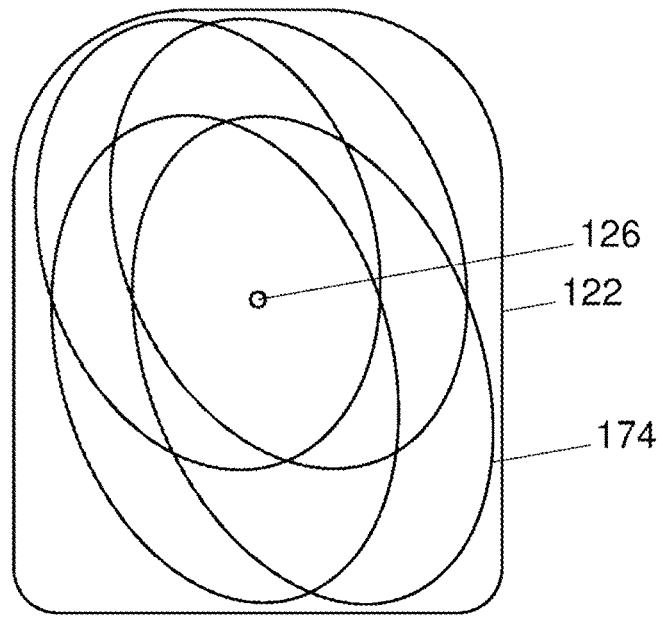
FIG. 30A shows the intersection of corner sensor point beams with the scanning mirror of the oblique scanning camera at an extreme spin angle.
Figure 30B:
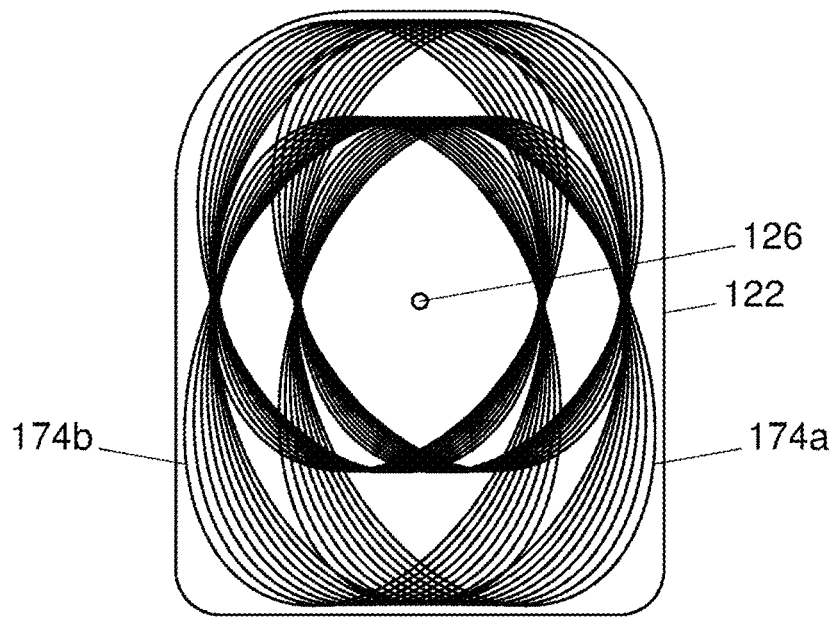
FIG. 30B shows the intersection of corner sensor point beams with the scanning mirror of the oblique scanning camera through a full scan range.

FIG. 30A shows the intersection of corner sensor point beams 170 with the scanning mirror 122 of the oblique scanning camera 100 at an extreme spin angle, and the resultant size of the scanning mirror 122. FIG. 30B shows the intersection of corner sensor point beams with the scanning mirror of the oblique scanning camera 100 through a full scan range. Since the extreme spin angle for dedicated oblique imaging is smaller than the extreme spin angle for full-field oblique and nadir imaging (as illustrated by FIGS. 8A and 8B), the required size of the scanning mirror 122 can be significantly smaller.

Figure 31:
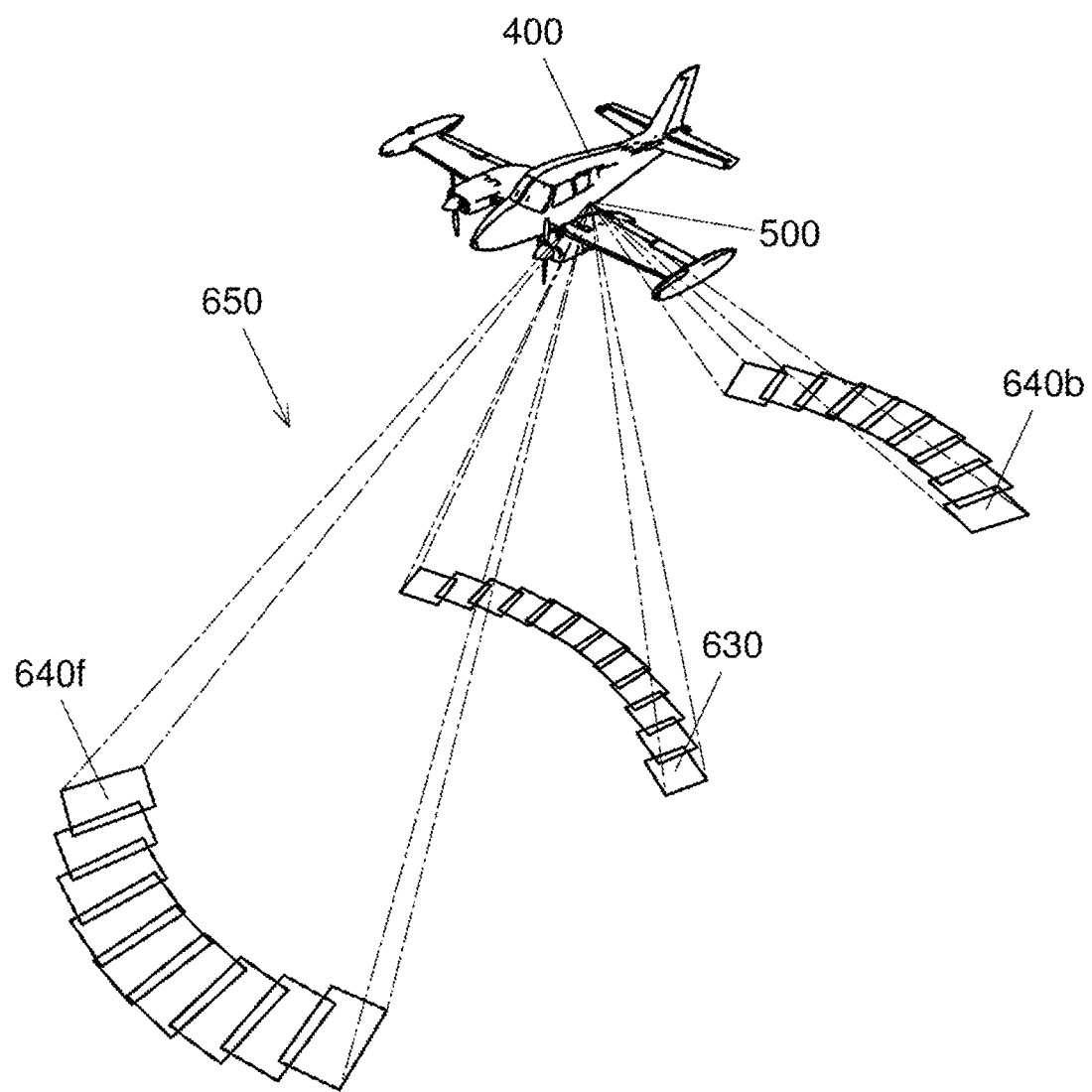
FIG. 31 shows the scan field of the triple-scan oblique scanning camera carried by a survey aircraft.

FIG. 31 shows a perspective view of the scan field 650 of the triple-scan oblique scanning camera 500 carried by a survey aircraft 400.

Figure 32A:
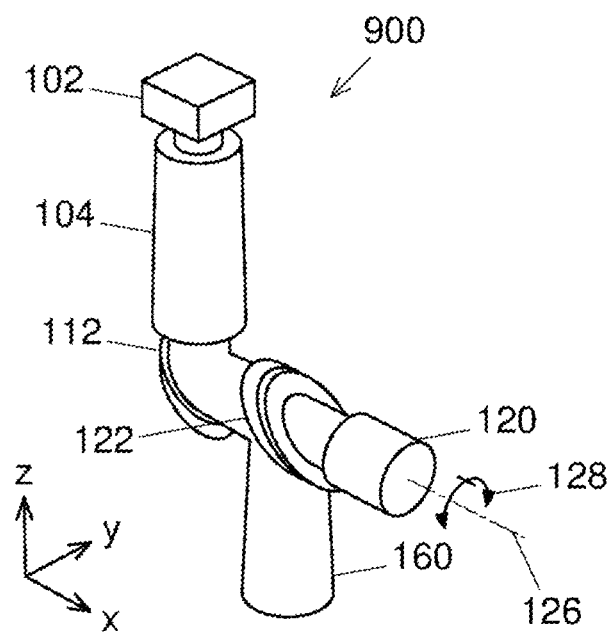
FIG. 32A shows a perspective view of a linear scanning camera.

FIG. 32A shows a perspective view of the scanning camera 100 configured with a horizontal spin axis 126 consistent with the prior art, resulting in a linear side-to-side scan path. This scanning camera is hereafter referred to as a linear scanning camera 900. When the spin axis 126 coincides with the camera optical axis 106, the scanning mirror 122 can be limited to a cylindrical cross section independent of spin angle 128, i.e. an ellipse as shown.

Figure 32B:
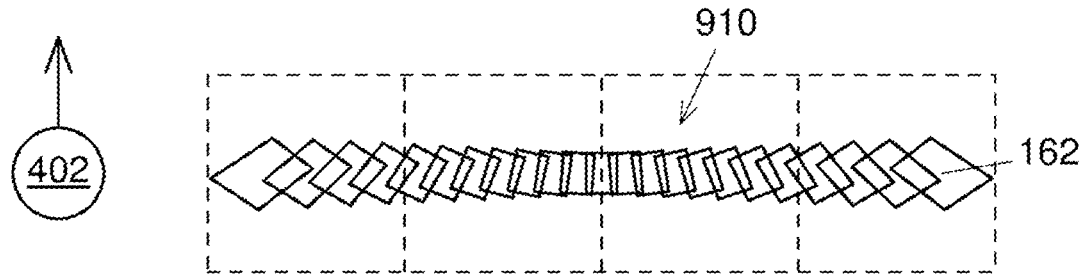
FIG. 32B shows a scan field of the linear scanning camera.

FIG. 32B shows a scan field 910 of the linear scanning camera 900 operated at an altitude of 14,000 feet. The linear scanning camera 900 is shown using a rectangular image sensor 144 (a CMOSIS CMV50000 with 7920×6004 square 4.6 um pixels) to illustrate the effect of a rectangular rather than square image sensor on the scan field 910.

Figure 32C:
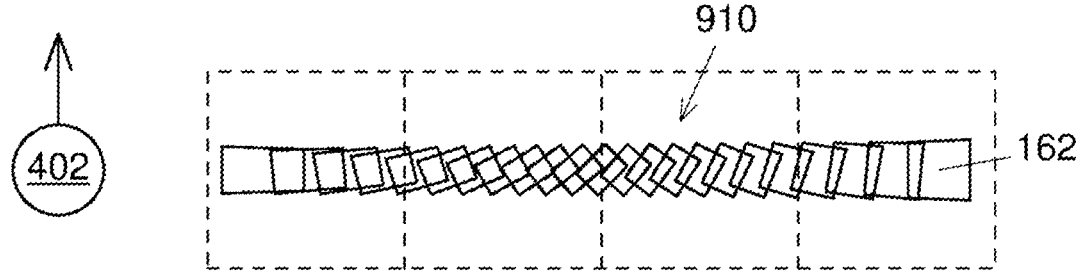
FIG. 32C shows a scan field of the linear scanning camera with the image sensor rotated.

FIG. 32C shows the scan field 910 with the image sensor 144 rotated 45 degrees so that oblique images are captured squarely, rather than rotated as in FIG. 32B, to better meet market expectations for oblique images. However, due to the rectangular shape of the image sensor and the nature of the linear scan field 910, its sensor fields 162 have a landscape aspect at one end of the scan field and a portrait aspect at the other end, which is not ideal.

Prior-art scanning aerial camera systems are known to capture four-way nadir and oblique imagery in a crossed (X-shaped) pattern comprising two linear scan fields at right angles to each other (and rotated at 45 degrees to the flight direction). See Lapstun et al. (U.S. Pat. No. 9,641,736, "Wide-area aerial camera systems"), the contents of which are herein incorporated by cross reference.

Figure 33A:
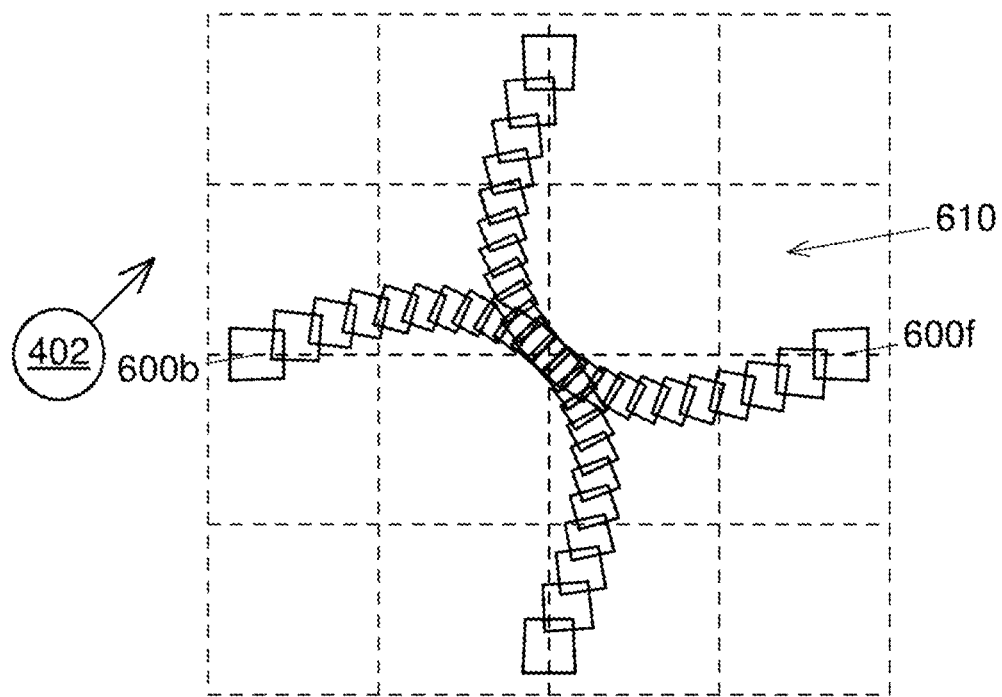
FIG. 33A shows a scan field of the dual-scan scanning camera using a larger rectangular image sensor.
Figure 33B:
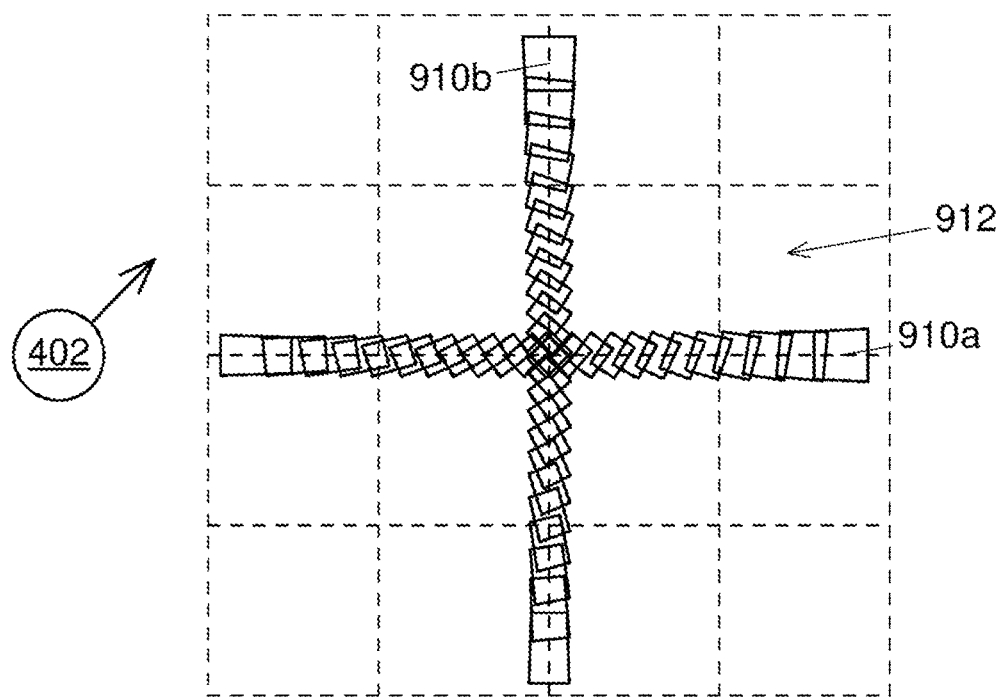
FIG. 33B shows a crossed scan field of a dual-scan linear scanning camera using the rectangular image sensor.

FIG. 33A shows the dual scan field 610 of the dual-scan scanning camera 100 using the larger rectangular CMV50000 image sensor 144, while FIG. 33B shows a crossed scan field 912, comprising two linear scan fields 910a and 910b, of a dual-scan linear scanning camera comprising two linear scanning cameras 900. In contrast to the crossed scan field 912, in the dual scan field 610 all four extreme oblique images have the same aspect.

Omitting half of the nadir portion of one scan field and half of the nadir portion of the other scan field, as discussed in relation to FIGS. 19 through 21, also works to lower the average shot rate and increase efficiency when using crossed linear scan fields.

An alternative way to achieve a curved or shaped scan path 180, with a nadir viewing angle in the center and a progressively more oblique viewing angle towards each end, is to augment a linear scanning mechanism with a variable deflection mechanism, whereby, during the scan, the imaging beam is, for example, progressively deflected in a direction perpendicular to the nominal linear scan axis as the scan progresses away from the nadir point, thus inducing the desired shape in the scan path. The shape of the scan path is controlled by the relationship between the scan angle of the linear scanning mechanism and the deflection angle of the deflection mechanism, and an arbitrary shape may be induced by suitable control of the deflection mechanism.

Several prior-art linear scanning mechanisms exist. Lapstun et al. (U.S. Pat. No. 9,641,736, "Wide-area aerial camera systems"), the contents of which are herein incorporated by cross reference, describes linear scanning effected by spinning a mirror about a horizontal spin axis. It also describes linear scanning effected by progressively tilting a mirror in the scan direction. Cope et al. (U.S. patent application Ser. No. 15/513,538, "An aerial camera system"), the contents of which are herein incorporated by cross reference, describes linear scanning effected by spinning an entire camera about a horizontal spin axis, and reflecting the imaging beam towards the ground via a mirror. Pechatnikov et al. (U.S. patent application Ser. No. 11/607,511, "Digital mapping system based on continuous scanning line of sight"), the contents of which are herein incorporated by cross reference, describes linear scanning effected by swinging an entire camera back and forth along the scan path.

If a linear scanning mechanism is used for fixed oblique imaging, i.e. where the aim is to tilt the entire scan field at an oblique angle, it may comprise a fixed deflection mirror for this purpose, which typically bends the optical path by 135 degrees. For example, in Cope el al. a steering mirror (which also used for motion compensation) serves this purpose for its two oblique cameras. This also has the effect of inducing a curve in the resultant oblique scan field. Note that it does not, however, yield a scan field with a nadir viewing angle in the center. Rather, the minimum viewing angle within the scan field equals the fixed deflection angle. If, on the other hand, fixed oblique imaging is achieved by tilting the entire scanning mechanism, then no curve is induced in the resultant oblique scan field.

In general, the curve-inducing deflection mechanism may be made to act on an assembly comprising the camera and linear scanning mechanism, or on an assembly comprising the linear scanning mechanism, or on a sub-assembly on which the linear scanning mechanism itself acts. The curve-inducing deflection mechanism may comprise any suitable actuator or motor that can induce the required deflection at the required rate. It may, for example, comprise a stepper motor or piezo-electric actuator or motor. It may also, where necessary, comprise additional components such as a mirror.

Figure 34A:
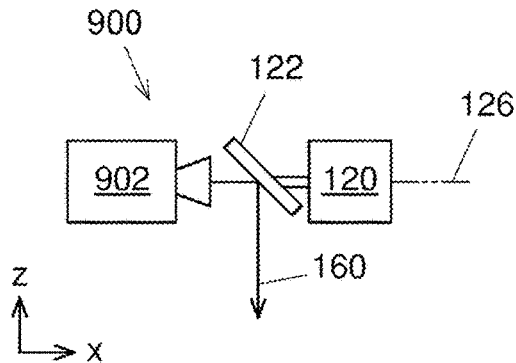
FIG. 34A shows a linear scanning camera with a spinning mirror.

FIG. 34A shows a schematic of a linear scanning camera 900 with a scanning mirror 122 spinning about a horizontal spin axis 126, e.g. as described in relation to FIG. 32A, and consistent with the prior art (e.g. as described in Lapstun et al.). The camera assembly 902 comprises the camera 102 and lens assembly 104. The linear scanning camera 900 scans the imaging beam 160 along a linear scan path parallel to they axis. The optional correction mirror 112 is omitted for clarity, and the camera assembly 902 is therefore horizontal.

Figure 34B:
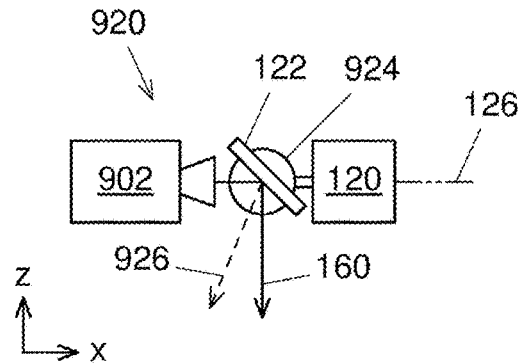
FIG. 34B shows a steerable scanning camera with a spinning mirror.

FIG. 34B shows a steerable linear scanning camera 920 based on the spinning-mirror linear scanning camera 900 of FIG. 34A. The scanning camera 900 is augmented with a tilting mirror drive 924 acting on the scanning mirror 122 to rotate it about the y axis, resulting in a tilted imaging beam 926. The tilting mirror drive 924 is coupled to and acted upon by the scanning mirror drive 120, and may comprise any suitable actuator or motor. The tilted imaging beam 926 may be made to follow an arbitrary shaped scan path by varying its tilt angle during a scan.

A tilting mirror drive 924 may also be added to the scanning camera 100 in the same way, either to allow the tilt of the scanning mirror 122 to be varied during a scan to finely adjust the shape of the scan path 180, or to allow the fixed tilt of the scanning mirror 122 to be changed to adjust the overall flatness of the curve of the scan path 180.

Figure 34C:
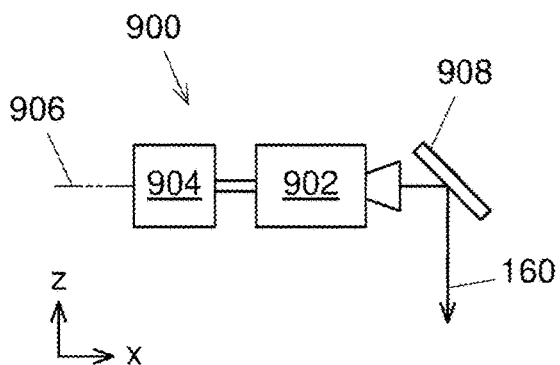
FIG. 34C shows a linear scanning camera with a spinning camera assembly.

FIG. 34C shows a linear scanning camera 900 with a camera assembly 902 spinning about a horizontal axis 906, consistent with the prior art (e.g. as described in Cope et al.). It comprises a scanning camera drive 904, which may comprise any suitable actuator or motor, coupled to the camera assembly 902, and a fixed mirror 908 for deflecting the imaging beam 160 downwards.

Figure 34D:
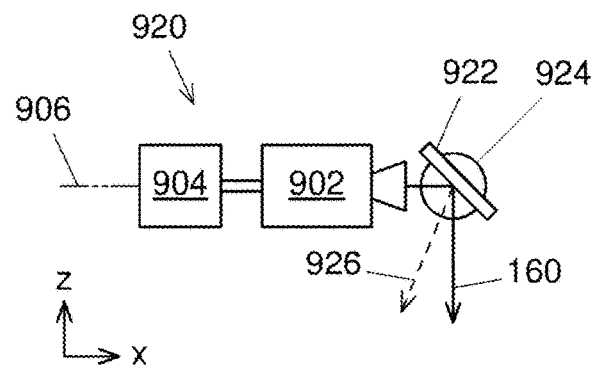
FIG. 34D shows a steerable scanning camera with a spinning camera assembly.

FIG. 34D shows a steerable scanning camera 920 based on the spinning-camera linear scanning camera 900 of FIG. 34C. The scanning camera 900 is augmented with a tilting mirror 922 (replacing the fixed mirror 908), and a tilting mirror drive 924 acting on the tilting mirror 922 to rotate it about the y axis, resulting in a tilted imaging beam 926. The tilting mirror 922 and tilting mirror drive 924 are coupled to the camera assembly 902 and hence are acted upon by the scanning camera drive 902.

Figure 34E:
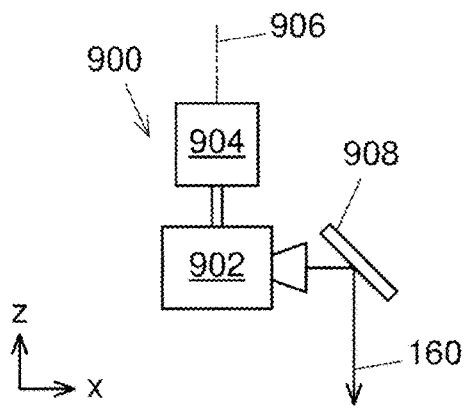
FIG. 34E shows a linear scanning camera with a swinging camera assembly.

FIG. 34E shows a linear scanning camera 900 with a camera assembly 902 spinning (or swinging) about a vertical axis 906, consistent with the prior art (e.g. as described in Pechatnikov et al.). It comprises a scanning camera drive 904, which may comprise any suitable actuator or motor, coupled to the camera assembly 902, and a fixed mirror 908 for deflecting the imaging beam 160 downwards. In Pechatnikov et al. the camera assembly 902 faces downwards, swings about a horizontal axis, and there is no need for a fixed mirror 908. The near-equivalent of Pechatnikov et al. in FIG. 34E is used for consistency with the subsequent augmentation shown in FIG. 34F.

Figure 34F:
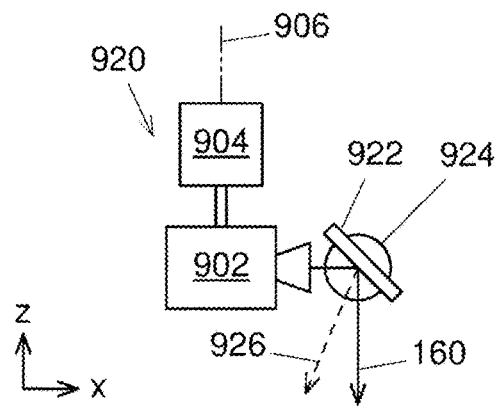
FIG. 34F shows a steerable scanning camera with a swinging camera assembly.

FIG. 34F shows a steerable scanning camera 920 based on the swinging-camera linear scanning camera 900 of FIG. 34E. The scanning camera 900 is augmented with a tilting mirror 922 (replacing the fixed mirror 908), and a tilting mirror drive 924 acting on the tilting mirror 922 to rotate it about the y axis, resulting in a tilted imaging beam 926. The tilting mirror 922 and tilting mirror drive 924 are coupled to the camera assembly 902 and hence are acted upon by the scanning camera drive 902.

The tilting mirror drive 924 may be coupled to the side or the back of the mirror 122 or 922. Ensuring the axis of rotation is at, or close to, the face of the mirror minimizes the required size of the mirror.

Figure 35A:
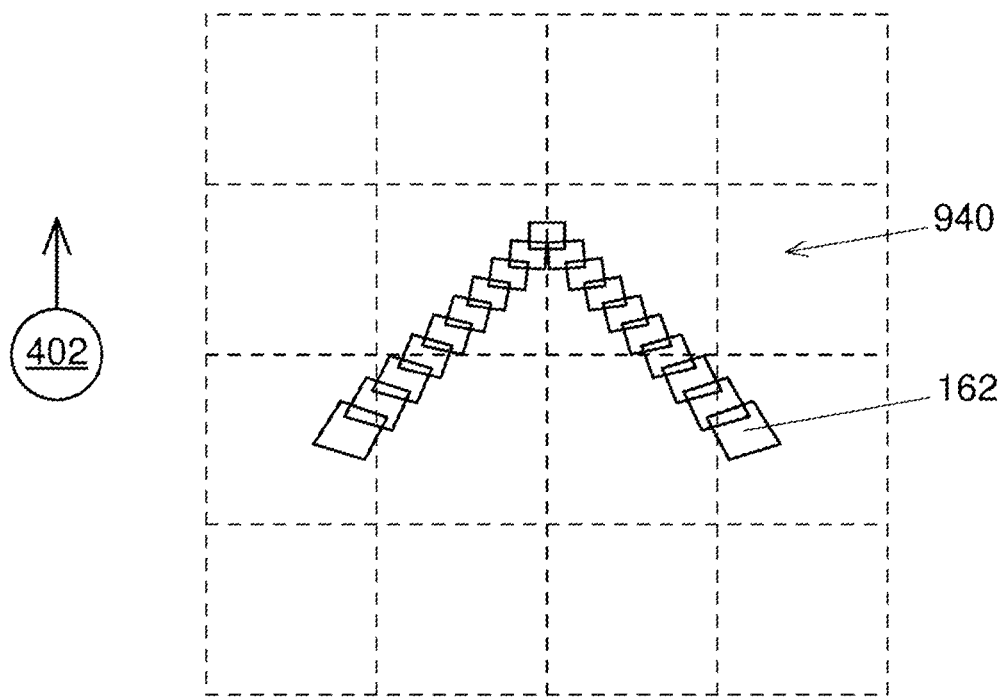
FIG. 35A shows a shaped scan field of a steerable scanning camera.

FIG. 35A shows a shaped scan field 940 of a steerable scanning camera 920. The illustrative shape is a "V" shape induced by varying the tilt angle of the scanning mirror 122 (or tilting mirror 922), via the tilting mirror drive 924, as a function of the spin angle 128. A V-shaped scan field has the advantage that the viewing direction 184 can be a constant (plus or minus) 45 degrees in each arm of the scan field.

Figure 35B:
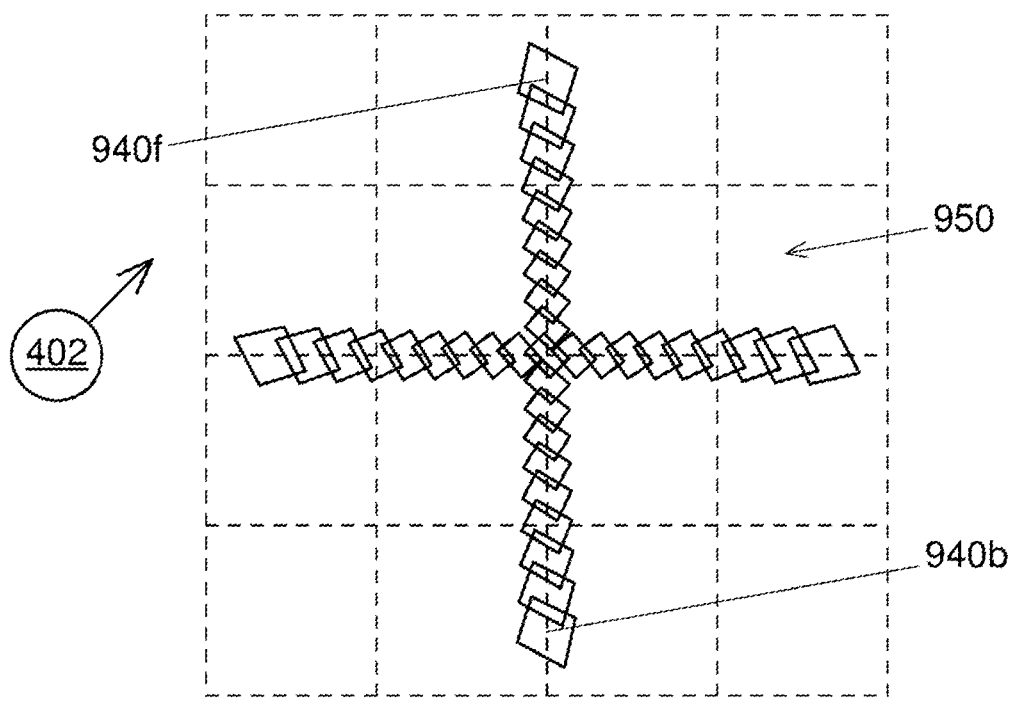
FIG. 35B shows a shaped scan field of a dual-scan steerable scanning camera.

FIG. 35B shows a dual scan field 950 of a dual-scan steerable scanning camera 930. The X-shaped dual shaped scan field 950 comprises a forward V-shaped scan field 940$f$ and a backward V-shaped scan field 940$b$. The dual-scan steerable scanning camera 930 comprises a forward-facing steerable scanning camera 920$f$ and a backward-facing steerable scanning camera 920$b$.

In general, any number of scanning cameras 920 may be deployed, suitably rotated (e.g. to ensure evenly-spaced viewing directions), to capture a desired number of views. Any number of scanning cameras 920 may also be deployed, with the same rotation, to increase capture throughput.

Another scan-field shape of interest has a constant 45-degree viewing direction 184 within each oblique sub-field 622, but a zero-degree viewing direction within the nadir sub-field 620.

FIG. 36 lists the equations relating the viewing angle (t) 182 and the viewing direction (p) 184 of a steerable scanning camera 920 to the spin angle (a) and the additional tilt angle (b) of the imaging beam 926 (i.e. the tilt angle beyond the nominal angle of the imaging beam 160), as induced by the tilt of the mirror 122 or 922. EQ1, EQ2 and EQ3 give the direct relations. EQ4, based on EQ1, and EQ5, based on EQ3, give the values for the spin angle (a) and the imaging beam tilt (b) corresponding to a specific viewing angle (t) of 45 degrees and a specific viewing direction (p) of 45 degrees. The tilt of the mirror 122 or 922 is half the tilt (b) of the imaging beam. EQ6, derived from EQ1 and EQ2, gives the formula for the imaging beam tilt (b) that results in a constant viewing direction (p) of 45 degrees throughout the scan, i.e. corresponding to the V-shaped scan field shown in FIG. 35A. Alternatively, using a constant ratio of (b) to (a) of approximately 0.85, based on their values from EQ4 and EQ5, yields an almost constant viewing direction (p) within a few degrees of 45 degrees throughout the scan.

FIG. 37 shows a perspective view of the dual shaped scan field 950 of the dual-scan steerable scanning camera 930 carried by a survey aircraft 400.

A single camera assembly can be time-multiplexed between multiple scanning mechanisms, e.g. to realize a more compact mechanical design, if the resultant reduced aggregate shot rate is adequate for a particular application.

As shown in FIGS. 38A and 38B, a dual-scan scanning camera 300 can be realized using two scanning mechanisms, each comprising a scanning mirror drive 120 and a scanning mirror 122 as previously described in relation to the scanning camera 100, sharing a single camera assembly 902. The camera assembly 902 is time-multiplexed between the two scanning mechanisms by a multiplexing mirror 960. In FIG. 38A the multiplexing mirror rotates (or spins) about the z axis between two operative positions, whereas in FIG. 38B it rotates (or tilts) about the y axis. The multiplexing mirror 960 is coupled to a multiplexing mirror drive 962 that rotates the mirror. The multiplexing mirror drive 962 may be of any suitable type, e.g. as previously described in relation to the scanning mirror drive 120 or the tilting mirror drive 924. The multiplexing mirror 960 may also perform the functions of the correction mirror 112, and the multiplexing mirror drive may perform the functions of the correction mirror stage 110. Alternatively, the correction mirror stage 110 and/or the correction mirror 112 may be provided separately.

FIG. 38C similarly shows a dual-scan oblique scanning camera 300 realized using two scanning mechanisms sharing a single camera assembly 902. Each scanning mirror 122 is shown tilted at 67.5 degrees to the optical axis to reflect a 45-degree imaging beam 160 into the camera. Paired with another scanning camera 100, the dual-scan oblique scanning camera 300 can be used to realize a triple-scan scanning camera 500 as previously described.

FIG. 38D shows a dual-scan steerable scanning camera 930 realized using two linear scanning mechanisms, each comprising a scanning mirror drive 120, a scanning mirror 122, and a tilting mirror drive 924, as previously described in relation to the steerable scanning camera 920, sharing a single camera assembly 902.

A single scanning mechanism can be time-multiplexed between multiple scan fields, e.g. to realize a more compact mechanical design, if the resultant reduced aggregate shot rate is adequate for a particular application.

FIG. 39A shows a dual-scan oblique scanning camera 300 realized using a single camera assembly 902 and a single scanning mechanism (comprising a scanning mirror 122 and drive 120 as previously described in relation to the scanning camera 100). The spin axis of the scanning mirror coincides with the camera optical axis, and the scanning mirror 122 is tilted at 22.5 degrees to the spin axis to reflect a 45-degree oblique imaging beam 160 into the camera assembly 902 (or, more generally, the scanning mirror 122 is tilted at N degrees to the spin axis to reflect a 2N-degree oblique imaging beam 160). The scanning mirror 122 serves the dual purposes of: (a) multiplexing the imaging beam 160 between the forward and backward scan fields; and (b) scanning the imaging beam 160 within each scan field.

FIG. 39B shows the forward scan field 640$f$ and backward scan field 640$b$ of the single-scanner dual-scan oblique scanning camera 300 with a scan range of 90 degrees within each oblique scan field. In practice the scan range for oblique imaging may be less than 90 degrees, e.g. as discussed previously in relation to FIG. 28A. Conversely, a 360-degree scan range results in an unbroken circular scan field.

Each scanning cycle comprises four phases: (1) the scanning mirror 122 is rotated into position at the start of the forward scan range; (2) the scanning mirror 122 is rotated through the forward scan range to effect scanning of the forward oblique scan field 640f via forward imaging beam 160f; (3) the scanning mirror 122 is rotated into position at the start of a backward scan range; and (4) the scanning mirror 122 is rotated through the backward scan range to effect scanning of the backward oblique scan field 640b via backward imaging beam 160b. Each scan field 640f and 640b is therefore associated with a respective subrange of the scanning mirror spin angle 128. The scanning cycle is repeated to effect repeated dual oblique scanning. To minimize the rotation of the scanning mirror 122 during each cycle, the scanning mirror may be rotated through a full 360 degrees, i.e. at the required scan rate within each respective scan field, and at a faster rate when being repositioned between scan fields to minimize inactive time.

The single-scanner dual-scan oblique scanning camera 300 may be utilized as part of a triple-scan scanning camera 500, as discussed previously in relation to FIG. 22B, i.e. as an alternative realization of the forward and backward oblique scanning cameras 100f and 100b. Apart from a scanning camera 100 according to the present invention, the nadir scanning camera 100n in a triple-scan scanning camera 500 may be any suitable scanning camera, including, for example, a prior-art linear scanning camera 900 as described in relation to FIGS. 32A, 34A and 34C.

A single-scanner dual-scan oblique scanning camera 300 may also be realized by coupling a drive directly to the camera assembly 902 (e.g. as previously discussed in relation to FIG. 34C) and utilizing a fixed mirror in place of the scanning mirror 122, rigidly coupled to the camera assembly 902, so that the camera assembly 902 and fixed mirror spin in unison. The drive may be mounted axially above the camera assembly 902 or axially below the mirror. Continuous rotation of a spinning camera assembly may need to be limited due to cabling constraints, so the camera assembly may need to be rotated in both directions equally over time.

As shown in FIG. 40A, a dual-scan scanning camera 300 can be realized using a single scanning mechanism (comprising a scanning mirror 122 and drive 120 as previously described in relation to the scanning camera 100), shared between two camera assemblies 902f and 902b (via correction mirrors 112f and 112b). The scanning mirror 122 serves the dual purposes of: (a) multiplexing the imaging beam 160 between the forward and backward scan fields; and (b) scanning the imaging beam 160 within each scan field.

Each scanning cycle comprises four phases: (1) the scanning mirror 122 is rotated into position at the start of the forward scan range associated with the forward camera assembly 902f; (2) the scanning mirror 122 is rotated through the forward scan range to effect scanning of forward scan field 600f via forward imaging beam 160f; (3) the scanning mirror 122 is rotated into position at the start of the backward scan range associated with the backward camera assembly 902b; and (4) the scanning mirror 122 is rotated through the backward scan range to effect scanning of backward scan field 600b via backward imaging beam 160b. Each scan field 600f and 600b is therefore associated with a respective subrange of the scanning mirror spin angle 128. The scanning cycle is repeated to effect repeated dual scanning. To minimize the rotation of the scanning mirror 122 during each cycle, the scanning mirror may be rotated through a full 360 degrees, i.e. at the required scan rate within each respective scan field, and at a faster rate when being repositioned between scan fields to minimize inactive time. The scan fields 600f and 600b may be as shown in and discussed previously in relation to FIGS. 17A and 17B, or may be partial, as discussed in relation to FIGS. 23A and 23B.

The shared-scanner dual-scan scanning camera 300 may be utilized as part of a triple-scan scanning camera 500, as discussed previously in relation to FIG. 22B, i.e. as an alternative realization of the forward and backward oblique scanning cameras 100f and 100b. Apart from a scanning camera 100 according to the present invention, the nadir scanning camera 100n in a triple-scan scanning camera 500 may be any suitable scanning camera, including, for example, a prior-art linear scanning camera 900 as described in relation to FIGS. 32A, 34A and 34C.

As shown in FIG. 40B, a dual-scan scanning camera 300 can be realized using a single shared camera assembly 902, as previously described in relation to FIG. 38A, and a single shared scanning mechanism, as described in relation to FIG. 40A. Each of two additional fixed mirrors 908f and 908b couples its respective camera optical path to its correction mirror counterpart 112.

The scanning mirror 122 is time-multiplexed between the two imaging beams 160f and 160b via its own rotation, as previously described, and the camera assembly 902 is time-multiplexed between the two imaging beams 160f and 160b by multiplexing mirror 960, as previously described. When the scanning mirror 122 is scanning the forward imaging beam 160f, the multiplexing mirror is rotated to reflect forward imaging beam 160f into the camera assembly 902. When the scanning mirror 122 is scanning the backward imaging beam 160b, the multiplexing mirror is rotated to reflect backward imaging beam 160b into the camera assembly 902.

The multiplexing mirror 960 and drive 962 may tilt rather than spin, as described in relation to FIG. 38B. More generally (and also in relation to FIG. 38B), the camera assembly 902 may be time-multiplexed between imaging beams 160f and 160b using any suitable mechanism. For example, if the inactive imaging beam (160f in FIG. 40B) is dark, e.g. due to the scanning mirror 122 effectively blocking incoming light along the inactive optical path, or due to a shutter placed in each optical path being opened when the path is active and closed when the path is inactive, then a simple beam splitter and fixed mirror can be used to split the optical path in front of the camera assembly 902. If the inactive imaging beam is not dark, then a polarizing beam splitter may be used, in conjunction with a polarizing filter and a polarization rotator, with the polarization rotator used to switch between the two paths.

FIG. 41A shows a particular realization of the shared-scanner dual-scan scanning camera 300 of FIG. 40A, utilizing the same components as the scanning camera 100 described in relation to FIGS. 1A through 2. FIG. 41A shows the scanning mirror 122 facing correction mirror 112f associated with camera assembly 902f (comprising camera 102f and lens assembly 104f), and thus effects scanning of corresponding imaging beam 160f. FIG. 41B shows the scanning mirror 122 rotated to face correction mirror 112b associated with camera assembly 902b (comprising camera 102b and lens assembly 104b), and thus effects scanning of corresponding imaging beam 160b.

FIG. 41C shows the shared-scanner dual-scan scanning camera 300 of FIG. 41A with a mount plate 302 and protective housing 306, whose functions are the same as previously described in relation to FIG. 12B. A mount rod 304, for attaching the scanning camera 300 to a camera mount 700 (as previously described in relation to FIGS. 12B and 15), is omitted for clarity. A mount rod 304 can be easily attached to mount plate 302 via an intermediate bracket that straddles drive 120. FIG. 42 shows a corresponding exploded view.

The shared-scanner scanning cameras described in relation to FIGS. 40A, 40B and 41A can be readily extended to time-multiplex more than two scan fields, e.g. to capture additional oblique views, nadir and oblique views, or more redundant imagery in general. In relation to FIG. 40A, any number of additional camera assemblies 902 can be time-multiplexed via scanning mirror 122. In relation to FIG. 40B, any number of additional camera optical paths can be time-multiplexed via scanning mirror 122 and multiplexing mirror 960 (or its equivalent). In both cases the orientation of each additional camera optical axis relative to scanning mirror 122 determines the orientation of the corresponding scan field on the object plane. Some specific examples are discussed further below in relation to FIGS. 45C and 45D.

The use of more than two scan fields can also provide operational redundancy in case of the failure of an individual camera assembly 902, with the scan fields of remaining camera assemblies potentially adjusted dynamically to compensate.

As discussed previously, although the figures show the dual scan field 610 comprising a forward scan field 600$f$ and backward scan field 600$b$ captured using forward- and backward-facing scanning cameras 100, the scan field 610 may instead comprise left and right scan fields 600 captured using a left- and right-facing scanning cameras 100. FIG. 43A shows a corresponding dual scan field 610, comprising a right (starboard) scan field 600$s$ and left (port) scan field 600$p$. Scanning cameras that capture forward and/or backward scan fields are referred to as longitudinally oriented, while scanning cameras that capture right and/or left scan fields are referred to as laterally oriented.

FIG. 43B shows a dual scan field 610 of a laterally-oriented dual-scan scanning camera 300 relative to a seven-flightline survey path 404.

Figure 20B:
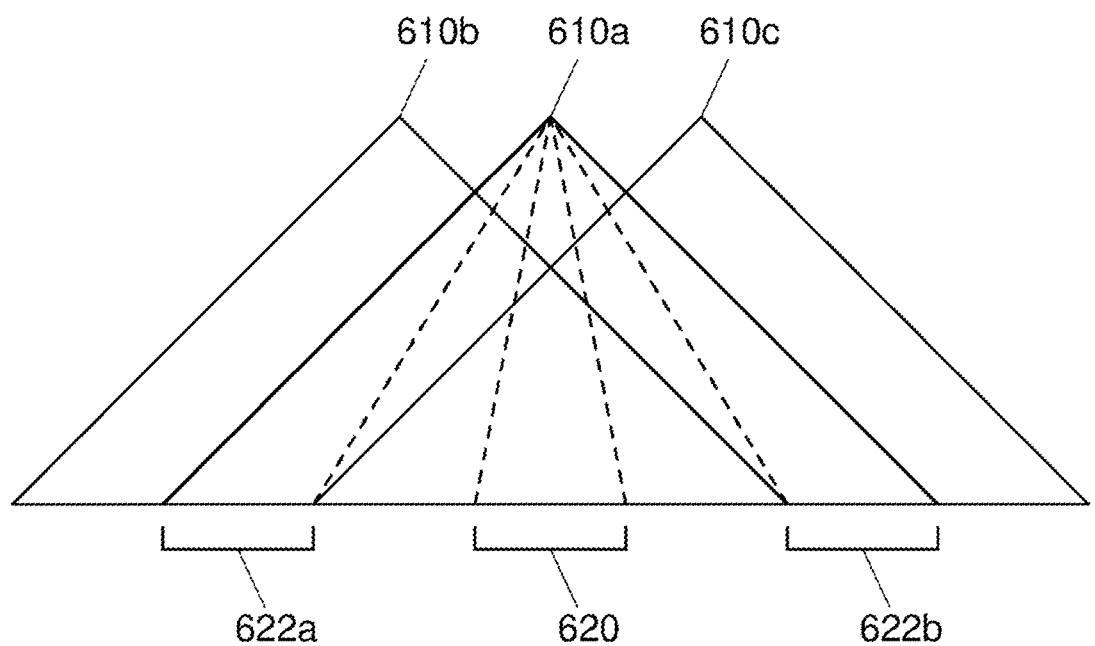
FIG. 20B shows an elevation of the overlapping scan fields of the dual-scan scanning camera from three adjacent flightlines.

As previously discussed, FIG. 20A shows an elevation of the dual scan field 610 of a dual-scan scanning camera 300, and FIG. 20B shows an elevation of dual scan fields 610 from three adjacent flightlines. This applies equally whether the scanning camera 300 is longitudinally-oriented or laterally-oriented, and in the laterally-oriented case FIG. 20A represents the indicated east-west cross-section of the dual scan field 610 in FIG. 43B (but note again that because each scan field 600 is curved, the actual sensor fields overlapping the cross-section come from multiple successive scan fields). The left and right oblique sub-fields 622$a$ and 622$b$ are associated with the left scan field 600$p$ and right scan field 600$s$ respectively, while the nadir sub-field 620 is associated with both scan fields (i.e. each half of the nadir sub-field is associated with a respective scan field). Likewise, the corresponding left and right oblique sub-fields in the orthogonal north-south direction of the scan field 610 in FIG. 43B are associated with the left scan field 600$p$ and right scan field 600$p$ respectively, and the north-south nadir sub-field 620 is associated with both.

As illustrated in FIGS. 18A and 18B, the spacing between successive scan fields within the same flightline (FIG. 18A) is necessarily smaller than the spacing between scan fields from adjacent flightlines (FIG. 18B). As a consequence, a scan field that is more perpendicular to the flight direction 402 (or survey path 404) may be preferred to one that is less perpendicular (subject to constraints imposed by desired viewing direction 184), as this reduces the number of shots that contribute to any given sub-field (620 or 622), and thus reduces the range of viewing angles 182 among the shots. When the scan field is a curved scan field, such as a scan field 600, reducing the number of shots also reduces the range of viewing directions 184 among the shots. Where possible then, oblique shots from left and right scan fields 600$p$ and 600$s$, as captured by a laterally-oriented scanning camera, may be preferable to oblique shots from forward and backward scan fields 600$f$ and 600$b$; and nadir shots from forward and backward scan fields 600$f$ and 600$b$, as captured by a longitudinally-oriented scanning camera, may be preferable to nadir shots from left and right scan fields 600$p$ and 600$s$.

FIG. 44 shows the contributions of different scan patterns to sub-fields 622$a$, 620 and 622$b$, highlighting the overlap between each scan field and each sub-field. The differences between contributions becomes more acute as the spacing between flightlines increases and the sub-fields become wider. If the aircraft heading 402 in FIG. 44 is north-east, then the illustrated sub-field contributions apply in the east-west direction. By symmetry, sub-field contributions in the north-south direction follow the same pattern.

Also included in FIG. 44 is a linear X-shaped scan pattern (using the shaped linear scan fields 940$f$ and 940$b$ previously discussed in relation to FIGS. 35A and 35B, but applicable to any linear scan fields), showing that the preferred curved scan fields 600 may also be preferable to linear scan fields within both the oblique and nadir sub-fields.

As discussed previously in relation to FIGS. 22B, 23A and 23B, the scan field 610 may comprise partial scan fields 600, with their nadir portions omitted, and a separate nadir scan field 630 captured using a nadir scanning camera 100$n$. This allows the use of a laterally-oriented scanning camera for oblique shots (in scan fields 600$p$ and 600$s$) and a longitudinally-oriented scanning camera 100$n$ for nadir shots (in scan field 630). FIG. 45A shows a scan field 610 corresponding to such a triple-scan camera configuration, and FIG. 45B shows a corresponding scan field 610 with a heading of 45 degrees. As discussed in relation to FIGS. 23A and 23B, FIGS. 45A and 45B also show the use of a higher-resolution scanning camera for the scan fields 600$p$ and 600$s$, so that the GSDs of the resultant oblique imagery and nadir imagery are better matched.

FIG. 46A shows a plan view of the longitudinally-oriented shared-scanner dual-scan scanning camera 300 of FIG. 40A. Scanning assembly 138 comprises scanning mirror drive 120 and scanning mirror 122 (and scanning mirror mount 124). Correction mirrors 112$f$ and 112$b$ (not shown) couple imaging beams 160$f$ and 160$b$ from scanning mirror 122 to camera assemblies 902$f$ and 902$b$.

FIG. 46B shows a plan view of a laterally-oriented shared-scanner dual-scan scanning camera 300, i.e. the shared-scanner dual-scan scanning camera 300 of FIGS. 40A and 45A rotated 90 degrees about the z axis. Left- and right-facing camera assemblies 902$p$ and 902$s$ capture left and right scan fields 600$p$ and 600$s$ via corresponding imaging beams 160$p$ and 160$s$.

FIG. 46C shows a plan view of a shared-scanner triple-scan scanning camera 500, which combines the functions of a laterally-oriented dual-scan scanning camera 300 and a longitudinally-oriented scanning camera 100. Triple-scan scanning camera 500 may be used to capture the scan field 610 discussed in relation to FIGS. 44A and 44B, with front-facing camera assembly 902$n$ used to capture the nadir scan field 630 via imaging beam 160$n$. Alternative configurations of a triple-scan scanning camera 500 may comprise a shared-scanner dual-scan scanning camera 300 and a (single-scan) scanning camera 100, with the dual-scan scanning camera 300 configured either to time-multiplex camera assemblies 902p and 902s, or to time-multiplex camera assemblies 902n and 902p (or 902s), i.e. mounted at right angles per FIG. 45C.

FIG. 46D shows a plan view of a shared-scanner quadruple-scan scanning camera 510, which combines the functions of a longitudinally-oriented dual-scan scanning camera 300 and a laterally-oriented dual-scan scanning camera 300. Four imaging beams 160f, 160b, 160p and 160s are time-multiplexed (and scanned) via scanning mirror 122, allowing four camera assemblies 902f, 902b, 902p and 902s to capture corresponding scan fields 160f, 160b, 160p and 160s. As previously discussed, each scan field 160 may be full or partial according to specific application requirements. Alternative configurations of a quadruple-scan scanning camera 510 may comprise pairwise combinations of camera assemblies into respective shared-scanner dual-scan cameras 300, with each dual-scan camera 300 either longitudinal, lateral or right-angle as appropriate.

While the scanning cameras of FIGS. 46A through 46D utilize separate camera assemblies 902, they may equally utilize a single camera assembly 902 time-multiplexed as discussed in relation to FIG. 40B.

The present invention has been described with reference to a number of preferred embodiments. Other embodiments will be obvious to someone of ordinary skill in the art, and the scope of the invention is limited only by the attached claims.

The invention claimed is:

1. A scanning camera for capturing a set of images along at least two curved scan paths on an object plane within an area of interest, each image of the set of images associated with a viewing angle and a viewing direction relative to the object plane, the scanning camera comprising:
a camera assembly comprising an image sensor and a lens, and having a camera optical axis,
a plurality of scanning mirrors, each associated with one of a plurality of scanning paths and each establishing an optical axis;
a plurality of drives, each coupled to a respective one of the plurality of scanning mirrors and configured to spin the respective one of the plurality of scanning mirrors about a respective spin angle about a respective spin axis;
a multiplexing mirror configured to multiplex imaging beams from each of the plurality of scanning mirrors onto the image sensor via the lens of the camera assembly; and
a multiplexing mirror drive coupled to the multiplexing mirror and configured to cause the multiplexing mirror to spin to multiplex the imaging beams on the image sensor via the lens of the camera assembly,
wherein a viewing angle and a viewing direction of each of the imaging beams is relative to the object plane and varies with a respective spin angle and a pointing direction of a respective optical axis of a respective one of the scanning mirrors.

2. The scanning camera according to claim 1, wherein the multiplexing mirror drive and the multiplexing mirror together are further configured to at least partially correct for angular motion of the scanning camera.

3. The scanning camera according to claim 2, wherein the angular motion of the scanning camera for which the multiplexing mirror drive and the multiplexing mirror are configured to correct include at least pitch and roll of the scanning camera.

4. The scanning camera according to claim 2, wherein the scanning camera is mounted on a platform configured to at least partially correct for the angular motion of the camera and wherein the platform, the multiplexing mirror, and the multiplexing mirror drive correct the angular motion of the scanning camera in unison.

5. The scanning camera according to claim 4, wherein the multiplexing mirror drive is configured to tilt the multiplexing mirror based on a tilt angle of the at least one of the plurality of scanning mirrors.

6. The scanning camera according to claim 2, wherein the multiplexing mirror drive and the multiplexing mirror together are configured to correct for forward motion of the scanning camera.

7. The scanning camera according to claim 6, wherein the multiplexing mirror drive and the multiplexing mirror together are configured to perform only forward motion correction of the scanning camera.

8. The scanning camera according to claim 1, wherein the scanning camera is mounted on a platform configured to at least partially correct for the angular motion of the camera.

9. The scanning camera according to claim 8, wherein the platform includes an inertial measurement unit (IMU) configured to measure the angular motion of the scanning camera, and the platform is configured to at least partially correct for the angular motion of the camera based on the angular motion measured by the IMU.

10. The scanning camera according to claim 8, wherein the angular motion of the scanning camera for which the platform is configured to correct includes yaw of the scanning camera.

11. The scanning camera according to claim 1, wherein the multiplexing mirror drive and the multiplexing mirror together are further configured to correct for motion of at least one of the plurality of scanning mirrors during exposure of the image sensor to at least one of the imaging beams.

12. The scanning camera according to claim 1, wherein the plurality of scanning mirrors are tilted to cause the camera assembly to capture oblique images.

13. The scanning camera according to claim 12, wherein the multiplexing mirror drive is further configured to tilt the multiplexing mirror to cause the imaging beams from the tilted plurality of scanning mirrors to expose the image sensor.

14. The scanning camera according to claim 1, wherein at least one of the plurality of scanning mirrors is tiltable, by a corresponding one of the plurality of drives, to switch between capturing nadir and oblique images.

15. The scanning camera according to claim 1, wherein the camera assembly includes a commercial off-the-shelf (COTS) machine vision camera.

16. The scanning camera according to claim 1, wherein the image sensor includes at least one of a red-green-blue (RGB) sensor, a near infrared sensor, a monochrome sensor, or a multi-spectral sensor.

17. The scanning camera according to claim 1, wherein the multiplexing mirror drive includes one or more piezoelectric actuators to move the multiplexing mirror.

18. The scanning camera according to claim 1, wherein the scanning camera is mounted on an aircraft.

* * * * *